(12) United States Patent
Flemmens et al.

(10) Patent No.: US 11,297,833 B2
(45) Date of Patent: Apr. 12, 2022

(54) ADJUVANTS FOR AGRICULTURAL CHEMICALS

(71) Applicant: ATTUNE AGRICULTURE, LLC, White Marsh, MD (US)

(72) Inventors: Michael S. Flemmens, White Marsh, MD (US); Claire Lotz, Fallston, MD (US); Victoria Gray, White Marsh, MD (US); Maureen Akins, White Marsh, MD (US); Marceliano Nieto, White Marsh, MD (US)

(73) Assignee: Attune Agriculture, LLC, Boca Raton, FL (US)

( * ) Notice: Subject to any disclaimer, the term of this patent is extended or adjusted under 35 U.S.C. 154(b) by 0 days.

(21) Appl. No.: 15/760,951

(22) PCT Filed: Sep. 16, 2016

(86) PCT No.: PCT/US2016/052220
§ 371 (c)(1),
(2) Date: Mar. 16, 2018

(87) PCT Pub. No.: WO2017/049141
PCT Pub. Date: Mar. 23, 2017

(65) Prior Publication Data
US 2018/0255772 A1    Sep. 13, 2018

Related U.S. Application Data

(60) Provisional application No. 62/219,574, filed on Sep. 16, 2015.

(51) Int. Cl.
| | |
|---|---|
| *A01N 25/24* | (2006.01) |
| *A01N 25/30* | (2006.01) |
| *A01P 13/00* | (2006.01) |
| *A01N 25/04* | (2006.01) |
| *A01N 37/40* | (2006.01) |
| *A01N 41/10* | (2006.01) |
| *A01N 57/20* | (2006.01) |

(52) U.S. Cl.
CPC .............. *A01N 25/24* (2013.01); *A01N 25/04* (2013.01); *A01N 25/30* (2013.01); *A01P 13/00* (2021.08); *A01N 37/40* (2013.01); *A01N 41/10* (2013.01); *A01N 57/20* (2013.01)

(58) Field of Classification Search
CPC ........ A01N 25/24; A01N 25/30; A01N 25/04; A01N 41/10; A01N 37/40; A01N 57/20; A01P 13/00
See application file for complete search history.

(56) References Cited

U.S. PATENT DOCUMENTS

| | | | | |
|---|---|---|---|---|
| 5,824,797 A | * | 10/1998 | Hazen | A01N 25/24 536/114 |
| 5,902,589 A | | 5/1999 | Hall-Hibbits et al. | |
| 6,022,829 A | * | 2/2000 | Mito | A01N 43/58 504/134 |
| 2010/0197497 A1 | | 8/2010 | Hsu et al. | |
| 2013/0330397 A1 | | 12/2013 | Neas | |
| 2015/0237851 A1 | | 8/2015 | Drew | |
| 2015/0250166 A1 | | 9/2015 | Goldblum et al. | |
| 2016/0262375 A1 | * | 9/2016 | Raman | A01N 37/40 |

FOREIGN PATENT DOCUMENTS

| | | | |
|---|---|---|---|
| WO | WO9416559 A1 | 8/1994 | |
| WO | WO-2005000023 A1 * | 1/2005 | ............ A01N 43/16 |
| WO | 2011065831 A2 | 6/2011 | |
| WO | WO2014139975 A1 | 9/2014 | |
| WO | WO2015023426 A1 | 2/2015 | |
| WO | WO2015101590 A1 | 7/2015 | |

OTHER PUBLICATIONS

International Search Report and Written Opinion for PCT International Application No. PCT/US2016/052220, dated Dec. 2, 2016, 20.
Baomiao Ding et al (Apr. 1, 2015). Preparation and Characterization of Xanthan-Modified Konjac Gel. Journal of Texture Studies, vol. 46, No. 2, pp. 87-93.
Masakuni Tako (Jan. 21, 1992). Synergistic Interaction between Xanthan and Konjac Glucomannan in Aqueous Media. Biosci. Biotech. Biochem., vol. 56, No. 8, pp. 1188-1192.
Kunihiko Itoh et al (Jul. 19, 2011). In situ gelling formulation based on methylcellulose/pectin system for oral-sustained drug delivery to dysphagic patients. Drug Development and Industrial Pharmacy, vol. 37, No. 7, pp. 790-797.
Mohammed A. Dabbagh et al. (Jan. 26, 1999). Release of Propranolol Hydrochloride from Matrix Tablets Containing Sodium Carboxymethylcellulose and Hydroxypropylmethylcellulose. Pharmaceutical Development and Technology, vol. 4, No. 3, pp. 313-324.

* cited by examiner

*Primary Examiner* — Sue X Liu
*Assistant Examiner* — Andriae M Holt
(74) *Attorney, Agent, or Firm* — Offit Kurman, P.A.; Steven Scott Lloyd

(57) ABSTRACT

Adjuvant compositions for use with agrochemical solutions is provided; more specifically adjuvant compositions that may be used to prepare agrochemical formulations used in the field to control weeds, pests and plant pathogens that adversely affect crop production. The adjuvants improve coverage of the target foliage and exposure of the targeted weed, pest or plant pathogen to the active ingredient of the formulations without the need for increasing the amount of active ingredient applied while reducing spray drift and off-target application.

15 Claims, 21 Drawing Sheets

*Spread factor is the increase or decrease in droplet diameter compared to water, a spread factor of 1.72 has a drop diameter 72% larger than water

*Adjuvants mixed with water and Callisto mesotrione herbicide (0.0125%)

ADJUVANTS FOR AGRICULTURAL CHEMICALS

REFERENCE TO RELATED APPLICATIONS

This application claims priority to U.S. Provisional Application No. 62/219,574 filed Sep. 16, 2015, the complete disclosure of which is hereby fully incorporated herein by reference.

TECHNICAL FIELD

The invention relates the field of crop protection; more specifically to adjuvants that may be used to prepare agrochemical formulations used in the field to control weeds, pests and plant pathogens that adversely affect crop production. The adjuvants improve coverage of the target foliage and exposure of the targeted weed, pest or plant pathogen to the active ingredient of the formulations without the need for increasing the amount of active ingredient applied while reducing spray drift and off-target application.

BACKGROUND

The market for agrochemical adjuvants has developed as a result of low solubility and volatility of active ingredients in water alone, which is the major diluent employed by farmers and the like in preparing spray formulations approved for use in the field. Once water containing an active ingredient, for example an herbicide, evaporates from the foliage upon which it is applied, the active ingredient is no longer available for uptake into the leaf stomata and translocation to the plant root, which is required for many active ingredients to be effective. Thus, adjuvants are needed to bind water and hold it in contact with the target thereby resisting evaporation and wash off. However, many commonly used adjuvants are toxic and non-biodegradable in the natural environment. For example, some adjuvants comprise latex or silicone, which do not readily biodegrade in the environment, or chemicals like nonylphenol ethoxylates which are extremely toxic to aquatic organisms. Accordingly, there is a need in the art for more environmentally friendly adjuvants that remain equally effective in enhancing agrochemical activity.

In addition, one of the problems associated with spray application is "spray drift", which occurs when mist or fine droplets of spray do not reach the intended target. Spray drift is the physical movement of spray droplets (and their dried remnants) through the air from the spray applicator nozzle to any off-target site at the time of spray application or soon thereafter. The off-target material is typically ineffective waste, implicating the environmental issues noted above and constituting an economic loss. Accordingly, there is also a need in the art for more environmentally friendly adjuvants that can effectively reduce or eliminate the unwanted effects of spray drift.

SUMMARY

In one aspect, the embodiments described herein are directed to gum-based adjuvant compositions for use in combination with agrochemicals to improve the effectiveness of said agrochemical. The gum-based adjuvant compositions comprise one or more gums, and preferably two or more gums that in combination exhibit markedly different characteristics than any gum alone. One of ordinary skill in the art will appreciate that based on their individual properties and grades, two or more gums may be blended at a variety of different ratios in the production of the gum-based adjuvant compositions to achieve the desired functionality. In certain example embodiments the gums may be present in equal amounts, while in other cases one or more ingredients may be predominant. The gums may include gum acacia, modified gum acacia (MGA, gum acacia esterified with octenyl succinic acid (OSA)), guar gum, cellulosics (e.g. carboxymethylcellulose (CMC), hydroxypropylmethylcellulose (HPMC), ethylcellulose (EC) and methylcellulose (MC)), xanthan gum, konjac, carrageenans (including lamda, kappa and iota carrageenans), and alginates (e.g., sodium alginate, ammonium alginate, calcium alginate, propylene glycol alginate (PGA)). The adjuvant compositions may also optionally include additional components selected from the group consisting of polyols, translocation aids, emulsifiers, and surfactants. Example polyols include sugar alcohols, such as, but not limited to glycerol. Example translocation aids include, but are not limited to, short-chained linoleic acid molecules such as those derived from hydrolyzed flaxseed or flaxseed oil. Example emulsifiers include, but are not limited to, starches or gum acacia, treated or untreated with OSA. Example surfactants include, but are not limited, to natural surfactants such as soapbark extract, oil seed-derived surfactants, or alkyl polyglycosides.

In another aspect, the embodiments described herein are related to gum-based adjuvant compositions for use in combination with agrochemicals to improve the effectiveness of said agrochemical made using a process comprising adding one or more gums to an aqueous solvent at room temperature and under agitation, and then optionally adding one or more polyols to the aqueous solvent at room temperature and under agitation.

In another aspect, the embodiments described herein are directed to agrochemical compositions comprising the gum-based adjuvants described herein diluted in an aqueous solvent with an effective amount of one or more agrochemicals. The agrochemical may be an herbicide, fungicide, insecticide, plant growth regulator, bactericide, or acaracide. In one example embodiment, the agrochemical consists essentially of one or more herbicides. In an example embodiment, the herbicide is an aromatic acid herbicide, such as dicamba. In another example embodiment, the herbicide is a benzoylcyclohexanedione herbicide such as mesotrione. In another example embodiment, the herbicide is an organophosphorous herbicide such as glyphosate. In another example embodiment, the agrochemical consists essentially of one or more fungicides. In another example embodiment, the agrochemical consists essentially of one or more insecticides. In another example embodiment, the agrochemical consists essentially of one or more plant growth regulators. In another example embodiment, the agrochemical consists essentially of one or more bactericides. In another example embodiment, the agrochemical consists essentially of one or more acaricides.

In another aspect, the embodiments disclosed herein are directed to methods of improving the effectiveness of an agrochemical spray solution by diluting a gum-based adjuvant disclosed herein in an aqueous solvent with an effective amount of one or more agrochemicals, and applying the resulting agrochemical solution to a target plant or crop site before or after emergence of said plant or crop. Improving the effectiveness of an agrochemical includes one or more of improving deposition on and adhesion to foliage of a target plant, increasing resistance to evaporation and wash-off, improving translocation of the agrochemical from leaf to root, or reducing off-target spray drift.

In another aspect, the embodiments disclosed herein are directed to methods of increasing the average diameter of droplets in an agrochemical spray comprising diluting a gum-based adjuvant composition disclosed herein in an aqueous solvent with an effective amount of one or more agrochemicals, and applying the resulting agrochemical solution to a target plant or crop using a spray application. In certain example embodiments, the average droplet size of the droplets in the agrochemical spray is between 10 and 1,000 microns.

In another aspect, the embodiments disclosed herein are directed to methods of reducing agrochemical spray drift when applying an agrochemical solution to a target plant or crop site comprising spraying an agrochemical solution comprising a gum-based adjuvant composition disclosed herein diluted in an aqueous solvent with an effective amount of one or more agrochemicals.

These and other aspects, objects, features, and advantages of the example embodiments will become apparent to those having ordinary skill in the art upon consideration of the following detailed description of illustrated example embodiments.

DETAILED DESCRIPTION OF THE EXAMPLE EMBODIMENTS

Overview

Figure 1:
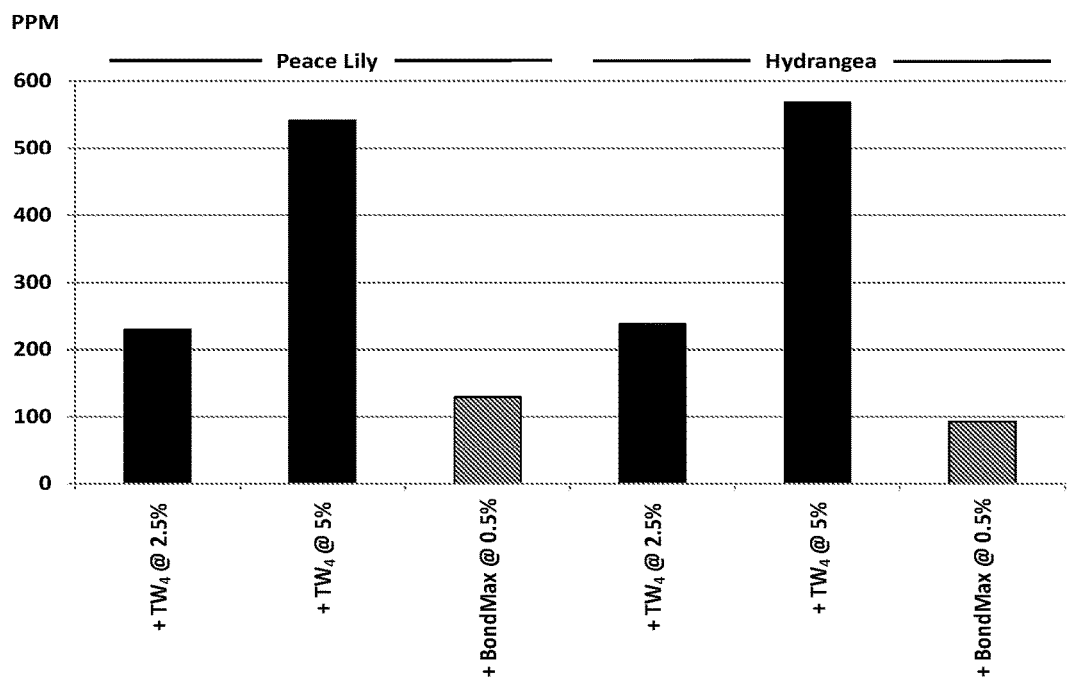
FIG. 1 is a bar graph showing agrochemical residues remaining on foliage after spray application of compositions comprising metolachlor in combination with either an example adjuvant formulation or the commercially available adjuvant BondMax®. The agrochemical/adjuvant compositions were sprayed on peace lily or hydrangea until run-off and allowed to dry for six hours.

Embodiments disclosed herein represent adjuvants for agrochemical formulations comprising active ingredients such as herbicides, pesticides, fungicides, and other environmentally applied active ingredients. The adjuvants enhance the effectiveness of the active ingredients by improving, for example, deposition on and adhesion to foliage, resistance to evaporation and wash-off, translocation of the agrochemical from leaf to root, and drift reduction of aerial spray formulations to off-target crops. Further benefits of the present invention are enhanced biodegradation of the adjuvant ingredients compared to traditional adjuvants and reduction of the amount of active ingredient required to cover a given acreage. Both of these benefits result in positive environmental effects by reducing the amount of non-biodegradable and potentially hazardous chemicals released into the environment as a result of measures taken by agricultural and other industries to control pests and improve crop yields.

The adjuvants are formed in aqueous formulations from dry gum ingredients or blends to produce concentrates consisting of the desired percentage of each component, weight to volume (w/v). The concentrate may then be diluted in an aqueous solvent, prior to, or following the addition of, an effective amount of an agrochemical active ingredient, to achieve a final agrochemical application solution. Other ingredients may be added optionally to each formulation. The final application solution of active ingredient and adjuvant may then be applied to a plant or crop target site using a standard application method, such as spraying.

Adjuvant Composition

As used herein "gum" or "gums" refers to colloidal polysaccharide substances with or without minor constituents, such as protein or fat, which are mostly plant-based but may be produced by other organisms such as bacteria. Gums are not digestible by humans and may be considered soluble fiber when used as food ingredients, but may include insoluble components as well.

Some of the adjuvant compositions comprise blends of gums that demonstrate markedly different characteristics than each individual gum alone. Table 1 lists some example embodiments of dry gum blends tested by the applicants and the range of useful ratios in terms of dry weight. In the context of the embodiments disclosed herein, the capacity of certain gums and gum combinations to interact with water allows for increased or maintained viscosities of solutions containing agrochemicals and optionally other components. Additionally, certain gums and gum combinations have the capacity to alter the rheological characteristics of an agrochemical solution such that larger droplets can be formed when the solution is sprayed. Thus the dry gums and gum blends prepared by the applicants were added to aqueous solvents at the concentrations recited throughout the application in preparation of useful gum-based adjuvants.

TABLE 1

Ranges of Dry Blend Ratios for Selected Gum Blends

| Blend | Range of Ratios |
|---|---|
| Xanthan gum:Konjac | 1:6 to 6:1 |
| Carrageenan:MC | 1:4 to 4:1 |
| MC:Sodium alginate | 1:4 to 4:1 |
| CMC:MC | 1:6 to 6:1 |
| MC:Konjac | 1:4 to 4:1 |
| MC:Guar gum | 1:6 to 4:1 |
| MC:Xanthan gum | 1:4 to 4:1 |

TABLE 1-continued

Ranges of Dry Blend Ratios for Selected Gum Blends

| Blend | Range of Ratios |
|---|---|
| MC:Pectin | 1:2 to 2:1 |
| Carrageenan:HPMC | 1:4 to 4:1 |
| HPMC:Sodium alginate | 1:4 to 4:1 |
| CMC:HPMC | 1:6 to 2:1 |
| HPMC:Konjac | 1:4 to 4:1 |
| HPMC:Guar gum | 1:6 to 4:1 |
| HPMC:Xanthan gum | 1:4 to 4:1 |
| HPMC:Pectin | 1:8 to 8:1 |
| Carrageenan:PGA | 1:3 to 4:1 |
| CMC:PGA | 1:8 to 8:1 |
| PGA:Konjac | 1:4 to 4:1 |
| PGA:Guar gum | 1:6 to 4:1 |
| PGA:Xanthan gum | 1:4 to 4:1 |
| PGA:Pectin | 1:8 to 8:1 |
| Gum acacia:Xanthan gum | 3:2 to 12:1 |
| MGA:Xanthan gum | 3:2 to 12:1 |

In certain example embodiments, the dry gum blend consists essentially of or consists of xanthan gum and konjac in a 1:6, 1:3, 1:2, 2:3, 5:6, 1:1, 6:5, 3:2, 2:1, 3:1, or 6:1 ratio, respectively. In certain example embodiments, the dry gum blend consists essentially of or consists of carrageenan and MC in a 1:4, 1:2, 3:4, 1:1, 4:3, 2:1, or 4:1 ratio, respectively. In certain example embodiments, the dry gum blend consists essentially of or consists of MC and sodium alginate in a 1:4, 1:2, 3:4, 1:1, 4:3, 2:1, or 4:1 ratio, respectively. In certain example embodiments, the dry gum blend consists essentially of or consists of CMC and MC in 1:6, 1:3, 1:2, 2:3, 5:6, 1:1, 6:5, 3:2, 2:1, 3:1, or 6:1 ratio, respectively. In certain example embodiments, the dry gum blend consists essentially of or consists of MC and konjac in a 1:4, 1:2, 3:4, 1:1, 4:3, 2:1, or 4:1 ratio, respectively. In certain example embodiments, the dry gum blend consists essentially of or consists of MC and guar gum, in a 1:6, 1:3, 1:2, 2:3, 5:6, 1:1, 6:5, 3:2, 2:1, 3:1, 6:1, 5:4, 5:3, 5:2, 5:1, 4:3, or 4:1, ratio respectively. In one example embodiment, the dry gum blend consists essentially of or consists of MC and xanthan gum in a 1:4, 1:2, 3:4, 1:1, 4:3, 2:1, or 4:1 ratio, respectively. In certain example embodiments, the dry gum blend consists essentially of or consists of MC and pectin in a 1:2, 1:1, or 2:1 ratio, respectively. In certain example embodiments, the dry gum blend consists essentially of or consists of carrageenan and HPMC in a 1:4, 1:2, 3:4, 1:1, 4:3, 2:1, or 4:1 ratio, respectively. In certain example embodiments, the dry gum blend consists essentially of or consists of HPMC and sodium alginate in a 1:4, 1:2, 3:4, 1:1, 4:3, 2:1, or 4:1 ratio, respectively. In certain example embodiments, the dry gum blend consists essentially of or consists of CMC and HPMC in a 1:6, 1:3, 1:2, 2:3, 5:6, 1:1, 6:5, 3:2, or 2:1 ratio, respectively. In certain example embodiments, the dry gum blend consists essentially of or consists of HPMC and konjac in a 1:4, 1:2, 3:4, 1:1, 4:3, 2:1, or 4:1 ratio, respectively. In certain example embodiments, the dry gum blend consists essentially of or consists of HPMC and guar gum in a 1:6, 1:3, 1:2, 2:3, 5:6, 1:1, 6:5, 3:2, 2:1, 3:1, 6:1, 5:4, 5:3, 5:2, 5:1, 4:3, or 4:1, ratio respectively. In certain example embodiments, the dry gum blend consists essentially of or consists of HPMC and xanthan gum in a 1:4, 1:2, 3:4, 1:1, 4:3, 2:1, or 4:1 ratio, respectively. In certain example embodiments, the dry gum blend consists essentially of or consists of HPMC and pectin in a 1:8, 1:4, 3:8, 1:2, 5:8, 3:4, 7:8, 1:1, 8:7, 4:3, 8:5, 2:1, 8:3, 4:1, or 8:1 ratio, respectively. In certain example embodiments, the dry gum blend consists essentially of or consists of carrageenan and PGA in a 1:3, 2:3, 1:1, 3:2, 3:1, 4:3, 2:1, or 4:1 ratio, respectively. In certain example embodiments, the dry gum blend consists essentially of or consists of CMC and PGA in a 1:8, 1:4, 3:8, 1:2, 5:8, 3:4, 7:8, 1:1, 8:7, 4:3, 8:5, 2:1, 8:3, 4:1, or 8:1 ratio, respectively. In certain example embodiments, the dry gum blend consists essentially of or consists of PGA and konjac in a 1:4, 1:2, 3:4, 1:1, 4:3, 2:1, or 4:1 ratio, respectively. In certain example embodiments, the dry bum blend consists essentially of or consists of PGA and guar gum in 1:6, 1:3, 1:2, 2:3, 5:6, 1:1, 6:5, 3:2, 2:1, 3:1, 6:1, 5:4, 5:3, 5:2, 5:1, 4:3, or 4:1, ratio respectively. In certain example embodiments, the dry gum blend consists essentially of or consists of PGA and xanthan gum in a 1:4, 1:2, 3:4, 1:1, 4:3, 2:1, or 4:1 ratio, respectively. In certain example embodiments, the dry gum blend consists essentially of or consists of PGA and pectin in a 1:8, 1:4, 3:8, 1:2, 5:8, 3:4, 7:8, 1:1, 8:7, 4:3, 8:5, 2:1, 8:3, 4:1, or 8:1 ratio, respectively. In certain example embodiments, the dry gum blend consists essentially of or consists of gum acacia and xanthan gum in a 3:2, 3:1, 1:1, 4:3, 2:1, 4:1, 5:4, 5:3, 5:2, 5:1, 6:5, 3:1, 6:1, 7:6, 7:5, 7:4, 7:3, 7:2, 7:1, 8:7, 8:5, 8:3, 8:1, 9:8, 9:7, 9:5, 9:4, 9:2, 9:1, 10:9, 10:8, 10:3, 10:1, 11:10, 11:9, 11:8, 11:7, 11:6, 11:5, 11:4, 11:3, 11:2, 11:1, 12:11, 12:7, 12:5, or 12:1, ratio respectively. In certain example embodiments, the dry gum blend consists essentially of or consists of MGA and xanthan gum in a 3:2, 3:1, 1:1, 4:3, 2:1, 4:1, 5:4, 5:3, 5:2, 5:1, 6:5, 3:1, 6:1, 7:6, 7:5, 7:4, 7:3, 7:2, 7:1, 8:7, 8:5, 8:3, 8:1, 9:8, 9:7, 9:5, 9:4, 9:2, 9:1, 10:9, 10:8, 10:3, 10:1, 11:10, 11:9, 11:8, 11:7, 11:6, 11:5, 11:4, 11:3, 11:2, 11:1, 12:11, 12:7, 12:5, or 12:1, ratio respectively In certain example embodiments, the gums may include gum acacia, MGA, guar gum, cellulosics, xanthan gum, konjac, carrageenans, alginates and pectin. All percentages of gums or gum blends in aqueous solvents are given as weight/volume percent (w/v). As used throughout this disclosure, the term "approximately" is used to indicate concentrations that are the exact value listed or, in certain instances, concentrations that fall within 0.05% of the recited value.

Xanthan and Konjac

In certain example embodiments, the adjuvant composition comprises xanthan gum, a polysaccharide produced by *Xanthamonis campestris* bacteria, and konjac, a substance derived from the dried corm of the konjac plant that largely comprises glucomannan. While xanthan gum and konjac are able to independently build viscosity in aqueous solution while remaining dissolved, the combination of these two gums can build the viscosity of an aqueous solution much more than either gum alone when the same total amount of both gums is added to the solution. Accordingly, in certain example embodiments, the adjuvant composition comprises, consists essentially of or consists of xanthan gum and konjac added in a 1:1 ratio.

In certain example embodiments, the xanthan gum and konjac blend is added to an aqueous solvent at a concentration of approximately 0.1% to approximately 2.5%, approximately 0.1% to approximately 1%, approximately 0.1% to approximately 0.9%, approximately 0.1% to approximately 0.8%, approximately 0.1% to approximately 0.7%, approximately 0.1% to approximately 0.6%, approximately 0.1% to approximately 0.5%, approximately 0.1% to approximately 0.4%, approximately 0.1% to approximately 0.3%, approximately 0.1% to approximately 0.2%, approximately 1% to approximately 2.5%, approximately 1% to approximately 2.4%, approximately 1% to approximately 2.3%, approximately 1% to approximately 2.2%, approximately 1% to approximately 2.1%, approximately 1% to approximately 2.0%, approximately 1% to approximately 1.9%, approximately 1% to approximately 1.8%, approximately 1% to approximately 1.7%, approximately 1% to approximately 1.6%, approximately 1% to approximately 1.5%, approximately 1% to approximately 1.4%, approximately 1% to approximately 1.3%, approximately 1% to approximately 1.2%, approximately 1% to approximately 1.1%, approximately 2.0% to approximately 2.5%, approximately 2.0% to approximately 2.4%, or approximately 2.0% to approximately 2.3%, approximately 2.0% to approximately 2.2%, approximately 2.0% to approximately 2.1%.

Carboxymethylcellulose and Hydroxypropylmethylcellulose

In certain example embodiments, the adjuvant composition comprises carboxymethylcellulose (CMC) and hydroxypropylmethylcellulose (HPMC), polysaccharides derived from insoluble cellulose fibers extracted from cotton linters or wood pulp that are etherified with carboxymethyl or hydroxypropylmethyl groups, respectively, to create a soluble fiber. The resulting cellulose ethers provide unique rheological characteristics in aqueous solutions including varying levels of viscosity development, film formation capability, and in the case of HPMC, temperature induced gelation. In one example embodiment, the adjuvant composition comprises, consists essentially of or consists of CMC and HPMC. In certain example embodiments, CMC and HPMC are added in a 1:1 to ratio.

In certain example embodiments, the CMC and HPMC blend is added to an aqueous solvent at a concentration of approximately 5% to approximately 20%, approximately 5% to approximately 19%, approximately 5% to approximately 18%, approximately 5% to approximately 17%, approximately 5% to approximately 16%, approximately 5% to approximately 15%, approximately 5% to approximately 14%, approximately 5% to approximately 13%, approximately 5% to approximately 12%, approximately 5% to approximately 11%, approximately 5% to approximately 10%, approximately 5% to approximately 9%, approximately 5% to approximately 8%, approximately 5% to approximately 7%, approximately 5% to approximately 6%, approximately 6% to approximately 20%, approximately 7% to approximately 20%, approximately 8% to approximately 20%, approximately 9% to approximately 20%, 10% to approximately 20%, approximately 11% to approximately 20%, approximately 12% to approximately 20%, approximately 13% to approximately 20%, approximately 14% to approximately 20%, approximately 15% to approximately 20%, approximately 16% to approximately 20%, approximately 17% to approximately 20%, approximately 18% to approximately 20%, approximately 19% to approximately 20%, approximately 5% to approximately 19%, approximately 6% to approximately 18%, approximately 7% to approximately 17%, approximately 8% to approximately 16%, approximately 9% to approximately 15%, approximately 10% to approximately 14%, or approximately 11% to approximately 13%.

In certain example embodiments, the CMC and HPMC blend is added to an aqueous solvent at a concentration of approximately 0.1% to approximately 13%, approximately 1% to approximately 12%, approximately 1% to approximately 11%, approximately 1% to approximately 10%, approximately 1% to approximately 9%, approximately 1% to approximately 8%, approximately 1% to approximately 7%, approximately 1% to approximately 6%, approximately 1% to approximately 5%, approximately 1% to approximately 4%, approximately 1% to approximately 3%, approximately 1% to approximately 2%, approximately 0.1% to approximately 1%, approximately 0.1% to approximately 0.9%, approximately 0.1% to approximately 0.8%, approximately 0.1% to approximately 0.7%, approximately 0.1% to approximately 0.6%, approximately 0.1% to approximately 0.5%, approximately 0.1% to approximately 0.4%, approximately 0.1% to approximately 0.3%, approximately 0.1% to approximately 0.2%, approximately 1% to approximately 1.5%, approximately 1% to approximately 1.4%, approximately 1% to approximately 1.3%, approximately 1% to approximately 1.2%, or approximately 1% to approximately 1.1%. In certain example embodiments, the resulting adjuvant composition may further comprise gum acacia, added at a concentration of approximately 5% to approximately 15%, approximately 5% to approximately 14%, approximately 5% to approximately 13%, approximately 5% to approximately 12%, approximately 5% to approximately 11%, approximately 5% to approximately 10%, approximately 5% to 9%, approximately 5% to approximately 8%, approximately 5% to approximately 7%, approximately 5% to approximately 6%, approximately 6% to approximately 15%, approximately 7% to approximately 15%, approximately 8% to approximately 15%, approximately 9% to approximately 15%, approximately 10% to approximately 15%, approximately 11% to approximately 15%, approximately 12% to approximately 15%, approximately 13% to approximately 15%, or approximately 14% to approximately 15%.

Carrageenan and Propylene Glycol Alginate

In another example embodiment, gums used in the adjuvant composition are carrageenan and propylene glycol alginate (PGA). Carrageenan, derived from various species in of red seaweed, are polysaccharides with a wide variety of viscosity and gel forming characteristics. PGA, derived from various species of brown seaweed, is the reaction product of propylene oxide and alginic acid.

In certain example embodiments, the adjuvant composition comprises, consists essentially of or consists of carrageenan and PGA. In certain example embodiments, the carrageenan and PGA are added in a 1:1 ratio. In certain example embodiments, the carrageenan and PGA blend is added to an aqueous solvent at a concentration of approximately 5% to approximately 30%, approximately 5% to approximately 29%, approximately 5% to approximately 28%, approximately 5% to approximately 27%, approximately 5% to approximately 26%, approximately 5% to approximately 25%, approximately 5% to approximately 24%, approximately 5% to approximately 23%, approximately 5% to approximately 22%, approximately 5% to approximately 21%, approximately 5% to approximately 20%, approximately 5% to approximately 19%, approximately 5% to approximately 18%, approximately 5% to approximately 17%, approximately 5% to approximately 16%, approximately 5% to approximately 15%, approximately 5% to approximately 14%, approximately 5% to approximately 13%, approximately 5% to approximately 12%, approximately 5% to approximately 11%, approximately 5% to approximately 10%, approximately 5% to approximately 9%, approximately 5% to approximately 8%, approximately 5% to approximately 7%, approximately 5% to approximately 6%, approximately 6% to approximately 30%, approximately 7% to approximately 30%, approximately 8% to approximately 30% approximately 9% to approximately 30%, 10% to approximately 30%, approximately 11% to approximately 30%, approximately 12% to approximately 30%, approximately 13% to approximately 30%, approximately 14% to approximately 30%, approximately 15% to approximately 30%, approximately 16%, to approximately 30%, approximately 17% to approximately 30%, approximately 18% to approximately 30%, approximately 19% to approximately 30%, approximately 20% to approximately 30%, approximately 21% to approximately 30%, approximately 22% to approximately 30%, approximately 23% to approximately 30%, approximately 24% to approximately 30%, approximately 25% to approximately 30%, approximately 26% to approximately 30%, approximately 27% to approximately 30%, approximately 28% to approximately 30%, approximately 29% to approximately 30%, approximately 6% to approximately 29%, approximately 7% to approximately 28%, approximately 8% to approximately 27%, approximately 9% to approximately 26%, approximately 10% to approximately 25%, approximately 11% to approximately 24%, approximately 12% to approximately 23%, approximately 13% to approximately 22%, approximately 14% to approximately 21%, approximately 15% to approximately 20%, approximately 16% to approximately 19%, or approximately 17% to approximately 18%.

In certain example embodiments, the 1:1 blend of carrageenan and PGA is added at a concentration of approximately 0.1% to approximately 13%, approximately 1% to approximately 12%, approximately 1% to approximately 11%, approximately 1% to approximately 10%, approximately 1% to approximately 9%, approximately 1% to approximately 8%, approximately 1% to approximately 7%, approximately 1% to approximately 6%, approximately 1% to approximately 5%, approximately 1% to approximately 4%, 1% to approximately 3%, approximately 1% to approximately 2%, approximately 1% to approximately 1.5%, 0.1% to approximately 1%, approximately 0.1% to approximately 0.9%, approximately 0.1% to approximately 0.8%, approximately 0.1% to approximately 0.7%, approximately 0.1% to approximately 0.6%, approximately 0.1% to approximately 0.5%, approximately 0.1% to approximately 0.4%, approximately 0.1% to approximately 0.3%, approximately 0.1% to approximately 0.2%, approximately 1% to approximately 1.5%, approximately 1% to approximately 1.4%, approximately 1% to approximately 1.3%, approximately 1% to approximately 1.2%, or approximately 1% to approximately 1.1%.

In certain example embodiments, the adjuvant composition may further comprise gum acacia, added at a concentration of approximately 5% to approximately 15%, approximately 5% to approximately 14%, approximately 5% to approximately 13%, approximately 5% to approximately 12%, approximately 5% to approximately 11%, approximately 5% to approximately 10%, approximately 5% to 9%, approximately 5% to approximately 8%, approximately 5% to approximately 7%, approximately 5% to approximately 6%, approximately 6% to approximately 15%, approximately 7% to approximately 15%, approximately 8% to approximately 15%, approximately 9% to approximately 15%, approximately 10% to approximately 15%, approximately 11% to approximately 15%, approximately 12% to approximately 15%, approximately 13% to approximately 15%, or approximately 14% to approximately 15%.

Methylcellulose and Pectin

In another example embodiment, the gums used in the adjuvant composition are pectin and MC. Pectin, extracted from citrus peel or apple pumice, is a polysaccharide that provides viscosity, film formation, and gel characteristics. MC, made with the same base material as CMC and HPMC, is cellulose etherified with methyl groups to create a soluble fiber. MC possesses a similar thermal gelation characteristic to that of HPMC and excellent film forming properties.

Accordingly, in certain example embodiments, the adjuvant composition comprises pectin and MC added in a 1:1 ratio.

In one example embodiment, the adjuvant composition comprises, consists essentially of or consists of MC and pectin. In certain example embodiments, the MC and pectin are added in a 1:1 ratio. In certain example embodiments, the MC and pectin blend is added to aqueous solvent at a concentration of 5% to approximately 30%, approximately 5% to approximately 29%, approximately 5% to approximately 28%, approximately 5% to approximately 27%, approximately 5% to approximately 26%, approximately 5% to approximately 25%, approximately 5% to approximately 24%, approximately 5% to approximately 23%, approximately 5% to approximately 22%, approximately 5% to approximately 21%, approximately 5% to approximately 20%, approximately 5% to approximately 19%, approximately 5% to approximately 18%, approximately 5% to approximately 17%, approximately 5% to approximately 16%, approximately 5% to approximately 15%, approximately 5% to approximately 14%, approximately 5% to approximately 13%, approximately 5% to approximately 12%, approximately 5% to approximately 11%, approximately 5% to approximately 10%, approximately 5% to approximately 9%, approximately 5% to approximately 8%, approximately 5% to approximately 7%, approximately 5% to approximately 6%, approximately 6% to approximately 30%, approximately 7% to approximately 30%, approximately 8% to approximately 30% approximately 9% to approximately 30%, 10% to approximately 30%, approximately 11% to approximately 30%, approximately 12% to approximately 30%, approximately 13% to approximately 30%, approximately 14% to approximately 30%, approximately 15% to approximately 30%, approximately 16%, to approximately 30%, approximately 17% to approximately 30%, approximately 18% to approximately 30%, approximately 19% to approximately 30%, approximately 20% to approximately 30%, approximately 21% to approximately 30%, approximately 22% to approximately 30%, approximately 23% to approximately 30%, approximately 24% to approximately 30%, approximately 25% to approximately 30%, approximately 26% to approximately 30%, approximately 27% to approximately 30%, approximately 28% to approximately 30%, approximately 29% to approximately 30%, approximately 6% to approximately 29%, approximately 7% to approximately 28%, approximately 8% to approximately 27%, approximately 9% to approximately 26%, approximately 10% to approximately 25%, approximately 11% to approximately 24%, approximately 12% to approximately 23%, approximately 13% to approximately 22%, approximately 14% to approximately 21%, approximately 15% to approximately 20%, approximately 16% to approximately 19%, or approximately 17% to approximately 18%.

In certain example embodiments, the 1:1 blend of pectin and MC is added at a concentration of approximately 0.1% to approximately 20%, approximately 1% to approximately 20%, approximately 1% to approximately 19%, approximately 1% to approximately 18%, approximately 1% to approximately 17%, approximately 1% to approximately 16%, approximately 1% to approximately 15%, approximately 1% to approximately 14%, approximately 1% to approximately 13%, approximately 1% to approximately 12%, approximately 1% to approximately 11%, approximately 1% to approximately 10%, approximately 1% to approximately 9%, approximately 1% to approximately 8%, approximately 1% to approximately 7%, approximately 1% to approximately 6%, approximately 1% to approximately 5%, approximately 1% to approximately 4%, 1% to approximately 3%, approximately 1% to approximately 2%, approximately 1% to approximately 1.5%, 0.1% to approximately 1%, approximately 0.1% to approximately 0.9%, approximately 0.1% to approximately 0.8%, approximately 0.1% to approximately 0.7%, approximately 0.1% to approximately 0.6%, approximately 0.1% to approximately 0.5%, approximately 0.1% to approximately 0.4%, approximately 0.1% to approximately 0.3%, approximately 0.1% to approximately 0.2%, approximately 1% to approximately 1.5%, approximately 1% to approximately 1.4%, approximately 1% to approximately 1.3%, approximately 1% to approximately 1.2%, approximately 1% to approximately 1.1%.

In certain example embodiments, the adjuvant composition may further comprise gum acacia, added at a concentration of approximately 5% to approximately 15%, approximately 5% to approximately 14%, approximately 5% to approximately 13%, approximately 5% to approximately 12%, approximately 5% to approximately 11%, approximately 5% to approximately 10%, approximately 5% to 9%, approximately 5% to approximately 8%, approximately 5% to approximately 7%, approximately 5% to approximately 6%, approximately 6% to approximately 15%, approximately 7% to approximately 15%, approximately 8% to approximately 15%, approximately 9% to approximately 15%, approximately 10% to approximately 15%, approximately 11% to approximately 15%, approximately 12% to approximately 15%, approximately 13% to approximately 15%, or approximately 14% to approximately 15%.

Carrageenan and Methylcellulose

In certain example embodiments, the adjuvant composition comprises, consists essentially of or consists of carrageenan and MC. In certain example embodiments the carrageenan and MC are added in a 1:1 ratio. In certain example embodiments, the carrageenan and MC blend is added to aqueous solvent at a concentration of approximately 5% to approximately 20%, approximately 5% to approximately 19%, approximately 5% to approximately 18%, approximately 5% to approximately 17%, approximately 5% to approximately 16%, approximately 5% to approximately 15%, approximately 5% to approximately 14%, approximately 5% to approximately 13%, approximately 5% to approximately 12%, approximately 5% to approximately 11%, approximately 5% to approximately 10%, approximately 5% to approximately 9%, approximately 5% to approximately 8%, approximately 5% to approximately 7%, approximately 5% to approximately 6%, approximately 6% to approximately 20%, approximately 7% to approximately 20%, approximately 8% to approximately 20%, approximately 9% to approximately 20%, 10% to approximately 20%, approximately 11% to approximately 20%, approximately 12% to approximately 20%, approximately 13% to approximately 20%, approximately 14% to approximately 20%, approximately 15% to approximately 20%, approximately 16% to approximately 20%, approximately 17% to approximately 20%, approximately 18% to approximately 20%, approximately 19% to approximately 20%, approximately 5% to approximately 19%, approximately 6% to approximately 18%, approximately 7% to approximately 17%, approximately 8% to approximately 16%, approximately 9% to approximately 15%, approximately 10% to approximately 14%, or approximately 11% to approximately 13%.

Methylcellulose and Alginate

In another example embodiment, the adjuvant composition comprises, consists essentially of or consists of MC and an alginate selected from the group consisting of sodium alginate, ammonium alginate, calcium alginate, PGA and combinations thereof. In certain example embodiments, the MC and the alginate are added in a 1:1 ratio. In certain example embodiments, the MC and alginate blend is added to aqueous solvent at a concentration of approximately 5% to approximately 20%, approximately 5% to approximately 19%, approximately 5% to approximately 18%, approximately 5% to approximately 17%, approximately 5% to approximately 16%, approximately 5% to approximately 15%, approximately 5% to approximately 14%, approximately 5% to approximately 13%, approximately 5% to approximately 12%, approximately 5% to approximately 11%, approximately 5% to approximately 10%, approximately 5% to approximately 9%, approximately 5% to approximately 8%, approximately 5% to approximately 7%, approximately 5% to approximately 6%, approximately 6% to approximately 20%, approximately 7% to approximately 20%, approximately 8% to approximately 20%, approximately 9% to approximately 20%, 10% to approximately 20%, approximately 11% to approximately 20%, approximately 12% to approximately 20%, approximately 13% to approximately 20%, approximately 14% to approximately 20%, approximately 15% to approximately 20%, approximately 16% to approximately 20%, approximately 17% to approximately 20%, approximately 18% to approximately 20%, approximately 19% to approximately 20%, approximately 5% to approximately 19%, approximately 6% to approximately 18%, approximately 7% to approximately 17%, approximately 8% to approximately 16%, approximately 9% to approximately 15%, approximately 10% to approximately 14%, or approximately 11% to approximately 13%.

Carboxymethylcellulose and Methylcellulose

In one example embodiment, the adjuvant composition comprises, consists essentially of or consists of CMC and MC. In certain example embodiments, the CMC and MC are added in a 1:1 ratio. In certain example embodiments, the CMC and MC blend is added to aqueous solvent at a concentration of approximately 5% to approximately 30%, approximately 5% to approximately 29%, approximately 5% to approximately 28%, approximately 5% to approximately 27%, approximately 5% to approximately 26%, approximately 5% to approximately 25%, approximately 5% to approximately 24%, approximately 5% to approximately 23%, approximately 5% to approximately 22%, approximately 5% to approximately 21%, approximately 5% to approximately 20%, approximately 5% to approximately 19%, approximately 5% to approximately 18%, approximately 5% to approximately 17%, approximately 5% to approximately 16%, approximately 5% to approximately 15%, approximately 5% to approximately 14%, approximately 5% to approximately 13%, approximately 5% to approximately 12%, approximately 5% to approximately 11%, approximately 5% to approximately 10%, approximately 5% to approximately 9%, approximately 5% to approximately 8%, approximately 5% to approximately 7%, approximately 5% to approximately 6%, approximately 6% to approximately 30%, approximately 7% to approximately 30%, approximately 8% to approximately 30% approximately 9% to approximately 30%, 10% to approximately 30%, approximately 11% to approximately 30%, approximately 12% to approximately 30%, approximately 13% to approximately 30%, approximately 14% to approximately 30%, approximately 15% to approximately 30%, approximately 16%, to approximately 30%, approximately 17% to approximately 30%, approximately 18% to approximately 30%, approximately 19% to approximately 30%, approximately 20% to approximately 30%, approximately 21% to approximately 30%, approximately 22% to approximately 30%, approximately 23% to approximately 30%, approximately 24% to approximately 30%, approximately 25% to approximately 30%, approximately 26% to approximately 30%, approximately 27% to approximately 30%, approximately 28% to approximately 30%, approximately 29% to approximately 30%, approximately 6% to approximately 29%, approximately 7% to approximately 28%, approximately 8% to approximately 27%, approximately 9% to approximately 26%, approximately 10% to approximately 25%, approximately 11% to approximately 24%, approximately 12% to approximately 23%, approximately 13% to approximately 22%, approximately 14% to approximately 21%, approximately 15% to approximately 20%, approximately 16% to approximately 19%, or approximately 17% to approximately 18%.

Methylcellulose and Konjac

In one example embodiment, the adjuvant composition comprises, consists essentially of or consists of MC and konjac. In certain example embodiments, MC and konjac are added in a 1:1 to ratio. In certain example embodiments, the MC and konjac blend is added to aqueous solvent at a concentration of approximately 5% to approximately 20%, approximately 5% to approximately 19%, approximately 5% to approximately 18%, approximately 5% to approximately 17%, approximately 5% to approximately 16%, approximately 5% to approximately 15%, approximately 5% to approximately 14%, approximately 5% to approximately 13%, approximately 5% to approximately 12%, approximately 5% to approximately 11%, approximately 5% to approximately 10%, approximately 5% to approximately 9%, approximately 5% to approximately 8%, approximately 5% to approximately 7%, approximately 5% to approximately 6%, approximately 6% to approximately 20%, approximately 7% to approximately 20%, approximately 8% to approximately 20%, approximately 9% to approximately 20%, 10% to approximately 20%, approximately 11% to approximately 20%, approximately 12% to approximately 20%, approximately 13% to approximately 20%, approximately 14% to approximately 20%, approximately 15% to approximately 20%, approximately 16% to approximately 20%, approximately 17% to approximately 20%, approximately 18% to approximately 20%, approximately 19% to approximately 20%, approximately 5% to approximately 19%, approximately 6% to approximately 18%, approximately 7% to approximately 17%, approximately 8% to approximately 16%, approximately 9% to approximately 15%, approximately 10% to approximately 14%, or approximately 11% to approximately 13%.

Methylcellulose and Guar Gum

In one example embodiment, the adjuvant composition comprises, consists essentially of or consists of MC and guar gum. In certain example embodiments, MC and guar gum are added in a 1:1 to ratio. In certain example embodiments, the MC and guar gum blend is added to aqueous solvent at a concentration of approximately 5% to approximately 30%, approximately 5% to approximately 29%, approximately 5% to approximately 28%, approximately 5% to approximately 27%, approximately 5% to approximately 26%, approximately 5% to approximately 25%, approximately 5% to approximately 24%, approximately 5% to approximately 23%, approximately 5% to approximately 22%, approximately 5% to approximately 21%, approximately 5% to approximately 20%, approximately 5% to approximately 19%, approximately 5% to approximately 18%, approximately 5% to approximately 17%, approximately 5% to approximately 16%, approximately 5% to approximately 15%, approximately 5% to approximately 14%, approximately 5% to approximately 13%, approximately 5% to approximately 12%, approximately 5% to approximately 11%, approximately 5% to approximately 10%, approximately 5% to approximately 9%, approximately 5% to approximately 8%, approximately 5% to approximately 7%, approximately 5% to approximately 6%, approximately 6% to approximately 30%, approximately 7% to approximately 30%, approximately 8% to approximately 30% approximately 9% to approximately 30%, 10% to approximately 30%, approximately 11% to approximately 30%, approximately 12% to approximately 30%, approximately 13% to approximately 30%, approximately 14% to approximately 30%, approximately 15% to approximately 30%, approximately 16%, to approximately 30%, approximately 17% to approximately 30%, approximately 18% to approximately 30%, 19% to approximately 30%, 20% to approximately 30%, approximately 21% to approximately 30%, approximately 22% to approximately 30%, approximately 23% to approximately 30%, approximately 24% to approximately 30%, approximately 25% to approximately 30%, approximately 26% to approximately 30%, approximately 27% to approximately 30%, approximately 28% to approximately 30%, approximately 29% to approximately 30%, approximately 6% to approximately 29%, approximately 7% to approximately 28%, approximately 8% to approximately 27%, approximately 9% to approximately 26%, approximately 10% to approximately 25%, approximately 11% to approximately 24%, approximately 12% to approximately 23%, approximately 13% to approximately 22%, approximately 14% to approximately 21%, approximately 15% to approximately 20%, approximately 16% to approximately 19%, or approximately 17% to approximately 18%.

Methylcellulose and Xanthan Gum

In one example embodiment, the adjuvant composition comprises, consists essentially of or consists of MC and xanthan gum. In certain example embodiments, MC and xanthan gum are added in a 1:1 to ratio. In certain example embodiments MC and xanthan gum blend is added to aqueous solvent at a concentration of approximately 5% to approximately 20%, approximately 5% to approximately 19%, approximately 5% to approximately 18%, approximately 5% to approximately 17%, approximately 5% to approximately 16%, approximately 5% to approximately 15%, approximately 5% to approximately 14%, approximately 5% to approximately 13%, approximately 5% to approximately 12%, approximately 5% to approximately 11%, approximately 5% to approximately 10%, approximately 5% to approximately 9%, approximately 5% to approximately 8%, approximately 5% to approximately 7%, approximately 5% to approximately 6%, approximately 6% to approximately 20%, approximately 7% to approximately 20%, approximately 8% to approximately 20%, approximately 9% to approximately 20%, 10% to approximately 20%, approximately 11% to approximately 20%, approximately 12% to approximately 20%, approximately 13% to approximately 20%, approximately 14% to approximately 20%, approximately 15% to approximately 20%, approximately 16% to approximately 20%, approximately 17% to approximately 20%, approximately 18% to approximately 20%, approximately 19% to approximately 20%, approximately 5% to approximately 19%, approximately 6% to approximately 18%, approximately 7% to approximately 17%, approximately 8% to approximately 16%, approximately 9% to approximately 15%, approximately 10% to approximately 14%, or approximately 11% to approximately 13%.

Carrageenan and HPMC

In one example embodiment, the adjuvant composition comprises, consists essentially of or consists of carrageenan and HPMC. In certain example embodiments, carrageenan and HPMC are added in a 1:1 to ratio. In certain example embodiments, the carrageenan and HPMC blend is added to aqueous solvent at a concentration of approximately 5% to approximately 20%, approximately 5% to approximately 19%, approximately 5% to approximately 18%, approximately 5% to approximately 17%, approximately 5% to approximately 16%, approximately 5% to approximately 15%, approximately 5% to approximately 14%, approximately 5% to approximately 13%, approximately 5% to approximately 12%, approximately 5% to approximately 11%, approximately 5% to approximately 10%, approximately 5% to approximately 9%, approximately 5% to approximately 8%, approximately 5% to approximately 7%, approximately 5% to approximately 6%, approximately 6% to approximately 20%, approximately 7% to approximately 20%, approximately 8% to approximately 20%, approximately 9% to approximately 20%, 10% to approximately 20%, approximately 11% to approximately 20%, approximately 12% to approximately 20%, approximately 13% to approximately 20%, approximately 14% to approximately 20%, approximately 15% to approximately 20%, approximately 16% to approximately 20%, approximately 17% to approximately 20%, approximately 18% to approximately 20%, approximately 19% to approximately 20%, approximately 5% to approximately 19%, approximately 6% to approximately 18%, approximately 7% to approximately 17%, approximately 8% to approximately 16%, approximately 9% to approximately 15%, approximately 10% to approximately 14%, or approximately 11% to approximately 13%.

HPMC and Alginate

In another example embodiment, the adjuvant composition comprises, consists essentially of or consists of HPMC and an alginate selected from the group consisting of sodium alginate, ammonium alginate, calcium alginate and PGA. In certain example embodiments, the HPMC and the alginate are added in a 1:1 ratio. In certain example embodiments, the HPMC and alginate blend is added to aqueous solvent at a concentration of 5% to approximately 20%, approximately 5% to approximately 19%, approximately 5% to approximately 18%, approximately 5% to approximately 17%, approximately 5% to approximately 16%, approximately 5% to approximately 15%, approximately 5% to approximately 14%, approximately 5% to approximately 13%, approximately 5% to approximately 12%, approximately 5% to approximately 11%, approximately 5% to approximately 10%, approximately 5% to approximately 9%, approximately 5% to approximately 8%, approximately 5% to approximately 7%, approximately 5% to approximately 6%, approximately 6% to approximately 20%, approximately 7% to approximately 20%, approximately 8% to approximately 20%, approximately 9% to approximately 20%, 10% to approximately 20%, approximately 11% to approximately 20%, approximately 12% to approximately 20%, approximately 13% to approximately 20%, approximately 14% to approximately 20%, approximately 15% to approximately 20%, approximately 16% to approximately 20%, approximately 17% to approximately 20%, approximately 18% to approximately 20%, approximately 19% to approximately 20%, approximately 5% to approximately 19%, approximately 6% to approximately 18%, approximately 7% to approximately 17%, approximately 8% to approximately 16%, approximately 9% to approximately 15%, approximately 10% to approximately 14%, or approximately 11% to approximately 13%.

HPMC and Konjac

In one example embodiment, the adjuvant composition comprises, consists essentially of or consists of HPMC and konjac. In certain example embodiments, HPMC and konjac are added in a 1:1 to ratio. In certain example embodiments, the HPMC and konjac blend is added to aqueous solvent at a concentration of 5% to approximately 20%, approximately 5% to approximately 19%, approximately 5% to approximately 18%, approximately 5% to approximately 17%, approximately 5% to approximately 16%, approximately 5% to approximately 15%, approximately 5% to approximately 14%, approximately 5% to approximately 13%, approximately 5% to approximately 12%, approximately 5% to approximately 11%, approximately 5% to approximately 10%, approximately 5% to approximately 9%, approximately 5% to approximately 8%, approximately 5% to approximately 7%, approximately 5% to approximately 6%, approximately 6% to approximately 20%, approximately 7% to approximately 20%, approximately 8% to approximately 20%, approximately 9% to approximately 20%, 10% to approximately 20%, approximately 11% to approximately 20%, approximately 12% to approximately 20%, approximately 13% to approximately 20%, approximately 14% to approximately 20%, approximately 15% to approximately 20%, approximately 16% to approximately 20%, approximately 17% to approximately 20%, approximately 18% to approximately 20%, approximately 19% to approximately 20%, approximately 5% to approximately 19%, approximately 6% to approximately 18%, approximately 7% to approximately 17%, approximately 8% to approximately 16%, approximately 9% to approximately 15%, approximately 10% to approximately 14%, or approximately 11% to approximately 13%.

HPMC and Guar Gum

In one example embodiment, the adjuvant composition comprises, consists essentially of or consists of HPMC and guar gum. In certain example embodiments, the HPMC and guar gum are added in a 1:1 ratio. In certain example embodiments, the HPMC and guar gum blend is added to aqueous solvent at a concentration of approximately 5% to approximately 30%, approximately 5% to approximately 29%, approximately 5% to approximately 28%, approximately 5% to approximately 27%, approximately 5% to approximately 26%, approximately 5% to approximately 25%, approximately 5% to approximately 24%, approximately 5% to approximately 23%, approximately 5% to approximately 22%, approximately 5% to approximately 21%, approximately 5% to approximately 20%, approximately 5% to approximately 19%, approximately 5% to approximately 18%, approximately 5% to approximately 17%, approximately 5% to approximately 16%, approximately 5% to approximately 15%, approximately 5% to approximately 14%, approximately 5% to approximately 13%, approximately 5% to approximately 12%, approximately 5% to approximately 11%, approximately 5% to approximately 10%, approximately 5% to approximately 9%, approximately 5% to approximately 8%, approximately 5% to approximately 7%, approximately 5% to approximately 6%, approximately 6% to approximately 30%, approximately 7% to approximately 30%, approximately 8% to approximately 30% approximately 9% to approximately 30%, 10% to approximately 30%, approximately 11% to approximately 30%, approximately 12% to approximately 30%, approximately 13% to approximately 30%, approximately 14% to approximately 30%, approximately 15% to approximately 30%, approximately 16%, to approximately 30%, approximately 17% to approximately 30%, approximately 18% to approximately 30%, approximately 19% to approximately 30%, approximately 20% to approximately 30%, approximately 21% to approximately 30%, approximately 22% to approximately 30%, approximately 23% to approximately 30%, approximately 24% to approximately 30%, approximately 25% to approximately 30%, approximately 26% to approximately 30%, approximately 27% to approximately 30%, approximately 28% to approximately 30%, approximately 29% to approximately 30%, approximately 6% to approximately 29%, approximately 7% to approximately 28%, approximately 8% to approximately 27%, approximately 9% to approximately 26%, approximately 10% to approximately 25%, approximately 11% to approximately 24%, approximately 12% to approximately 23%, approximately 13% to approximately 22%, approximately 14% to approximately 21%, approximately 15% to approximately 20%, approximately 16% to approximately 19%, or approximately 17% to approximately 18%.

HPMC and Xanthan Gum

In one example embodiment, the adjuvant composition comprises, consists essentially of or consists of HPMC and xanthan gum. In certain example embodiments, HPMC and xanthan gum are added in a 1:1 to ratio. In certain example embodiments, the HPMC and xanthan gum blend is added to aqueous solvent at a concentration of approximately 5% to approximately 20%, approximately 5% to approximately 19%, approximately 5% to approximately 18%, approximately 5% to approximately 17%, approximately 5% to approximately 16%, approximately 5% to approximately 15%, approximately 5% to approximately 14%, approximately 5% to approximately 13%, approximately 5% to approximately 12%, approximately 5% to approximately 11%, approximately 5% to approximately 10%, approximately 5% to approximately 9%, approximately 5% to approximately 8%, approximately 5% to approximately 7%, approximately 5% to approximately 6%, approximately 6% to approximately 20%, approximately 7% to approximately 20%, approximately 8% to approximately 20%, approximately 9% to approximately 20%, 10% to approximately 20%, approximately 11% to approximately 20%, approximately 12% to approximately 20%, approximately 13% to approximately 20%, approximately 14% to approximately 20%, approximately 15% to approximately 20%, approximately 16% to approximately 20%, approximately 17% to approximately 20%, approximately 18% to approximately 20%, approximately 19% to approximately 20%, approximately 5% to approximately 19%, approximately 6% to approximately 18%, approximately 7% to approximately 17%, approximately 8% to approximately 16%, approximately 9% to approximately 15%, approximately 10% to approximately 14%, or approximately 11% to approximately 13%.

HPMC and Pectin

In one example embodiment, the adjuvant composition comprises, consists essentially of or consists of HPMC and pectin. In certain example embodiments, HPMC and pectin are added in a 1:1 to ratio. In certain example embodiments, the HPMC and pectin blend is added to aqueous solvent at a concentration of approximately 5% to approximately 40%, approximately 5% to approximately 39%, approximately 5% to approximately 38%, approximately 5% to approximately 37%, approximately 5% to approximately 36%, approximately 5% to approximately 35%, approximately 5% to approximately 34%, approximately 5% to approximately 33%, approximately 5% to approximately 32%, approximately 5% to approximately 31%, approximately 5% to approximately 30%, approximately 5% to approximately 29%, approximately 5% to approximately 28%, approximately 5% to approximately 27%, approximately 5% to approximately 26%, approximately 5% to approximately 25%, approximately 5% to approximately 24%, approximately 5% to approximately 23%, approximately 5% to approximately 22%, approximately 5% to approximately 21%, approximately 5% to approximately 20%, approximately 5% to approximately 19%, approximately 5% to approximately 18%, approximately 5% to approximately 17%, approximately 5% to approximately 16%, approximately 5% to approximately 15%, approximately 5% to approximately 14%, approximately 5% to approximately 13%, approximately 5% to approximately 12%, approximately 5% to approximately 11%, approximately 5% to approximately 10%, approximately 5% to approximately 9%, approximately 5% to approximately 8%, approximately 5% to approximately 7%, approximately 5% to approximately 6%, approximately 6% to approximately 40%, approximately 7% to approximately 40%, approximately 8% to approximately 40%, approximately 9% to approximately 40%, approximately 10% to approximately 40%, approximately 11% to approximately 40%, approximately 12% to approximately 40%, approximately 13% to approximately 40%, approximately 14% to approximately 40%, approximately 15% to approximately 40%, approximately 16% to approximately 40%, approximately 17% to approximately 40%, approximately 18% to approximately 40%, approximately 19% to approximately 40%, approximately 20% to approximately 40%, approximately 21% to approximately 40%, approximately 22% to approximately 40%, approximately 23% to approximately 40%, approximately 24% to approximately 40%, approximately 25% to approximately 40%, approximately 26% to approximately 40%, approximately 27% to approximately 40%, approximately 28% to approximately 40%, approximately 29% to approximately 40%, approximately 30% to approximately 40%, approximately 31% to approximately 40%, approximately 32% to approximately 40%, approximately 33% to approximately 40%, approximately 34% to approximately 40%, approximately 35% to approximately 40%, approximately 36% to approximately 40%, approximately 37% to approximately 40%, approximately 38% to approximately 40%, approximately 39% to approximately 40%, approximately 6% to approximately 39%, approximately 7% to approximately 38%, approximately 8% to approximately 37%, approximately 9% to approximately 36%, approximately 10% to approximately 35%, approximately 11% to approximately 34%, approximately 12% to approximately 33%, approximately 13% to approximately 32%, approximately 14% to approximately 31%, approximately 15% to approximately 30%, approximately 16% to approximately 29%, approximately 17% to approximately 28%, approximately 18% to approximately 27%, approximately 19% to approximately 26%, approximately 20% to approximately 25%, approximately 21% to approximately 24%, or approximately 22% to approximately 23%.

CMC and PGA

In one example embodiment, the adjuvant composition comprises, consists essentially of or consists of CMC and PGA. In certain example embodiments, CMC and PGA are added in a 1:1 to ratio. In certain example embodiments, the CMC and PGA blend is added to aqueous solvent at a concentration of approximately 5% to approximately 40%, approximately 5% to approximately 39%, approximately 5% to approximately 38%, approximately 5% to approximately 37%, approximately 5% to approximately 36%, approximately 5% to approximately 35%, approximately 5% to approximately 34%, approximately 5% to approximately 33%, approximately 5% to approximately 32%, approximately 5% to approximately 31%, approximately 5% to approximately 30%, approximately 5% to approximately 29%, approximately 5% to approximately 28%, approximately 5% to approximately 27%, approximately 5% to approximately 26%, approximately 5% to approximately 25%, approximately 5% to approximately 24%, approximately 5% to approximately 23%, approximately 5% to approximately 22%, approximately 5% to approximately 21%, approximately 5% to approximately 20%, approximately 5% to approximately 19%, approximately 5% to approximately 18%, approximately 5% to approximately 17%, approximately 5% to approximately 16%, approximately 5% to approximately 15%, approximately 5% to approximately 14%, approximately 5% to approximately 13%, approximately 5% to approximately 12%, approximately 5% to approximately 11%, approximately 5% to approximately 10%, approximately 5% to approximately 9%, approximately 5% to approximately 8%, approximately 5% to approximately 7%, approximately 5% to approximately 6%, approximately 6% to approximately 40%, approximately 7% to approximately 40%, approximately 8% to approximately 40%, approximately 9% to approximately 40%, approximately 10% to approximately 40%, approximately 11% to approximately 40%, approximately 12% to approximately 40%, approximately 13% to approximately 40%, approximately 14% to approximately 40%, approximately 15% to approximately 40%, approximately 16% to approximately 40%, approximately 17% to approximately 40%, approximately 18% to approximately 40%, approximately 19% to approximately 40%, approximately 20% to approximately 40%, approximately 21% to approximately 40%, approximately 22% to approximately 40%, approximately 23% to approximately 40%, approximately 24% to approximately 40%, approximately 25% to approximately 40%, approximately 26% to approximately 40%, approximately 27% to approximately 40%, approximately 28% to approximately 40%, approximately 29% to approximately 40%, approximately 30% to approximately 40%, approximately 31% to approximately 40%, approximately 32% to approximately 40%, approximately 33% to approximately 40%, approximately 34% to approximately 40%, approximately 35% to approximately 40%, approximately 36% to approximately 40%, approximately 37% to approximately 40%, approximately 38% to approximately 40%, approximately 39% to approximately 40%, approximately 6% to approximately 39%, approximately 7% to approximately 38%, approximately 8% to approximately 37%, approximately 9% to approximately 36%, approximately 10% to approximately 35%, approximately 11% to approximately 34%, approximately 12% to approximately 33%, approximately 13% to approximately 32%, approximately 14% to approximately 31%, approximately 15% to approximately 30%, approximately 16% to approximately 29%, approximately 17% to approximately 28%, approximately 18% to approximately 27%, approximately 19% to approximately 26%, approximately 20% to approximately 25%, approximately 21% to approximately 24%, or approximately 22% to approximately 23%.

PGA and Konjac

In one example embodiment, the adjuvant composition comprises, consists essentially of or consists of PGA and konjac. In certain example embodiments, PGA and konjac are added in a 1:1 to ratio. In certain example embodiments, the PGA and konjac blend is added to aqueous solvent at a concentration of approximately 5% to approximately 20%, approximately 5% to approximately 19%, approximately 5% to approximately 18%, approximately 5% to approximately 17%, approximately 5% to approximately 16%, approximately 5% to approximately 15%, approximately 5% to approximately 14%, approximately 5% to approximately 13%, approximately 5% to approximately 12%, approximately 5% to approximately 11%, approximately 5% to approximately 10%, approximately 5% to approximately 9%, approximately 5% to approximately 8%, approximately 5% to approximately 7%, approximately 5% to approximately 6%, approximately 6% to approximately 20%, approximately 7% to approximately 20%, approximately 8% to approximately 20%, approximately 9% to approximately 20%, 10% to approximately 20%, approximately 11% to approximately 20%, approximately 12% to approximately 20%, approximately 13% to approximately 20%, approximately 14% to approximately 20%, approximately 15% to approximately 20%, approximately 16% to approximately 20%, approximately 17% to approximately 20%, approximately 18% to approximately 20%, approximately 19% to approximately 20%, approximately 5% to approximately 19%, approximately 6% to approximately 18%, approximately 7% to approximately 17%, approximately 8% to approximately 16%, approximately 9% to approximately 15%, approximately 10% to approximately 14%, or approximately 11% to approximately 13%.

PGA and Guar Gum

In one example embodiment, the adjuvant composition comprises, consists essentially of or consists of PGA and guar gum. In certain example embodiments, the PGA and guar gum are added in a 1:1 ratio. In certain example embodiments, the PGA and guar gum blend is added to aqueous solvent at a concentration of approximately 5% to approximately 30%, approximately 5% to approximately 29%, approximately 5% to approximately 28%, approximately 5% to approximately 27%, approximately 5% to approximately 26%, approximately 5% to approximately 25%, approximately 5% to approximately 24%, approximately 5% to approximately 23%, approximately 5% to approximately 22%, approximately 5% to approximately 21%, approximately 5% to approximately 20%, approximately 5% to approximately 19%, approximately 5% to approximately 18%, approximately 5% to approximately 17%, approximately 5% to approximately 16%, approximately 5% to approximately 15%, approximately 5% to approximately 14%, approximately 5% to approximately 13%, approximately 5% to approximately 12%, approximately 5% to approximately 11%, approximately 5% to approximately 10%, approximately 5% to approximately 9%, approximately 5% to approximately 8%, approximately 5% to approximately 7%, approximately 5% to approximately 6%, approximately 6% to approximately 30%, approximately 7% to approximately 30%, approximately 8% to approximately 30% approximately 9% to approximately 30%, 10% to approximately 30%, approximately 11% to approximately 30%, approximately 12% to approximately 30%, approximately 13% to approximately 30%, approximately 14% to approximately 30%, approximately 15% to approximately 30%, approximately 16%, to approximately 30%, approximately 17% to approximately 30%, approximately 18% to approximately 30%, approximately 19% to approximately 30%, approximately 20% to approximately 30%, approximately 21% to approximately 30%, approximately 22% to approximately 30%, approximately 23% to approximately 30%, approximately 24% to approximately 30%, approximately 25% to approximately 30%, approximately 26% to approximately 30%, approximately 27% to approximately 30%, approximately 28% to approximately 30%, approximately 29% to approximately 30%, approximately 6% to approximately 29%, approximately 7% to approximately 28%, approximately 8% to approximately 27%, approximately 9% to approximately 26%, approximately 10% to approximately 25%, approximately 11% to approximately 24%, approximately 12% to approximately 23%, approximately 13% to approximately 22%, approximately 14% to approximately 21%, approximately 15% to approximately 20%, approximately 16% to approximately 19%, or approximately 17% to approximately 18%.

PGA and Xanthan Gum

In one example embodiment, the adjuvant composition comprises, consists essentially of or consists of PGA and xanthan. In certain example embodiments, PGA and xanthan gum are added in a 1:1 to ratio. In certain example embodiments, the PGA and xanthan gum blend is added to aqueous solvent at a concentration of approximately 5% to approximately 20%, approximately 5% to approximately 19%, approximately 5% to approximately 18%, approximately 5% to approximately 17%, approximately 5% to approximately 16%, approximately 5% to approximately 15%, approximately 5% to approximately 14%, approximately 5% to approximately 13%, approximately 5% to approximately 12%, approximately 5% to approximately 11%, approximately 5% to approximately 10%, approximately 5% to approximately 9%, approximately 5% to approximately 8%, approximately 5% to approximately 7%, approximately 5% to approximately 6%, approximately, approximately 6% to approximately 20%, approximately 7% to approximately 20%, approximately 8% to approximately 20%, approximately 9% to approximately 20%, 10% to approximately 20%, approximately 11% to approximately 20%, approximately 12% to approximately 20%, approximately 13% to approximately 20%, approximately 14% to approximately 20%, approximately 15% to approximately 20%, approximately 16% to approximately 20%, approximately 17% to approximately 20%, approximately 18% to approximately 20%, approximately 19% to approximately 20%, approximately 5% to approximately 19%, approximately 6% to approximately 18%, approximately 7% to approximately 17%, approximately 8% to approximately 16%, approximately 9% to approximately 15%, approximately 10% to approximately 14%, or approximately 11% to approximately 13%.

PGA and Pectin

In one example embodiment, the adjuvant composition comprises, consists essentially of or consists of PGA and pectin. In certain example embodiments, PGA and pectin are added in a 1:1 to ratio. In certain example embodiments, the PGA and pectin blend is added to aqueous solvent at a concentration of approximately 5% to approximately 40%, approximately 5% to approximately 39%, approximately 5% to approximately 38%, approximately 5% to approximately 37%, approximately 5% to approximately 36%, approximately 5% to approximately 35%, approximately 5% to approximately 34%, approximately 5% to approximately 33%, approximately 5% to approximately 32%, approximately 5% to approximately 31%, approximately 5% to approximately 30%, approximately 5% to approximately 29%, approximately 5% to approximately 28%, approximately 5% to approximately 27%, approximately 5% to approximately 26%, approximately 5% to approximately 25%, approximately 5% to approximately 24%, approximately 5% to approximately 23%, approximately 5% to approximately 22%, approximately 5% to approximately 21%, approximately 5% to approximately 20%, approximately 5% to approximately 19%, approximately 5% to approximately 18%, approximately 5% to approximately 17%, approximately 5% to approximately 16%, approximately 5% to approximately 15%, approximately 5% to approximately 14%, approximately 5% to approximately 13%, approximately 5% to approximately 12%, approximately 5% to approximately 11%, approximately 5% to approximately 10%, approximately 5% to approximately 9%, approximately 5% to approximately 8%, approximately 5% to approximately 7%, approximately 5% to approximately 6%, approximately 6% to approximately 40%, approximately 7% to approximately 40%, approximately 8% to approximately 40%, approximately 9% to approximately 40%, approximately 10% to approximately 40%, approximately 11% to approximately 40%, approximately 12% to approximately 40%, approximately 13% to approximately 40%, approximately 14% to approximately 40%, approximately 15% to approximately 40%, approximately 16% to approximately 40%, approximately 17% to approximately 40%, approximately 18% to approximately 40%, approximately 19% to approximately 40%, approximately 20% to approximately 40%, approximately 21% to approximately 40%, approximately 22% to approximately 40%, approximately 23% to approximately 40%, approximately 24% to approximately 40%, approximately 25% to approximately 40%, approximately 26% to approximately 40%, approximately 27% to approximately 40%, approximately 28% to approximately 40%, approximately 29% to approximately 40%, approximately 30% to approximately 40%, approximately 31% to approximately 40%, approximately 32% to approximately 40%, approximately 33% to approximately 40%, approximately 34% to approximately 40%, approximately 35% to approximately 40%, approximately 36% to approximately 40%, approximately 37% to approximately 40%, approximately 38% to approximately 40%, approximately 39% to approximately 40%, approximately 6% to approximately 39%, approximately 7% to approximately 38%, approximately 8% to approximately 37%, approximately 9% to approximately 36%, approximately 10% to approximately 35%, approximately 11% to approximately 34%, approximately 12% to approximately 33%, approximately 13% to approximately 32%, approximately 14% to approximately 31%, approximately 15% to approximately 30%, approximately 16% to approximately 29%, approximately 17% to approximately 28%, approximately 18% to approximately 27%, approximately 19% to approximately 26%, approximately 20% to approximately 25%, approximately 21% to approximately 24%, or approximately 22% to approximately 23%.

Gum Acacia and Xanthan Gum

In one example embodiment, the adjuvant composition comprises, consists essentially of or consists of gum acacia and xanthan gum. In certain example embodiments, MGA may be substituted for gum acacia. In certain example embodiments, gum acacia or MGA is added to the adjuvant composition at a concentration of approximately 30% to approximately 60%, approximately 30% to approximately 59%, approximately 30% to approximately 58%, approximately 30% to approximately 57%, approximately 30% to approximately 56%, approximately 30% to approximately 55%, approximately 30% to approximately 54%, approximately 30% to approximately 53%, approximately 30% to approximately 52%, approximately 30% to approximately 51%, approximately 30% to approximately 50%, approximately 30% to approximately 49%, approximately 30% to approximately 48%, approximately 30% to approximately 47%, approximately 30% to approximately 46%, approximately 30% to approximately 45%, approximately 30% to approximately 44%, approximately 30% to approximately 43%, approximately 30% to approximately 42%, approximately 30% to approximately 41%, approximately 30% to approximately 40%, approximately 30% to approximately 39%, approximately 30% to approximately 38%, approximately 30% to approximately 37%, approximately 30% to approximately 36%, approximately 30% to approximately 35%, approximately 30% to approximately 34%, approximately 30% to approximately 33%, approximately 30% to approximately 32%, approximately 30% to approximately 31%, approximately 31% to approximately 60%, approximately 32% to approximately 60%, approximately 33% to approximately 60%, approximately 34% to approximately 60%, approximately 35% to approximately 60%, approximately 36% to approximately 60%, approximately 37% to approximately 60%, approximately 38% to approximately 60%, approximately 39% to approximately 60%, approximately 40% to approximately 60%, approximately 41% to approximately 60%, approximately 42% to approximately 60%, approximately 43% to approximately 60%, approximately 44% to approximately 60%, approximately 45% to approximately 46%, approximately 47% to approximately 60%, approximately 48% to approximately 60%, approximately 49% to approximately 60%, approximately 50% to approximately 60%, approximately 51% to approximately 60%, approximately 52% to approximately 60%, approximately 53% to approximately 60%, approximately 54% to approximately 60%, approximately 55% to approximately 60%, approximately 56% to approximately 60%, approximately 57% to approximately 60%, approximately 58% to approximately 60%, approximately 59% to approximately 60%, approximately 31% to approximately 59%, approximately 32% to approximately 58%, approximately 33% to approximately 57%, approximately 34% to approximately 56%, approximately 35% to approximately 55%, approximately 36% to approximately 54%, approximately 37% to approximately 53%, approximately 38% to approximately 52%, approximately 39% to approximately 51%, approximately 40% to approximately 50%, approximately 41% to approximately 49%, approximately 42% to approximately 48%, approximately 43% to approximately 47%, or approximately 44% to approximately 46%.

In certain example embodiments, xanthan gum is added to the adjuvant composition at a concentration of approximately 5% to approximately 20%, approximately 5% to approximately 19%, approximately 5% to approximately 18%, approximately 5% to approximately 17%, approximately 5% to approximately 16%, approximately 5% to approximately 15%, approximately 5% to approximately 14%, approximately 5% to approximately 13%, approximately 5% to approximately 12%, approximately 5% to approximately 11%, approximately 5% to approximately 10%, approximately 5% to approximately 9%, approximately 5% to approximately 8%, approximately 5% to approximately 7%, approximately 5% to approximately 6%, approximately 6% to approximately 20%, approximately 7% to approximately 20%, approximately 8% to approximately 20%, approximately 9% to approximately 20%, 10% to approximately 20%, approximately 11% to approximately 20%, approximately 12% to approximately 20%, approximately 13% to approximately 20%, approximately 14% to approximately 20%, approximately 15% to approximately 20%, approximately 16% to approximately 20%, approximately 17% to approximately 20%, approximately 18% to approximately 20%, approximately 19% to approximately 20%, approximately 5% to approximately 19%, approximately 6% to approximately 18%, approximately 7% to approximately 17%, approximately 8% to approximately 16%, approximately 9% to approximately 15%, approximately 10% to approximately 14%, or approximately 11% to approximately 13%.

Other Gum Equivalents

It is recognized and expected that certain other gums may be readily substituted or added in addition to the above described embodiments. Additional gums that may be substituted or used in addition to those described above include beta glucan, gum ghatti, locust bean gum, gellan gum, larch gum, gum karaya, tara gum, tragacanth, fenugreek, agar, pullulan, and flaxseed gum.

Polyols

In certain example embodiments, any of the above described adjuvant compositions may further comprise one or more polyols. As used herein a polyol is an alcohol containing two or more hydroxyl groups. In certain example embodiments, the polyol is a sugar alcohol. Example sugar alcohols for use in the embodiments disclosed herein include, but are not limited to, arabitol, erythritol, glycerol, isomalt, lactitol, maltitol, mannitol, sorbitol, xylitol, or combinations thereof. In certain example embodiments, the sugar alcohol is glycerol or sorbitol. In certain example embodiments, the polyols are capable of modifying the surface energy of diluted gum solutions to enable those solutions to spread across the surface area of a target such as a leaf, thereby covering more of the leaf surface per volume applied as compared to a solution containing the gum solution without a polyol component. Accordingly, in certain example embodiments, the polyol acts as a dispersing agent or dispersant.

In certain example embodiments, the adjuvant composition comprises, consists essentially of or consist of a 1:1 blend of xanthan gum and konjac added to aqueous solvent with one or more polyols. In certain example embodiments, the polyol is polyvinyl alcohol. In other example embodiments, the polyol is a sugar alcohol. In one example embodiment, the sugar alcohol is selected from the group consisting of glycerol and sorbitol. In one example embodiment, the adjuvant composition comprises, consists essentially of or consists of a 1:1 xanthan gum and konjac blend in combination with glycerol and at least one other polyol.

In certain example adjuvants, the polyol is at a concentration of approximately 0.6% to approximately 50%, approximately 5% to approximately 40%, approximately 10% to approximately 30%, or approximately 20% to approximately 30%. In certain example embodiments, the polyol concentration is between approximately 0.6% to approximately 10%, approximately 0.6% to approximately 9%, approximately 0.6% to approximately 8%, approximately 0.6% to approximately 7%, approximately 0.6% to approximately 6%, approximately 0.6% to approximately 5%, approximately 0.6% to approximately 4%, approximately 0.6% to approximately 3%, approximately 0.6% to approximately 2%, or approximately 0.6% to approximately 1%. In certain example embodiments, the polyol concentration is between approximately 10% and approximately 25%, approximately 10% and approximately 20%, or approximately 10% and approximately 15%. In certain example embodiments, the polyol concentration is between 25% and 50%, approximately 25% and 45%, approximately 25% and 40%, approximately 25% and approximately 35%, or approximately 25% to approximately 30%. All percentages are percent w/v.

Maltodextrins

In certain example embodiments, the gum-based adjuvant composition may further comprise one or more maltodextrins. As used herein, a maltodextrin is a hydrolysis product of starch resulting in a dextrose equivalency (DE) less than 20. Example maltodextrins for use in embodiments disclosed herein include, but are not limited to, DE5, DE10, and DE15 maltodextrins, or combinations thereof. In certain example embodiments, the maltodextrin acts as a dispersing agent or dispersant.

In certain example adjuvants, the maltodextrin is at a concentration of approximately 0.6% to approximately 50%, approximately 5% to approximately 40%, approximately 10% to approximately 30%, or approximately 20% to approximately 30%. In certain example embodiments, the polyol concentration is between approximately 0.6% to approximately 10%, approximately 0.6% to approximately 9%, approximately 0.6% to approximately 8%, approximately 0.6% to approximately 7%, approximately 0.6% to approximately 6%, approximately 0.6% to approximately 5%, approximately 0.6% to approximately 4%, approximately 0.6% to approximately 3%, approximately 0.6% to approximately 2%, or approximately 0.6% to approximately 1%. In certain example embodiments, the maltodextrin concentration is between approximately 10% and approximately 25%, approximately 10% and approximately 20%, or approximately 10% and approximately 15%. In certain example embodiments, the maltodextrin concentration is between 25% and 50%, approximately 25% and 45%, approximately 25% and 40%, approximately 25% and approximately 35%, or approximately 25% to approximately 30%. All percentages are given as w/v.

Translocation Aids

In certain example embodiments, the adjuvant composition may further comprise one or more translocation aids, defined herein as a molecule that can bind an active ingredient, such as an agrochemical, in solution and form a complex that is small enough to travel with water through the leaf stomata of targeted foliage and penetrate the plant root. Translocation aids for use in the embodiments disclosed herein preferably have low molecular weight and are electrically charged. Materials derived from flaxseed, such as hydrolyzed flaxseed or flaxseed oil, which contain short-chained linoleic acid molecules may be included as translocation aids.

In one example embodiment, the adjuvant composition comprises a 1:1 xanthan gum and konjac blend and a translocation aid. In one example embodiment the translocation aid is hydrolyzed flax seed or flaxseed oil. In another example embodiment, the adjuvant composition comprises xanthan gum and konjac added in a 1:1 ratio, one or more polyols, and a translocation aid. In one example embodiment, the polyoly is glycerol and the translocation aid is hydrolyzed flax seed or flax seed oil.

In certain example embodiments, the translocation aid concentration is between approximately 5% and approximately 25%. In certain example embodiments, the translocation aid concentration is between approximately 5% and 12%, approximately 5% and 11%, approximately 5% and 10%, approximately 5% and approximately 9%, approximately 5% and approximately 8%, approximately 5% and approximately 7%, or approximately 5% and approximately 6%. In another example embodiment, the translocation aid concentration is between approximately 10% and approximately 25%, between approximately 11% and approximately 25%, between approximately 12% and approximately 25%, approximately 13% and approximately 25%, approximately 14% and approximately 25%, approximately 15% and approximately 25%, approximately 16% and approximately 25%, approximately 17% and approximately 25%, approximately 18% and approximately 25%, approximately 19% and approximately 25%, approximately 20% and approximately 25%, approximately 21% and approximately 25%, approximately 22% and approximately 25%, approximately 23% and approximately 25%, or approximately 24% and approximately 25%. In another example embodiment, the translocation aid concentration is between approximately 8% and approximately 15%, approximately 9% and approximately 14%, approximately 10% and approximately 13%, or approximately 11% and approximately 12%.

Emulsifiers

In certain example embodiments, the adjuvant composition may further comprise one or more emulsifiers. Emulsifiers for use in the embodiments disclosed herein keep solid components that may interact with active ingredients uniformly dispersed in water. In certain example embodiments, the emulsifier is a starch, unmodified or modified with octenyl succinic acid. Other example emulsifiers include gum acacia, MGA and quillaia.

In one example embodiment, the adjuvant composition comprises a 1:1 xanthan gum and konjac blend and an emulsifier. In one example embodiment, the emulsifier is a modified starch. In another example embodiment, the emulsifier is gum acacia. In another example embodiment, the emulsifier is MGA. In one example embodiment, the adjuvant composition comprises a 1:1 xanthan gum and konjac blend, a polyol, and an emulsifier. In one example embodiment, the polyol is sugar alcohol and the emulsifier is a modified starch. In one example embodiment, the sugar alcohol is selected from the group consisting of glycerol and sorbitol and the emulsifier is starch, modified starch, MGA or gum acacia.

In certain example embodiments, the emulsifier's concentration is approximately 10% and approximately 60%, approximately 10% and approximately 50%, approximately 10% and approximately 40%, approximately 10% and approximately 30%, or approximately 10% and approximately 20%. In another example embodiment, the emulsifier concentration is between approximately 15% and approximately 35%, approximately 15% and approximately 30%, approximately 15% and approximately 25%, or approximately 15% and approximately 20%. In another example embodiment, the emulsifier concentration is between approximately 20% and approximately 40%, approximately 20% and approximately 35%, approximately 20% and approximately 30%, or approximately 20% and approximately 25%.

Surfactants

In certain example embodiments, the adjuvant composition may further comprise one or more surfactants. The surfactant may be an anionic, cationic, nonionic or amphoteric surfactant, or a combination thereof. Surfactants may serve multiple roles in the adjuvant composition including that of a dispersing agent, an emulsifier, a wetting agent, or a combination thereof. In certain example embodiments, the surfactant is a natural surfactant. An example natural surfactant is soapbark extract, or a seed oil surfactant such as Ecosurf™ SA-9. In another example embodiment, the surfactant is an alkyl polyglycoside surfactant such as, but not limited to, Glucopon® 425-N.

In one example embodiment, the adjuvant composition comprises a 1:1 xanthan gum and konjac blend in combination with one or more polyols and a surfactant. In one example embodiment, the one or more polyols comprises glycerol and at least one additional polyol and the surfactant is an oil-seed derived surfactant. In one example embodiment, the adjuvant composition comprises a 1:1 xanthan gum and konjac blend in combination with one or more polyols, a surfactant, and hydrolyzed sunflower lecithin. In one example embodiment, the one or more polyols comprises glycerol and at least one other polyol, and the surfactant is an oil-seed derived surfactant. In one example embodiment, the adjuvant composition comprises a 1:1 xanthan gum and konjac blend in combination with one or more polyols, and an alkyl polyglycoside surfactant. In another example embodiment, the adjuvant composition comprises a 1:1 xanthan gum and konjac blend in combination with one or more polyols, an alkyl polyglycoside surfactant, and a modified starch. In another example embodiment, the adjuvant composition comprises 1:1 xanthan gum and konjac blend in combination with one or more polyols, hydrolyzed sunflower lecithin, and an alkyl polyglycoside surfactant.

In certain example embodiments, the adjuvant composition comprises the formulations disclosed in one of Tables 2a, 2b, or 3 below.

Adjuvant—Agrochemical Solutions

In certain example embodiments, the gum-based adjuvant compositions disclosed above are diluted in an aqueous solvent with an effective amount of an agrochemical to form an agrochemical solution for application to a target plant or crop. The adjuvant compositions disclosed herein are well suited as adjuvants for use in such agrochemical solutions by virtue of the adjuvant's ability to bind water, form films and resist evaporation, among other characteristics. The resulting aqueous mixture of at least one agrochemical and adjuvant is agitated for a period of time and then applied to the target crop or plant via a standard application means such as, but not limited to, aerial applications, vehicle mounted applications, handheld applications, cluster nozzle applications, and backpack sprayer applications.

The dilution, or usage rates, for the adjuvant compositions described herein will vary based on the active agrochemical ingredient being used, the target plant or crop, the time of application, and other components already present in the agrochemical composition, and can be appropriately selected by one of ordinary skill in the art. In certain example embodiments, the adjuvant composition usage rate is between approximately 1 ounce/100 gallons of final agrochemical solution to approximately 4 gallons/100 gallons of final agrochemical solution. In certain example embodiments, the adjuvant composition usage rate is between approximately 1 pint/100 gallons of final agrochemical solution to 1 quart/100 gallons of final agrochemical solution.

The application parameters for administration of the final agrochemical solution will depend on the application means and can be appropriately selected by one of ordinary skill in the art. For aerial application, the flow rate is typically at 15-25 gallons per acre (gpa). Vehicle (typically truck or tractor) mounted applications are typically at 25 gpa but may range between 10-150 gpa. Handheld applications typically range from 100 to 250 gpa. Backpack sprayer applications are typically at 30-100 gpa. Pressure ranges are typically spray nozzle and application type dependent and can be appropriately selected by one of ordinary skill in the art. Typical pressure ranges are 15-115 pounds per square inch of back pressure.

Example agrochemicals the gum-based adjuvant compositions may used in combination with are described in further detail below.

Agrochemicals

The gum-based adjuvant compositions disclosed herein may be used with an agrochemical that is an herbicide, fungicide, insecticide, plant growth regulator, bactericide, acaricide, or a combination thereof. In certain example embodiments, the agrochemical application composition comprises a gum-based adjuvant disclosed herein diluted in an aqueous solvent in combination with an effective amount of one or more herbicides. In another example embodiment, the agrochemical application composition comprises a gum-based adjuvant disclosed herein diluted in an aqueous solvent with an effective amount of one or more fungicides. In another example embodiment, the agrochemical application composition comprises a gum-based adjuvant disclosed herein diluted in an aqueous solvent with an effective amount one of more insecticides. In another example embodiment, the agrochemical application composition comprises a gum-based adjuvant disclosed herein diluted in an aqueous solvent with an effective amount of one or more plant growth regulators. In another example embodiment, the agrochemical composition comprises a gum-based adjuvant disclosed herein, diluted in an aqueous solvent with an effective amount one or more bactericides. In another example embodiment, the agrochemical application solution comprises a gum-based adjuvant disclosed herein diluted in an aqueous solvent with an effective amount of one or more acaricides.

1. Herbicides

In certain example embodiments the agrochemical is one or more herbicides selected from those described below. In certain example embodiments, the herbicide is an amide herbicide. Example amide herbicides include allidochlor, amicarbazone, beflubutamid, benzadox, benzipriam, bromobutide, cafenstrole, CDEA, cyprazole, dimethenamid, dimethenamid-P, diphenamid, epronaz, etnipromid, fentrazamide, flucarbazone, flupoxam, fomesafen, halosafen, huangcaoling, iscocarbamid, isoxaben, napropamide, napropamide-M, naptalam, pethoxamid, propyzamide, quinonamid, saflufenacil, tebutam, and tiafenacil. Example amide herbicides may also include anilide herbicides, such as but not limited to, chloranocryl cisanilide, clomeprop, cypromid, diflufenican, erlujixiancaoan, etobenzanid, fenasulam, flufenacet, flufenican, ipfencarbazone, mefanacet, mefluidide, metamifop, monalide, naproanilide, pentanochlor, picolinafen, propanil, sulfentrazone, and triafamone. Example amide herbcides may also include arylalanine herbicides such as, but not limited to, benzoylprop, flamprop, and flamprop-M. Example amide herbicides may also include chloroacetanilide herbicides such as, but not limited to, acetochlor, alachlor, butachlor, butenachlor, delachlor, diethatyl, dimethachlor, ethachlor, ethaprochlor, metazachlor, metolachlor, S-metolachlor, pretilachlor, propachlor, propisochlor, prynachlor, terbuchlor, thenylhlor, xylachlor. Example amide herbicides may also include sulfonanilide herbicides, such as, but not limited to, benzolfuor, cloransulam, diclosulam, florasulam, flumetsulam, metosulam, perfuidone, profluazol, pyrimisulfn. Example amide herbicides may also include sulfonamide herbicides—also known as sulfonylurea herbicides—such as but not limited to asulam, carbasulum, fenasulam, oryzalin, penoxsulam, pyroxsulam. Example amide herbicides may also include thioamide herbicides such as, but not limited to, bencabarazone and chlorthiamid.

In certain other example embodiments, the herbicide is an aromatic acid herbicide. Example aromatic acid herbicides include benzoic acid herbicides such as, but not limited to, cambendichlor, chloramben, dicamba, 2,3,6-trichlorobenzoic acid (TBA), and tricamba; pyrimidinyloxybenzoic acid herbicides such as, but not limited to, bispyribac and pyriminobac; pyrimidinylthiobenzoic acid herbicides such as, but not limited to, pyrithiobac; pthalic acid herbicides such as, but not limited to, chlorthal; picolinic acid herbicides such as, but not limited to, aminopyralid, clopyralid, halauxifen, and picloram; and quinolinecarboxylic acid herbicides such as, but not limited to, quinclorac and quinmerac.

In certain example embodiments, the herbicide is an arsenical herbicide such as, but not limited to, cacodylic acid, calcium bis (hydrogen methylarsonate) (CMA), disodium methylarsonate (DSMA), hexaflurate, methylarsonic acid (MAA), ammonium hydrogen methylarsonate (MAMA), sodium hydrogen methylarsonate (MSMA), potassium arsenite, and sodium arsenite.

In certain example embodiments, the herbicide is a benzoylcyclohexanedione herbicide such as, but not limited to, fenquinotrione, ketospiradox, mesotrione, sulcotrione, tefuryltrione, and tembotrione.

In certain example embodiments the herbicide is a benzofuranyl alkylsulfonate herbicide such as, but not limited to, benfuresate and ethofumesate.

In certain other example embodiments, the herbicide is a benzothiazole herbicide such as, but not limited to, benazolin, benzthiazuron, fenthiaprop, mefenacet, and methabenzthiazuron.

In certain example embodiments, the herbicide is a carbamate herbicide such as, but not limited to, asulam, carboxazole, chlorprocarb, dichlormate, fenasulam, karbutilate, and terbucarb. Carbamate herbicides may also include carbanilate herbicides such as, but not limited to, barban, [RS]-sec-butyl 3-chlorocarbanilate (BCPC), carbasulam, carbetamide, 2-chloroethyl 3-chlorocarbanilate (CEPC), chlorbufam, chlorpropham, [RS]-2-chloro-1-methylethyl N-(3-chlorophenyl)carbamate (CPPC), desmedipham, phenisopham, pehnmedipham, phenmedipham-ethyl, propham, and swep.

In certain example embodiments, the herbicide is a carbonate herbicide such as, but not limited to, bromobonil, dinofenate, iodobonil, and tolpyralate.

In certain example embodiments, the herbicide is a cyclohexene oxime herbicide such as, but not limited to, alloxydim, butroxydim, clethodim, cloproxydim, cycloxydim, profoxydim, sethoxydim, tepraloxydim, and tralkoxydim.

In certain example embodiments, the herbicide is a cyclopropylisoxazole herbicide such as, but not limited to, isoxachlortole and isoxaflutole.

In certain example embodiments, the herbicide is a dicarboximide herbicide—also known as a uracil herbicide—such as, but not limited to, cinidon-ethyl, flumezin, flumiclorac, flumioxazin, and flumipropyn.

In certain example embodiments, the herbicide is a dinitroaniline herbicide such as benfluralin, futralin, chlornidine, dinitramine, dipropalin, ethalfluralin, fluchloralin, isopropalin, methalpropalin, nitralin, oryzalin, pendimethalin, prodiamine, profluralin, and trifluralin.

In certain example embodiments, the herbicide is a diphenyl ether herbicide such as, but not limited to, ethoxyfen and nitrophenyl; ether herbicides such as, but not limited to, acifluofen, aclonifen, bifenox, chlomethoxyfen, chlornitrofen, etnipromid, fluorodifen, fluoroglycofen, fluoronitrofen, fomesafen, fucaomi, furyloxyfen, halosafen, lactofen, nitrofen, nitrofluorfen, and oxyfluorfen.

In certain example embodiments, the herbicide is a dithiocarbamate herbicide such as dazomet and metam.

In certain example embodiments, the herbicide is a fumigant herbicide such as, but not limited to, cyanogen, methyl bromide, and methyl iodide.

In certain example embodiments, the herbicide is a halogenated aliphatic herbicide such as, but not limited to, alorac, chloropon, dalapon, flupropanate, hexachloroacetone, methyl bromide, methyl iodide, monochloroacetic acid, sodium chloroacetate (SMA), and trichloroacetic acid (TCA).

In certain example embodiments, the herbicide is an imidazolinone herbicide such as, but not limited to, imazamethabenz, imazamox, imazapyr, imazaquin, and imazaethapyr.

In certain example embodiments, the herbicide is an inorganic herbicide such as, but not limited to, ammonium sulfamate, borax, calcium chlorate, copper sulfate, ferrous sulfate, potassium azide, potassium cyanate, sodium azide, sodium chlorate, and sulfuric acid.

In certain example embodiments, the herbicide is a nitrile herbicide such as, but not limited to, bromobonil, bromoxynil, chlorooxynil, dichlobenil, iodobonil, ioxynil, and pyraclonil.

In certain example embodiments, the herbicide is an organophosphorus herbicide such as, but not limited to, amiprofos-methyl, amiprophos, anilofos, bensulide, bilanafos, butamifos, clacyfos, tris[2-[2,4-dichlorophenoxy)ethyl] phosphite (2,4-DEP), [RS]—(O-2,4-dichlorophenyl O-methyl isopropylphosphoramidothioate (DMPA), ethyl bis(2-ethylhexyl) phophinate (EBEP), fosamine, glufosinate, glufosinate-P, glyphosate, huangcaoling, piperophos, and shuangjiaancaolin.

In certain example embodiments, the herbicide is a oxadiazolone herbicide such as, but not limited to, dimefuron, methazole, oxadiargyl, and oxadiazon.

In certain example embodiments, the herbicide is a oxazole herbicide such as, but not limited to, carboxazole, fenoxasulfone, isouron, isoxaben, isoxachlortole, isoxaflutole, methiozolin, monisouron, pyroxasulfone, and topramezaone.

In certain example embodiments, the herbicide is a phenoxy herbicide such as, but not limited to, bromofenoxim, clomeprop, 2-(2,4-dichlorophenoxy) ethyl benzoate (2,4-DEB), 2-4-DEP, difenopenten, disul, erbon, etnipromid, fenteracol, and trifopsime. Phenoxy herbicides may also include phenoxyacetic herbicides such as clacyfos, (4-chlorophenoxy) acetic acid (4-CPA), (2,4-dichlorophenoxy) acetic acid (2,4-D), (3,4-dichlorophenoxy) acetic acid (3,4-DA), 4-(4-chloro-2-methylphenoxy) acetic acid (MCPA), MCPA-thioethyl, and (2,4,5-trichlorophenoxy) acetic acid (2,4,5-T); phenoxybutryic herbicides such as 4-(4-chlorophenoxy) butanoic acid (4-CPB), 4-(2,4,-dichlorophenoxy) butyric acid (2,4-DB), 4-(3,4-dichlorophenoxy) butyric acid (3,4-DB), 4-(4-chloro-o-toyloxy) butyric acid (MCPB), and 4(2,4,5-trichlorophenoxy) butyric acid (2,4,5-TB); and phenoxypropionic herbicides such as cloprop, (RS)-2-(4-chlorophenoxy) propionic acid (4-CPP), dichloroprop, dichlorprop-P, (RS)-2-(3,4-dichlorophenoxy) propionic acid (3,4-DP), fenoprop, mecoprop, mecoprop-P; and aryloxyphenoxypropionic herbicides such as chlorazifop, clodinafop, clofop, cyhalofop, diclofop, fenoxaprop, fenoxaprop-P, fenthiaprop, fluazifop, fluzaifop-P, haloxyfop, haloxyfop-P, isoxapyrifop, kuicaoxi, metamifop, propaquizafop, quizalofop, quizalofop-P, and trifop.

In certain example embodiments, the herbicide is a phenylenediamine herbicide such as, but not limited to, dinitramine and prodiamine.

In certain example embodiments, the herbicide is a pyrazole herbicide such as, but not limited to, azimsulfuron, difenzoquat, halosulfuron, metazachlor, metazosulfuron, pyrazosulfuron, pyroxasulfone. Pyrazole herbicides may also include benzoylpyrazole herbicides such as benzofenap, pyrasulfotole, pyrazolynate, pyrazoxyfen, tolpyralate, and topramezone; phenylpyrazole herbicides such as fluazolate, nipyraclofen, pinoxaden, and pyraflufen.

In certain example embodiments, the herbicide is a pyridazine herbicide such as, but not limited to credazine, cyclopyrimorate, pyridafol, and pyridate.

In certain example embodiments, the herbicide is a pyridazinone herbicide such as brompyrazon, chloridazon, dimidazon, flufenpyr, metflurazon, norflurazon, oxapyrazon, pydanon.

In certain example embodiments, the herbicide is a pyridine herbicide such as aminopyralid, cliodinate, clopyralid, diflufenican, dithiopyr, flufenican, fluroxypyr, halauxifen, haloxydine, picloram, picolinafen, pyriclor, pyroxsulam, thiazopyr, and triclopyr.

In certain example embodiments, the herbicide is a pyrimidinediamine herbicide such as, but not limited to, ipyrmidam and tioclorim, In certain example embodiments, the herbicide is a pyrimidinyloxybenzylamine herbicide such as, but not limited, to pyribambenz-isopropyl and pyribambenz-propyl.

In certain example embodiments, the herbicide is a quaternary ammonium herbicide such as, but not limited to, cyperquat, dethamquat, difenzoquat, diquat, morfamquat, and paraquat.

In certain example embodiments, the herbicide is a thiocarbamate herbicide such as, but not limited to, butylate, cycloate, di-allate, S-ethyl dipropyl (thiocarbamates) (EPTC), esprocarb, ethiolate, isopolinate, methiobencarb, molinate, orbencarb, pebulate, prosulfocarb, pyributicarb, sulfallate, thiobencarb, tiocarbazil, tri-allate, and vernolate.

In certain example embodiments, the herbicide is a thiocarbonates herbicide such as, but not limited to, dimexano, O, O-diethyl dithiobis(thioformate) (EXD), and proxan.

In certain example embodiments, the herbicide is a thiourea herbicide such as, but not limited to, methiuron.

In certain example embodiments, the herbicide is a triazine herbicide such as, but not limited to, dipropetryn, fucaojing, and trihydroxytriazine. Triazine herbicides may also include chlorotriazine herbicides such as, but not limited to, atrazine, chlorazine, cyanazine, cyprazine, eglinazine, ipazine, mesoprazine, procyazine, proglinazine, propazine, sebuthylazine, simazine, terbuthylazine, and trietazine; fluoroalkytriazine herbicides such as indaziflam, and triaziflam; methoxytriazine herbicides such as atraton, methometon, prometon, secbumeton, simeton, and terbumeton; and methylthiotriazine herbicides such as ametryn, aziprotryne, cyanatryn, desmetryn, dimethametryn, methoprotryne, prometryn, simetryn, and terbutryn.

In certain example embodiments, the herbicide is a triazinone herbicide such as but not limited to ametridione, amibuzin, ethiozin, hexazinone, isomethiozin, metamitron, metribuzin, and trifludimoxazin.

In certain example embodiments, the herbicide is a tiazole herbicide such as, but not limited to, amitrole, cafenstrole, epronaz, and flupoxam.

In certain example embodiments, the herbicide is a triazolone herbicide such as, but not limited to, amicarbazone, bencarbazone, carfentrazone, flucarbazone, ipfencarbazone, propoxycarbazone, sulfentrazaone, and thiencarbazone.

In certain example embodiments, the herbicide is a triazolopyrimidine herbicide such as, but not limited to, cloransulam, diclosulam, florasulam, flumetsulam, metosulam, penoxsulam, and pyroxsulam.

In certain example embodiments, the herbicide is a uracil herbicide such as, but not limited to, benzfendizone, bromacil, butafenacil, flupropacil, isocil, lenacil, sflufenacil, terbacil, and tiafenacil.

In certain example embodiments, the herbicide is a urea herbicide such as, but not limited to, benzthiazuron, cumyluron, cycluron, dichloralurea, diflufenzopyr, isonoruron, isouron, methabenzthiazuron, monisouron, and noruron. Urea herbicides may also include phenylurea herbicides such as anisuron, buturon, chlorbromuron, chloreturon, chlorotoluron, chloroxuron, daimuron, difenoxuron, dimefuron, diuron, fenuron, fluometuron, fluothiuron, isoproturon, linuron, methiuron, methyldymron, metobenzuron, metobromuron, metoxuron, monolinuron, monuron, neburon, paraflufuron, phenobenzuron, siduron, tetrafluron, and thidiazuron; and sulfonylurea herbicides such as amidosulfuron, azimsulfuron, bensulfuron, chlorimuron, cyclosulfamuron, ethoxysulfuron, flazasulfuron, flucetosulfuron, flupyrsulfuron, foramsulfuron, halsulfuron, imazosulfuron, mesosulfuron, metazosulfuron, methiopyrisulfuron, monosulfuron, nicosulfuron, orthosulfamuron, oxasulfuron, primisulfuron, propyrisulfuron, pyrazossulfuron, rimsulfuron, sulfometuron, sulfosulfuron, trifloxysulfuron, and zuomihuanglong, chlorsulfuron, cinosulfuron, ethametsulfuron, iodosulfuron, iofensulfuron, metsulfuron, prosulfuron, thifensulfuron, triasulfuron, tribenuron, triflusulfuron, and tritosulfuron; and thiadiazolylurea herbicides such as buthiuron, ethidimuron, tebuthiuron, thiazafluron, and thidiazuron.

In certain example embodiments, the herbicide is acrolein, allyl alcohol, aminocyclopyrachlor, azafenidin, bentazone, bentranil, benzobicyclon, bicyclopyrone, buthidazole, calcium cyanamide, chlorfenac, chlorfenprop, chlorflurazole, chlorflurenol, cinmethylin, clomazone, (EZ)-1-chloro-N2-(3,4-dichloropheny)-N1, N1-dimethylformamidine (CPMF), cresol, cyanamide, ortho-dichlorobenzene, dimepiperate, dithioether, endothal, fluoromidine, fluridone, flurochloridone, flurtamone, fluthiacet, funaihecaoling, herbimycin, huancaiwo, indanofan, methoxypenone, methyl isothiocyanate, perchlorocyclohex-2-en-1-one (OCH), oxaziclomefone, pelargonic acid, pentachlorophenol, pentoxazone, penylmercury acetate, prosulfalin, pyribenzoxim, pyriftalid, quinoclamine, rhodethanil, sulglycapin, tavron, tidiazimin, tridiazimin, tridiphane, trimeturon, tripropindan, and tritac or a combination thereof.

2. Fungicides

In certain example embodiments, the one or more agrochemicals is one or more fungicides. The fungicide may include one or more fungicide classes or fungicides as described further below.

In certain example embodiments, the fungicide is an aliphatic nitrogen fungicide such as, but not limited to, butylamine, cymoxanil, dodicin, dodine, and guazatineiminoctadine.

In certain example embodiments, the fungicide is an amide fungicide such as, but not limited to, benzovindiflupyr, carpropamid, chloraniformethan, cyflufenamid, diclocymet, diclocymet, dimoxystrobin, fenaminstrobin, fenoxanil, flumetover, furametpyr, isofetamid, isopyrazam, mandestrobin, mandipropamid, metominostrobin, orysastrobin, penthiopyrad, prochloraz, pydiflumetofen, quinazamid, silthiofam, and triforine. Amide fungicides may also include acylamino acid fungicides such as benalaxy, benalaxyl-M, furalaxyl, metalaxy, metalaxyl-M, pefurazoate, and valifenalate; anilide fungicides such as benalaxyl, benalaxyl-M, bixafen, boscalid, carboxin, fenhexamid, fluxapyroxad, isotianil, metalaxyl, metalaxyl-M, metsulfovax, ofurace, oxadixyl, oxycarboxin, penflufen, pyracarbolid, pyraziflumid, sedaxane, thifluzamide, tiadinil, and vanguard; benzanilide fungicides such as benodanil, flutolanil, mebenil, mepronil, salicylanilide, and tecloftalam; furanilide fungicides such as fenfuram, furalaxyl, furcarbanil, and methfuroxam; sulfonanilide fungicides such as flusulfamide; benzamide fungicides such as benzohydroxamic acid, fluopicolide, fluopyram, tioxymid, trichlamide, zarilamid, and zoxamide; furamide fungicides such as cyclafuramid, and furmecyclox; phenylsulfamide fungicides such as dichlofluanid, tolylfluanid; sulfonamide fungicides such as amisulbrom, and cyazofamid; and valinamide fungicides such as benthiavalicarb, and iprovalicarb.

In certain example embodiments the fungicide is an antibiotic fungicide such as, but not limited to, aureofungin, blasticidin-S, cycloheximide, griseofulvin, kasugamycin, moroxydine, natamycin, polyoxins, polyoxorim, streptomycin, validamycin. Antibiotic fungicides may include strobilurin fungicides such as fluoxastrobin, mandestrobin; methoxyacrylate strobilurin fungicides such as azoxystrobin, bifujunzhi, coumoxystrobin, enoxastrobin, flufenoxystrobin, jiaxiangjunzhi, picoxystrobin, pyraoxystrobin; methoxycarbanilate strobilurin fungicides such as pyraclostrobin, pyrametostrobin, triclopyricarb; methoxyiminoacetamide strobilurin fungicides such as dimoxystrobin, fenaminstrobin metominostrobin, and orysastrobin; methoxyiminoacetate strobilurin fungicides such as kresoxim-methyl and trifloxystrobin.

In certain example embodiments, the fungicide is an aromatic fungicide such as, but not limited to, biphenyl, chlorodinitronaphthalenes, chloroneb, chlorothalonil, cresol, dicloran, fenjuntong, hexachlorobenzene, pentachlorophenol, quintozene, sodium pentachlorophenoxide, tecnazene, and trichlorotrinitrobenzenes.

In certain example embodiments, the fungicide is an arsenical fungicide such as, but not limited to, asomate, and urbacide.

In certain example embodiments the fungicide is an aryl phenyl ketone fungicide such as, but not limited to, metrafenone, and pyriofenone.

In certain example embodiments the fungicide is a benzimidazole fungicides such as, but not limited to, albendazole, carbendazim, chlorfenazole, cypendazole, debacarb, fuberidazole, mecarbinzid, rabenzazole, and thiabendazole.

In certain example embodiments the fungicide is a benzimidazole precursor fungicide such as, but not limited to, furophanate, thiophanate, and thiophanate-methyl.

In certain example embodiments the fungicide is a benzothiazole fungicide such as, but not limited to, bentaluron, benthiavalicarb, benthiazole, chlobenthiazone, and probenazole.

In certain example embodiments the fungicide is a botanical fungicide such as, but not limited to, allicin, berberine, carvacrol, carvone, osthol, sanguinarine, and santonin.

In certain example embodiments the fungicide is a bridged diphenyl fungicide such as, but not limited to, bithionol, dichlorophen, diphenylamine, hexachlorophene, and parinol.

In certain example embodiments the fungicide is a carbamate fungicide such as, but not limited, to, benthiavalicarb, fluorphanate, iodocarb, iprovalicarb, picarbutrazox, propamocarb, pyribencarb, thiphanate, thiophanate-methyl, and tolprocarb. Carbamate fungicides may also include benzimidazolylcarbamate fungicides such as albendazole, benomyl, carbendazim, cypendazole, debacarb, and mecarbinzid; and carbinlate fungicides such as diethofencarb, pyraclostrobin, pyrametostrobin, and triclopyricarb.

In certain example embodiments, the fungicide is a conazole fungicide such as, but not limited to climbazole, clotrimazole, imazalil, oxpoconazole, prochloraz, triflumizole, azaconazole, bromuconazole, cyproconazole, diclobutrazol, difenoconazole, diniconazole, diniconazole-M, epoxiconazole, etaconazole, fenbuconazole, fluquinconazole, flusilazole, flutriafol, furconazole, furconazole-cis, hexaconazole, imibenconazole, ipconazole, metconazole, myclobutanil, penconazole, propiconazole, prothioconazole, quinconazole, simeconazole, tebuconazole, tetraconazole, triadimefon, triadimenol, triticonazole, uniconazole, and uniconazole-P.

In certain example embodiments the fungicide is a cyanoacrylate fungicide such as, but not limited, to benzamacril and phenamacril.

In certain example embodiments, the fungicide is a dicarboximide fungicide such as, but not limited to, famoxadone and fluoroimide. Dicarboximide fungicides may also include dichlorophenyl dicarboximide fungicides such as chlozolinate, dichlozoline, iprodione, isovaledione, myclozolin, procymidone, and vinclozolin; and phthalimide fungicides such as captafol, captan, ditalimfos, folpet, and thiochlorfenphim.

In certain example embodiments, the fungicide is a dinitrophenol fungicide such as, but not limited to binapacryl, dinobuton, dinocap, dinocap-4, dinocap-6, meptyldinocap, dinocton, dinopenton, dinosulfon, dinoterbon, and DNOC.

In certain example embodiments, the fungicide is a dithiocarbamate fungicide such as but not limited to, amobam, asomate, azithiram, carbamorph, cufraneb, cuprobam, disulfiram, ferbam, metam, nabam, tecoram, thiram, urbacide, and ziram. Dithiocarbamate fungicides may include cyclic dithiocarbamate fungicides such as dazomet, etem, and milneb; and polymeric dithiocarbamate fungicides such as mancopper, mancozeb, maneb, metiram, polycarbamate, propineb, and zineb.

In certain example embodiments the fungicide is a dithiolane fungicide such as, but not limited to, isoprothiolane and saijunmao.

In certain example embodiments, the fungicide is a fumigant fungicide such as, but not limited to, carbon disulfide, cyanogen, dithioether, methyl bromide, methyl iodide, and sodium tetrathiocarbonate.

In certain example embodiments, the fungicide is a hydrazide fungicide such as, but not limited to benquinox and saiunmao.

In certain example embodiments, the fungicide is an imidazole fungicide such as, but not limited to, cyazofamid, fenamidone, fenapanil, glyodin, iprodione, isovaledione, perfurazoate, and triazoxide. Imidazole fungicides may also include conazole fungicides such as climbazole, clotrimazole, imazalil, oxpoconazole, prochloraz, and triflumizole.

In certain example embodiments, the fungicide is an inorganic fungicide such as potassium azide, potassium thiocyanate, sodium azide, and sulfur. Inorganic fungicides may include copper fungicides, such as but not limited to, acypetacs-copper, Bordeaux mixture, Burgundy mixture, Cheshunt mixture, copper acetate, copper carbonate (basic), copper hydroxide, copper naphthenate, copper oleate, copper oxychloride, copper silicate, copper sulfate, copper sulfate (basic), copper zinc chromate, cufraneb, cuprobam, cuprous oxide, mancopper, oxine-copper, saisentong, and thiodiazole-copper; and mercury fungicides. The mercury fungicide may be an inorganic mercury fungicides such as mercuric chloride, mercuric oxide, and mercurous chloride. The mercury fungicide may also include organomercury fungicides such as (3-ethoxypropyl)mercury bromide, ethylmercury acetate, ethylmercury bromide, ethylmercury chloride, ethylmercury 2,3-dihydroxypropyl mercaptide, ethylmercury phosphate, N-(ethylmercury)-p-toluenesulphonanilide, hydrargaphen, 2-methoxyethylmercury, methylmercury chloride, methylmercury benzoate, methylmercury dicyandiamide, methylmercury pentachlorophenoxide, 8-phenylmercuioxyquinoline, phenylmercuriurea, phenylmercury acetate, phenylmercury chloride, phenylmercury derivative of pyrocatechol, phenylmercury nitrate, phenylmercury salicylate, thiomersal, and tolylmercury acetate.

In certain example embodiments, the fungicide is a morpholine fungicide such as, but not limited to, aldimorph, benzamorf, carbamorph, dimethomorph, dodemorph, fenpropimorph, flumorph, and tridemorph.

In certain example embodiments, the fungicide is ampropylfos, ditalimfos, EBP, edifenphos, fosetyl, hexylthiofos, inezin, iprobenfos, izobenfos, izopamfos, kejunlin, phosdiphen, pyrazophos, toclofos-methyl, triamiphos, or a combination thereof.

In certain example embodiments, the fungicide is an organophosphorus fungicide such as, but not limited to ampropylfos, ditalimfos, EBP, edifenphos, fosetyl, hexylthiofos, inezin, iprobenfos, izopamfos, kejunlin, phosdiphen, pyrazophos, tolclofos-methyl and triamiphos.

In certain example embodiments, the fungicide is an organotin fungicides such as, but not limited to, decafentin, fentin, and tributyltin oxide.

In certain example embodiments, the fungicide is an oxathin fungicide such as carboxin and oxycarboxin.

In certain example embodiments, the fungicide is an oxazole fungicide such as, but not limited to, chlozolinate, dichlozoline, drazoxolon, famoxadone, hymexazol, metazoxolon, myclozolin, oxadixyl, oxathiapiprolin, pyrisoxazole, and vinclozolin.

In certain example embodiments, the fungicide is a polysulfide fungicide such as but not limited to barium polysulfide, calcium polysulfide, potassium polysulfide, and sodium polysulfide.

In certain example embodiments, the fungicide is a pyrazole fungicide such as, but not limited to, benzovindiflupyr, bixafen, fenpyrazamine, fluxapyroxad, furametpyr, isopyrazam, oxathiapiprolin, penflufen, penthiopyrad, pydiflumetofen, pyraclostrobin, pyrametostrobin, pyraoxystrobin, rabenzazole, and sedaxane.

In certain example embodiments, the fungicide is a pyridine fungicide such as, but not limited to, boscalid, buthiobate, dipyrithione, fluazinam, fluopicolide, fluopyram, parinol, picarbutrazox, pyribencarb, pyridinitril, pyrifenox, pyrisoxazole, pyroxychlor, pyroxyfur, and triclopyricarb.

In certain example embodiments, the fungicide is a pyrimidine fungicide such as but not limited to bupirimate, diflumetorim, dimethirimol, ethirimol, fenarimol, ferimzone, nuarimol, and triarimol. Pyrimidine fungicides may include anilinopyrimidine fungicides such as cyprodinil, mepanipyrim, and pyrimethanil.

In certain example embodiments the fungicide is a pyrrole fungicide such as, but not limited to dimetachlone, fenpiclonil, fludioxonil, and fluoroimide.

In certain example embodiments the fungicide is a quaternary ammonium fungicides such as, but not limited to berberine, and sanguinarine.

In certain example embodiments, the fungicide is a quinoline fungicides such as, but not limited to, ethoxyquin, halacrinate, 8-hydroxyquinoline sulfate, quinacetol, quinoxyfen, and tebufloquin.

In certain example embodiments, the fungicide is a quinone fungicide such as but not limited to chloranil, dichlone, and dithianon.

In certain example embodiments, the fungicide is a quinoxaline fungicide such as but not limited to chinomethionat, chlorquinox, and thioquinox.

In certain example embodimens, the fungicide is a thiadiazole fungicides such as but not limited to etridiazole, saisentong, thiodiazole-copper, and zinc thiazole.

In certain example embodiments, the fungicidie is a thiazole fungicide such as, but not limited to, ethaboxam, isotianil, metsulfovax, octhilinone, oxathiapiprolin, thiabendazole, and thifluzamide.

In certain example embodiments, the fungicide is a thiazolidine fungicide such as but not limited to futianil and thiadifluor.

In certain example embodiments, the fungicide is a thiocarbamate fungicide such as but not limited to methasulfocarb and prothiocarb.

In certain example embodiments, the fungicidie is a thiophene fungicide such as but not limited to ethaboxam, isofetamid, and silthiofam.

In certain example embodiments, the fungicide is a triazine fungicide such as, but not limited to, anilazine.

In certain example embodiments, the fungicide is a triazole fungicide such as, but not limited to, amisulbrom, bitertanol, fluotrimazole, and triazbutil. Triazole fungicides may also include conazole fungicides (triazoles) such as, but not limited to, azaconazole, bromuconazole cyproconazole, diclobutrazol, difenoconazole, diniconazole, diniconazole-M, epoxiconazole, etaconazole, fenbuconazole, fluquinconazole, flusilazole, flutriafol, furconazole, furconazole-cis, hexaconazole, huanjunzuo, imibenconazole, ipconazole, metconazole, myclobutanil, penconazole, propiconazole, prothioconazole, quinconazole, simeconazole, tebuconazole, tetraconazole, triadimefon, triadimenol, triticonazole, uniconazole, and uniconazole-P.

In certain example embodiments, the fungicide is a triazolopyrimidine fungicide such as, but not limited to ametoctradin.

In certain example embodiments, the fungicide is a urea fungicide such as, but not limited to bentaluron, pencycuron, and quinazamid.

In certain example embodiments, the fungicide is a zinc fungicide such as, but not limited to acypetacs-zinc, copper, zinc chromate, cufraneb, mancozeb, metiram, polycarbamate, polyoxorim-zinc, propineb, zinc naphthenate, zinc thiazole, zinc trichlorophenoxide, zineb, and ziram.

In certain example embodiments, the fungicide isacibenzolar, acypetacs, allyl alcohol, benzalkonium chloride, bethoxazin, bromothalonil, chitosan chloropicrin, DBCP, dehydroacetic acid, diclomezine, diethyl pyrocarbonate, dipymetitrone, ethylicin, fenaminosulf, fenitropan, fenpropidin, formaldehyde, furfural, hexachlorobutadiene, methyl isothiocyanate, nitrostyrene, nitrothal-isopropyl, OCH, pentachlorophenyl laurate, 2-phenylphenol, phthalide, piperalin, propamidine, proquinazid, pyroquilon, sodium orthophenylphenoxide, spiroxamine, sultropen, thicyofen, tricyclazole, or a combination thereof.

3. Insecticides

In certain example embodiments, the agrochemical is an insecticide. The insecticide may include one or more insecticide classes or insecticides as described further below.

In certain example embodiments, the insecticide is an arsenical insecticide such as, but not limited to, calcium arsenate, copper acetoarsenite, copper arsenate, lead arsenate, potassium arsenite, and sodium arsenite In certain example embodiments the insecticide is a botanical insecticides such as, but not limited to, allicin, anabasine, azadirachtin, carvacrol, d-limonene, matrine, nicotine, nornicotine, oxymatrine, pyrethrins, cinerin I, cinerin II, jasmolin I, jasmolin II, pyrethrin I, pyrethrin II, quassia, rhodojaponin-III, rotenone, ryania, sabadilla, sanguinarine, and triptolide.

In certain example embodiments the insecticide is a carbamate insecticides such as, but not limited to, bendiocarb and carbaryl. Carbamate insecticides may also include benzofuranyl methylcarbamate insecticides such as, but not limited to, benfuracarb, carbofuran, carbosulfan, decarbofuran, and furathiocarb; dimethylcarbamate insecticides such as, but not limited to dimetan, dimetilan, hyquincarb, isolan, pirimicarb, pyramat, and pyrolan; oxime carbamate insecticides such as alanycarb, aldicarb, aldoxycarb, butocarboxim, butoxycarboxim, methomyl, nitrilacarb, oxamyl, tazimcarb, thiocarboxime, thiodicarb, and thiofanox; and phenyl methylcarbamate insecticides such as allyxycarb, aminocarb, bufencarb, butacarb, carbanolate, cloethocarb, CPMC, dicresyl, dimethacarb, dioxacarb, EMPC, ethiofencarb, fenethacarb, fenobucarb, isoprocarb, methiocarb, metolcarb, mexacarbate, promacyl, promecarb, propoxur, trimethacarb, XMC, and xylylcarb.

In certain example embodiments the insecticide is a diamide insecticide such as, but not limited to, broflanilide, chlorantraniliprole, cyantraniliprole, cyclaniliprole, cyhalodiamide, flubendiamide, and tetraniliprole.

In certain example embodiments the insecticide is a dinitrophenol insecticide such as, but not limited to, dinex, dinoprop, dinosam, and DNOC.

In certain example embodiments the insecticide is a fluorine insecticide such as, but not limited to, barium hexafluorosilicate, cryolite, flursulamid, sodium fluoride, sodium hexafluorosilicate, and sulfluramid.

In certain example embodiments, the insecticide is a formamidine insecticide such as, but not limited to, amitraz, chlordimeform, formetanate, formparanate, medimeform, and semiamitraz.

In certain example embodiments the insecticide is a fumigant insecticide such as, but not limited to acrylonitrile, carbon disulfide, carbon tetrachloride, carbonyl sulfide, chloroform, chloropicrin, cyanogen, para-dichlorobenzene, 1,2-dichloropropane, dithioether, ethyl formate, ethylene dibromide, ethylene dichloride, ethylene oxide, hydrogen cyanide, methyl bromide, methyl iodide, methylchloroform, methylene chloride, naphthalene, phosphine, sodium tetrathiocarbonate, sulfuryl fluoride, and tetrachloroethane.

In certain example embodiments the insecticide is an inorganic insecticide such as, but not limited to, borax, boric acid, calcium polysulfide, copper oleate, diatomaceous earth, mercurous chloride, potassium thiocyanate, silica gel, and sodium thiocyanate.

In certain example embodiments the insecticide is an insect growth regulator. Insect growth regulators may include chitin synthesis inhibitors, juvenile hormone mimics, juvenile hormone, moulting hormone agonists, moulting hormones, molting inhibitors, prococenes. Chitin synthesis inhibitors may include, but are not limited to, buprofezin and cyromazine. Chitin synthesis inhibitors may also include benzoylphenylurea chitin synthesis inhibitors such as, but not limited to, bistrifluron, chlorbenzuron, chlorfluazuron, dichlorbenzuron, diflubenzuron, flucycloxuron, flufenoxuron, hexaflumuron, lufenuron, novaluron, noviflumuron, penfluron, teflubenzuron, and triflumuron. Example juvenile hormone mimics include, but are not limited to, dayoutong, epofenonane, fenoxycarb, hydroprene, kinoprene, methoprene, pyriproxyfen, and triprene. Example juvenile hormones include, but are not limited to juvenile hormone I, juvenile hormone II, and juvenile hormone III. Example moulting hormone agonist include, but are not limited to, chromafenozide, furan tebufenozide, halofenozide, methoxyfenozide, tebufenozide, and yishijing. Example moulting hormones include, but are not limited to α-ecdysone and ecdysterone. Example moulting inhibitors include, but are not limited to, diofenolan. Example precocenes include but are not limited to precocene I, precocene II, and precocene III. In certain example embodiments the insecticide is dicyclanil.

In certain example embodiments, the insecticide is a macrocyclic lactone insecticides. Macrocyclic lactone insecticides may include avermectin insecticides, milbemycin insecticides and spinosyn insecticides. Example avermectin insecticides include, but are not limited to, abamectin, doramectin, emamectin, eprinomectin, ivermectin, and selamectin. Example milbemycin insecticides include, but are not limited to, lepimectin, milbemectin, milbemycin oxime, and moxidectin. Example spinosyn insecticides include, but are not limited to spinetoram and spinosad.

In certain example embodiments, the insecticide is a neonicotinoid insecticides. Neonicotinoid insecticides may include nitroguanidine neonicotinoid insecticides, nitromethylen neonicotinoid insecticides, and pyridylmethylamine neonicotinoid insecticides. Example nitroguanidine neonicotinoid insecticides include, but are not limited to, clothianidin, dinotefuran, imidacloprid, imidaclothiz, and thiamethoxam. Example nitromethylene neonicotinoid insecticides include, but are not limited to, nitenpyram, and nithiazine. Example pyridylmethylamine neonicotinoid insecticides include, but are not limited to, acetamiprid, imidacloprid, nitenpyram, paichongding, and thiacloprid.

In certain example embodiments the insecticide is a nereistoxin analogue insecticides such as, but not limited to, bensultap, cartap, polythialan, thiocyclam, and thiosultap.

In certain example embodiments the insecticide is an organochlorine insecticides such as, but not limited to, bromo-DDT, camphechlor, DDT, pp'-DDT, ethyl-DDD, HCH, gamma-HCH, lindane, methoxychlor, pentachlorophenol, and TDE. Organochlorine insecticides may also include cyclodiene insecticides such as, but not limited to, aldrin, bromocyclen, chlorbicyclen, chlordane, chlordecone, dieldrin, dilor, endosulfan, alpha-endosulfan, endrin, HEOD, heptachlor, HHDN, isobenzan, isodrin, kelevan, and mirex.

In certain example embodiments, the insecticide is an organophosphorus insecticide. Organophosphorus insecticides may include organophosphate insecticides such as, but not limited to, bromfenvinfos, calvinphos, chlorfenvinphos, crotoxyphos, dichlorvos, dicrotophos, dimethylvinphos, fospirate, heptenophos, methocrotophos, mevinphos, monocrotophos, naled, naftalofos, phosphamidon, propaphos, TEPP, and tetrachlorvinphos; organothiophosphate insecticides, such as, but not limited to, dioxabenzofos, fosmethilan, and phenthoate; aliphatic organothiophosphate insecticides such as, but not limited to, acethion, acetophos, amiton, cadusafos, chlorethoxyfos, chlormephos, demephion, demephion-O, demephion-S, demeton, demeton-O, demeton-S, demeton-methyl, demeton-O-methyl, demeton-S-methyl, demeton-S-methylsulphon, disulfoton, ethion, ethoprophos, IPSP, isothioate, malathion, methacrifos, methylacetophos, oxydemeton-methyl, oxydeprofos, oxydisulfoton, phorate, sulfotep, terbufos, and thiometon; aliphatic amide organothiophosphate insecticides such as, but not limited to amidithion, cyanthoate, dimethoate, ethoate-methyl, formothion, mecarbam, omethoate, prothoate, sophamide, and vamidothion; oxime organothiophosphate insecticides such as, but not limited to, chlorphoxim, phoxim, and phoximmethyl; heterocyclic organothiophosphate insecticides such as, but not limited to, azamethiphos, colophonate, coumaphos, coumithoate, dioxathion, endothion, menazon, morphothion, phosalone, pyraclofos, pyrazothion, pyridaphenthion, quinothion; benzothiopyran organothiophosphate insecticides such as, but not limited to, dithicrofos and thicrofos; benzotriazine organothiophosphate insecticides such as, but not limited to, azinphos-ethyl and azinphos-methyl; isoindole organothiophosphate insecticides such as, but not limited to, dialifos and phosmet; isoxazole organothiophosphate insecticides such as, but not limited to, isoxathion and zolaprofos; pyrazolopyrimidine organothiophosphate insecticides such as, but not limited to, chlorprazophos and pyrazophos; pyridine organothiophosphate insecticides such as, but not limited to, chlorpyrifos, and chlorpyrifos-methyl; pyrimidine organothiophosphate insecticides such as, but not limited to, butathiofos, diazinon, etrimfos, lirimfos, pirimioxyphos, pirimiphos-ethyl, pirimiphos-methyl, primidophos, pyrimitate, and tebupirimfos; quinoxaline organothiophosphate insecticides such as, but not limited to quinalphos and quinalphos-methyl; thiadiazole organothiophosphate insecticides such as, but not limited to, athidathion, lythidathion, methidathion, and prothidathion; triazole organothiophosphate insecticides such as, but not limited to, isazofos and triazophos; phenyl organothiophosphate insecticides such as, but not limited to azothoate, bromophos, bromophos-ethyl, carbophenothion, chlorthiophos, cyanophos, cythioate, dicapthon, dichlofenthion, etaphos, famphur, fenchlorphos, fenitrothion, fensulfothion, fenthion, fenthion-ethyl, heterophos, jodfenphos, mesulfenfos, parathion, parathion-methyl, phenkapton, phosnichlor, profenofos, prothiofos, sulprofos, temephos, trichlormetaphos-3, trifenofos, and xiaochongliulin.

In certain example embodiments, the insecticide is a phosphonate insecticides such as, but not limited to, butonate andtrichlorfon.

In certain example embodiments, the insecticide is a phosphonothioate insecticides such as, but not limited to mecarphon. Phophonothioate insecticides may also include phenyl ethylphosphonothioate insecticides such as fonofos and trichloronat; and phenyl phenylphosphonothioate insecticides such as cyanofenphos, EPN, and leptophos.

In certain example embodiments, the insecticide is a phosphoramidate insecticides such as, but not limited to, crufomate, fenamiphos, fosthietan, mephosfolan, phosfolan, phosfolan-methyl, and pirimetaphos.

In certain example embodiments, the insecticide is a phosphoramidothioate insecticides such as, but not limited to, acephate, chloramine phosphorus, isocarbophos, isofenphos, isofenphos-methyl, methamidophos, phosglycin, and propetamphos In certain example embodiments, the insecticide is an phosphorodiamide insecticides such as, but not limited to, dimefox, mazidox, mipafox and schradan In certain example embodiments the insecticide is an oxadiazine insecticide such as, but not limited to, indoxacarb.

In certain example embodiments, the insecticide is an oxadiazolone insecticide such as, but not limited to, metoxadiazone.

In certain example embodiments, the insecticide is a phthalimide insecticide such as, but not limited to, dialifos, phosmet, and tetramethrin.

In certain example embodiments, the insecticide is a physical insecticide such as, but not limited to, maltodextrin, boric acid, diatomaceous earth and silica gel.

In certain example embodiments the insecticide is a pyrazole insecticide such as, but not limited to, chlorantraniliprole, cyantraniliprole, cyclaniliprole, dimetilan, isolan, tebufenpyrad, tetraniliprole, and tolfenpyrad.

In certain example embodiments, the insecticide is a phenylpyrazole insecticide such as but not limited to, acetoprole, ethiprole, fipronil, flufiprole, pyraclofos, pyrafluprole, pyriprole, pyrolan, and vaniliprole.

In certain example embodiments, the insecticide is a pyrethroid insecticide. Pyrethroid insecticides may include pyrethroid esters, pyrethroid ethers, and pyrethroid oximes. Example pyrethroid ester insecticides include, but are not limited to, acrinathrin, allethrin, bioallethrin, esdepallethrine, barthrin, bifenthrin, kappa-bifenthrin, bioethanomethrin, brofenvalerate, brofluthrinate, bromethrin, butethrin, chlorempenthrin, cyclethrin, cycloprothrin, cyfluthrin, beta-cyfluthrin, cyhalothrin, gamma-cyhalothrin, lambda-cyhalothrin, cypermethrin, alpha-cypermethrin, beta-cypermethrin, theta-cypermethrin, zeta-cypermethrin, cyphenothrin, deltamethrin, dimefluthrin, dimethrin, empenthrin, d-fanshiluquebingjuzhi, chloroprallethrin, fenfluthrin, fenpirithrin, fenpropathrin, fenvalerate, esfenvalerate, flucythrinate, fluvalinate, tau-fluvalinate, furamethrin, furethrin, heptafluthrin, imiprothrin, j apothrins, kadethrin, meperfluthrin, methothrin, metofluthrin, epsilon-metofluthrin, momfluorothrin, epsilon-momfluorothrin, pentmethrin, permethrin, biopermethrin, transpermethrin, phenothrin, prallethrin, profluthrin, proparthrin, pyresmethrin, resmethrin, bioresmethrin, cismethrin, tefluthrin, kappa-tefluthrin, terallethrin, tetramethrin, tetramethylfluthrin, tralocythrin, tralomethrin, transfluthrin, and valerate. Example pyrethroid ether insecticides include, but are not limited to, etofenprox, flufenprox, halfenprox, protrifenbute, and silafluofen. Example pyrethroid oxime insecticides include, but are not limited to, sulfoxime and thiofluoximate.

In certain example embodiments the insecticide is a pyrimidinamine insecticide such as, but not limited to, flufenerim and pyrimidifen.

In certain example embodiments, the insecticide is a pyrrole insecticides such as, but not limited to, chlorfenapyr.

In certain example embodiments, the insecticide is a quaternary ammonium insecticides such as but not limited to sanguinarine.

In certain example embodiments, the insecticide is a sulfoximine insecticide such as but no limited to sulfoxaflor.

In certain example embodiments, the insecticide is a tetramic acid insecticide such as but not limited to spirotetramat.

In certain example embodiments, the insecticide is a tetronic acid insecticide such as, but not limited to, spiromesifen.

In certain example embodiments, the insecticide is a thiazole insecticide such as, but not limited to, clothianidin, imidaclothiz, thiamethoxam, and thiapronil.

In certain example embodiments, the insecticide is a thiazolidine insecticide such as, but not limited to, tazimcarb and thiacloprid.

In certain example embodiments, the insecticide is a thiourea insecticide such as but not limited to diafenthiuron.

In certain example embodiments, the insecticide is an urea insecticide such as, but not limited to, flucofuron and sulcofuron.

In certain example embodiments, the insecticide is a zwitterionic insecticide such as, but no limited to, diclomezotiaz and triflumezopyrim.

In certain example embodiments the insecticide is afidopyropen, afoxolaner, allosamidin, closantel, copper naphthenate, crotamiton, EXD, fenazaflor, fenoxacrim, flometoquin, flonicamid, fluhexafon, flupyradifurone, fluralaner, fluxametamide, hydramethylnon, isoprothiolane, jiahuangchongzong, malonoben, metaflumizone, nifluridide, plifenate, pyridaben, pyridalyl, pyrifluquinazon, rafoxanide, thuringiensin, triarathene, triazamate, or a combination thereof 4. Plant Growth Regulators In another example embodiment, the one or more agrochemicals is one or more plant growth regulators. The plant growth regulator may include one or more plant growth regulator classes or plant growth regulators as described further below.

In certain example embodiments, the plant growth regulator is an antiauxin such as, but not limited to, clofibric acid and 2,3,5-tri-iodobenzoic acid.

In certain example embodiments, the plant growth regulator is an auxin such as, but not limited to, 4-CPA, 2,4-D, 2,4-DB, 2,4-DEP, dichlorprop, fenoprop, IAA, IBA, naphthaleneacetamide, α-naphthaleneacetic acids, 1-naphthol, naphthoxyacetic acids, potassium naphthenate, sodium naphthenate, and 2,4,5-T.

In certain example embodiments, the plant growth regulator is a cytokinin such as, but not limited to, 2iP, benzyladenine, 4-hydroxyphenethyl alcohol, kinetin, and zeatin.

In certain example embodiments, the plant growth regulator is a defoliant such as, but not limited to, calcium cyanamide, dimethipin, endothal, ethephon, merphos, metoxuron, pentachlorophenol, thidiazuron, and tribufos.

In certain example embodiments, the plant growth regulator is an ethylene inhibitor such as, but not limited to, aviglycine and 1-methylcyclopropene.

In certain example embodiments, the plant growth regulator is an ethylene releaser, such as, but not limited to, ACC, etacelasil, ethephon, and glyoxime.

In certain example embodiments, the plant growth regulator is a gametocide such as, but not limited to, fenridazon and maleic hydrazide.

In certain example embodiments, the plant growth regulator is a gibberellin such as, but not limited to, gibberellins and gibberellic acid.

In certain example embodiments, the plant growth regulator is a growth inhibitor such as, but not limited to, abscisic acid, ancymidol, butralin, carbaryl, chlorphonium, chlorpropham, dikegulac, flumetralin, fluoridamid, fosamine, glyphosine, isopyrimol, jasmonic acid, maleic hydrazide, mepiquat, piproctanyl, prohydrojasmon, propham, tiaojiean, 2,3,5-tri-iodobenzoic acid. Growth inhibitors may also include morphactins such as, but not limited to, chlorfluren, chlorflurenol, dichlorflurenol, and flurenol.

In certain example embodiments, the plant growth regulator is a growth retardant, such as, but not limited to, chlormequat, daminozide, flurprimidol, mefluidide, paclobutrazol, tetcyclacis, and uniconazole.

In certain example embodiments, the plant growth regulator is a growth stimulator such as, but not limited to, brassinolide, brassinolide-ethyl, DCPTA, forchlorfenuron, hymexazol, prosuler, pyripropanol, and triacontanol.

In certain example embodiments, the plant growth regulator is bachmedesh, benzofluor, buminafos, carvone, choline chloride, ciobutide, clofencet, cloxyfonac, cyanamide, cyclanilide, cycloheximide, cyprosulfamide, epocholeone, ethychlozate, ethylene, fuphenthiourea, furalane, heptopargil, holosulf, inabenfide, karetazan, lead arsenate, methasulfocarb, prohexadione, pydanon, sintofen, triapenthenol, trinexapac, or a combination thereof.

5. Bactericides

In another example embodiment, the agrochemical is a bactericide. In certain example embodiments the bactericide is amicarthiazol, bismerthiazol, bronopol, cellocidin, chloramphenicolcopper hydroxide, cresol, dichlorophen, dipyrithione, dodicin, ethylicin, fenaminosulf formaldehyde, hexachlorophene, hydrargaphen, 8-hydroxyquinoline sulfate, kasugamycin, nitrapyrin, octhilinone, oxolinic acid, oxytetracycline, phenazine oxide, probenazole, saijunmao, saisentong, streptomycin, tecloftalam, thiodiazole-copper, thiomersal, xinjunan, zinc thiazole, or a combination thereof.

6. Acaricides

In another example embodiment, the agrochemical is a acaricide. The acaride may comprise one or more acaricide classes or individual acaricides as described further below.

In certain example embodiments, the acaricide is a bridged diphenyl acaricide such as, but not limited to, azobenzene, benzoximate, benzyl benzoate, bromopropylate, chlorbenside, chlorfenethol, chlorfenson, chlorfensulphide, chlorobenzilate, chloropropylate, cyflumetofen, DDT, dicofol, diphenyl sulfone, dofenapyn, fenson, fentrifanil, fluorbenside, genit hexachlorophene, phenproxide, proclonol, tetradifon, and tetrasul.

In certain example embodiments, the acaricide is a carbamate acaricides such as, but not limited to, benomyl, carbanolate, carbaryl, carbofuran, methiocarb, metolcarb, promacyl, and propoxur, aldicarb, butocarboxim, oxamyl, thiocarboxime, and thiofanox.

In certain example embodiments, the acaricide is a carbazate acaricide such as, but not limited to, bifenazate.

In certain example embodiments, the acaricide is a dinitrophenol acaricide such as, but no limited to, binapacryl, dinex, dinobuton, dinocap, dinocap-4, dinocap-6, dinocton, dinopenton, dinosulfon, dinoterbon, and DNOC.

In certain example embodiments, the acaricide is a formamidine acaricide such as, but not limited to, amitraz, chlordimeform, chloromebuform, formetanate, formparanate, medimeform, and semiamitraz.

In certain example embodiments, the acaricide is a macrocyclic lactone acaricide such as, but not limited to, tetranactin; avermectin acaricides such as, but not limited to, abamectin, doramectin, eprinomectin, ivermectin, and selamectin; and milbemycin acaricides such as, but no limited to, milbemectin, milbemycin oxime, and moxidectin.

In certain example embodiments, the acaricide is a mite growth regulator such as, but not limited to, clofentezine, cyromazine, diflovidazin, dofenapyn, fluazuron, flubenzimine, flucycloxuron, flufenoxuron, and hexythiazox.

In certain example embodiments, the acaricide is an organochlorine acaricide such as, but not limited to, bromocyclen, camphechlor, DDT, dienochlor, endosulfan, and lindane.

In certain example embodiments, the acaricide is an organophosphorus acaricide such as but limited to, chlorfenvinphos, crotoxyphos, dichlorvos, heptenophos, mevinphos, monocrotophos, naled, TEPP, tetrachlorvinphos, amidithion, amiton, azinphos-ethyl, azinphos-methyl, azothoate, benoxafos, bromophos, bromophos-ethyl, carbophenothion, chlorpyrifos, chlorthiophos, coumaphos, cyanthoate, demeton, demeton-O, demeton-S, demeton-methyl, demeton-O-methyl, demeton-S-methyl, demeton-S-methylsulphon, dialifos, diazinon, dimethoate, dioxathion, disulfoton, endothion, ethion, ethoate-methyl, formothion, malathion mecarbam, methacrifos, omethoate, oxydeprofos, oxydisulfoton, parathion, phenkapton, phorate, phosalone, phosmet, phostin, phoxim, pirimiphos-methyl, prothidathion, prothoate, pyrimitate, quinalphos, quintiofos, sophamide, sulfotep, thiometon, triazophos, trifenofos, vamidothion, trichlorfon, isocarbophos, methamidophos, propetamphos, dimefox, mipafox, and schradan.

In certain example embodiments, the acaricide is an organotin acaricide such as, but not limited, azocyclotin, cyhexatin, fenbutatin oxide, and phostin.

In certain example embodiments, the acaricide is a phenylsulfamide acaricide such as, but not limited to, dichlofluanid.

In certain example embodiments the acaricide is a phthalimide acaricide such as, but not limited to dialifos and phosmet.

In certain example embodiments, the acaricide is a pyrazole acaricide such as, but not limited to, cyenopyrafen, fenpyroximate, pyflubumide, tebufenpyrad, acetoprole, fipronil, and vaniliprole.

In certain example embodiments, the acaricide is a pyrethroid acaricides such as, but not limited to, acrinathrin, bifenthrin, brofluthrinate, cyhalothrin, cypermethrin, alphacypermethrin, fenpropathrin, fenvalerate, flucythrinate, flumethrin, fluvalinate, tau-fluvalinate permethrin, and halfenprox.

In certain example embodiments, the acaricide is a pyrimidinamine acaricide such as, but not limited to, pyrimidifen.

In certain example embodiments, the acaricide is a pyrrole acaricide such as, but not limited to, chlorfenapyr.

In certain example embodiments, the acaricide is a quaternary ammonium acaricide such as, but not limited to, sanguinarine.

In certain example embodiments, the acaricide is a quinoxaline acaricides such as, but not limited to, chinomethionat and thioquinox.

In certain example embodiments, the acaricide is a strobilurin acaricide such as, but not limited to, bifujunzhi, fluacrypyrim, flufenoxystrobin, and pyriminostrobin.

In certain example embodiments, the acaricide is a sulfite ester acaricide such as but not limited to, aramite and propargite.

In certain example embodiments, the acaricide is a tetronic acid acaricide such as, but not limited to, spirodiclofen.

In certain example embodiments, the acaricide is a tetrazine acaricide such as, but not limited to, clofentezine and diflovidazin.

In certain example embodiments, the acaricide is a thiazolidine acaricides such as, but not limited to, flubenzimine and hexythiazox.

In certain example embodiments, the acaricide is a thiocarbamate acaricide such as, but not limited to, fenothiocarb.

In certain example embodiments, the acaricide is a thiourea acaricide, such as, but not limited to, chloromethiuron and diafenthiuron.

In certain example embodiments, the acaricide is acequinocyl, afoxolaner, amidoflumet, arsenous oxide, clenpirin, closantel, crotamiton, cyclopate, cymiazole, disulfiram, etoxazole, fenazaflor, fenazaquin, fluenetil, fluralaner, mesulfen, MNAF, nifluridide, nikkomycins, pyridaben, sulfiram, sulfluramid, sulfur, thuringiensin, triarathene, or a combination thereof.

This invention is further illustrated by the following examples, which are not to be construed in any way as imposing limitations upon the scope thereof. On the contrary, it is to be clearly understood that resort may be had to various other embodiments, modifications, and equivalents thereof which, after reading the description herein, may suggest themselves to those skilled in the art without departing from the spirit of the present invention and/or the scope of the appended claims.

EXAMPLES

The ability of gums to build viscosity in water is tied to its heightened ability to bind and order water in a way that slows evaporation of the solution. While not limited to this theory, it is believed that this characteristic could be harnessed in the preparation of agrochemical adjuvants that prevent evaporation of active ingredients and increase the amount and time the active ingredient stays in contact with the target. A number of adjuvant formulations based on xanthan gum and konjac in dry powdered form were prepared, blended at a 1:1 ratio and added to water to create concentrated solutions that were between 0.1 and 10% gum. The adjuvants were then diluted further in water to various final concentrations also containing active herbicides at various treatment rates. The formulations tested are specified in Table 2a and 2b.

TABLE 2b-continued

| Ingredient | Class | $TW_{10}$ | $TW_{11}$ | $TW_{13}$ |
|---|---|---|---|---|
| Modified Starch | Emulsifier | | 19.51 | |
| Glystar 31 Polyol | Dispersing aid | 17.24 | 17.57 | 21.00 |
| Flax Oil | Translocation aid | | | |
| Ecosurf SA-9 | Surfactant | | | |
| Hydrolyzed Sunflower Lecithin | Emulsifier | | | 10.00 |
| Glucopon 425-N | Surfactant | 2.10 | 2.43 | 2.13 |

Gum-based adjuvant formulations with a number of active agrochemicals were tested, including metolachlor as well as a combination treatment with mesotrione and dicamba. The adjuvant formulations were mixed with the agrochemical (i.e. the active formulation) and sprayed on peace lily and hydrangea to determine whether adjuvant compositions worked on multiple types of foliage, peace lily being smooth and hydrangea being fuzzy. The active formulations were sprayed until runoff and the active ingredient residues remaining on the foliage after drying for six hours were measured by gas chromatography or HPLC. This was done by sampling $15/16''$ diameter leaf discs from each plant after being treated and dried, macerating the leaf samples in water, filtering out the solid material and analyzing the liquids to determine the amount of active ingredient residues in each sample. In early studies, the ability of the gum-based adjuvants to deposit residues on the foliage was compared to TABLE 2a

| Ingredient | Class | $TW_0$ | $TW_1$ | $TW_2$ | $TW_3$ | $TW_4$ | $TW_5$ | $TW_6$ | $TW_7$ | $TW_8$ | $TW_9$ |
|---|---|---|---|---|---|---|---|---|---|---|---|
| | | Percentage of Concentrate (g/100 mL) | | | | | | | | | |
| Konjac | Gum | 0.25 | 0.25 | 0.125 | 0.068 | 0.15 | 0.12 | 0.125 | 0.15 | 0.15 | 0.13 |
| Xanthan | Gum | 0.25 | 0.25 | 0.125 | 0.068 | 0.15 | 0.12 | 0.125 | 0.15 | 0.15 | 0.13 |
| Water | Diluent | 99.5 | 99.5 | 95.75 | 78.78 | 69.7 | 52.5 | 61.75 | 79.7 | 69.7 | 67.7 |
| PVOH | Dispersing aid | | | 4 | | | | | | | |
| Glycerin | Dispersing aid | | | | 10 | 10 | 7.28 | | | | |
| Soapbark extract (surfactant) | Surfactant | | | | | 20 | | | | | |
| Hydrolyzed Flaxgum (21%) | Translocation aid | | | | 11.08 | | | | | | |
| Modified Starch | Emulsifier | | | | | | 32.7 | 20.0 | | | |
| Glystar 31 Polyol | Dispersing aid | | | | | | 7.28 | 18.0 | 20.0 | 20.00 | 17.24 |
| Flax Oil | Translocation aid | | | | | | | | | 10.0 | 2.1 |
| Ecosurf SA-9 (surfactant) | Surfactant | | | | | | | | | 10.0 | 2.1 |
| Hydrolyzed Sunflower Lecithin | Emulsified | | | | | | | | | | 12.7 |

TABLE 2b

Figure 2:
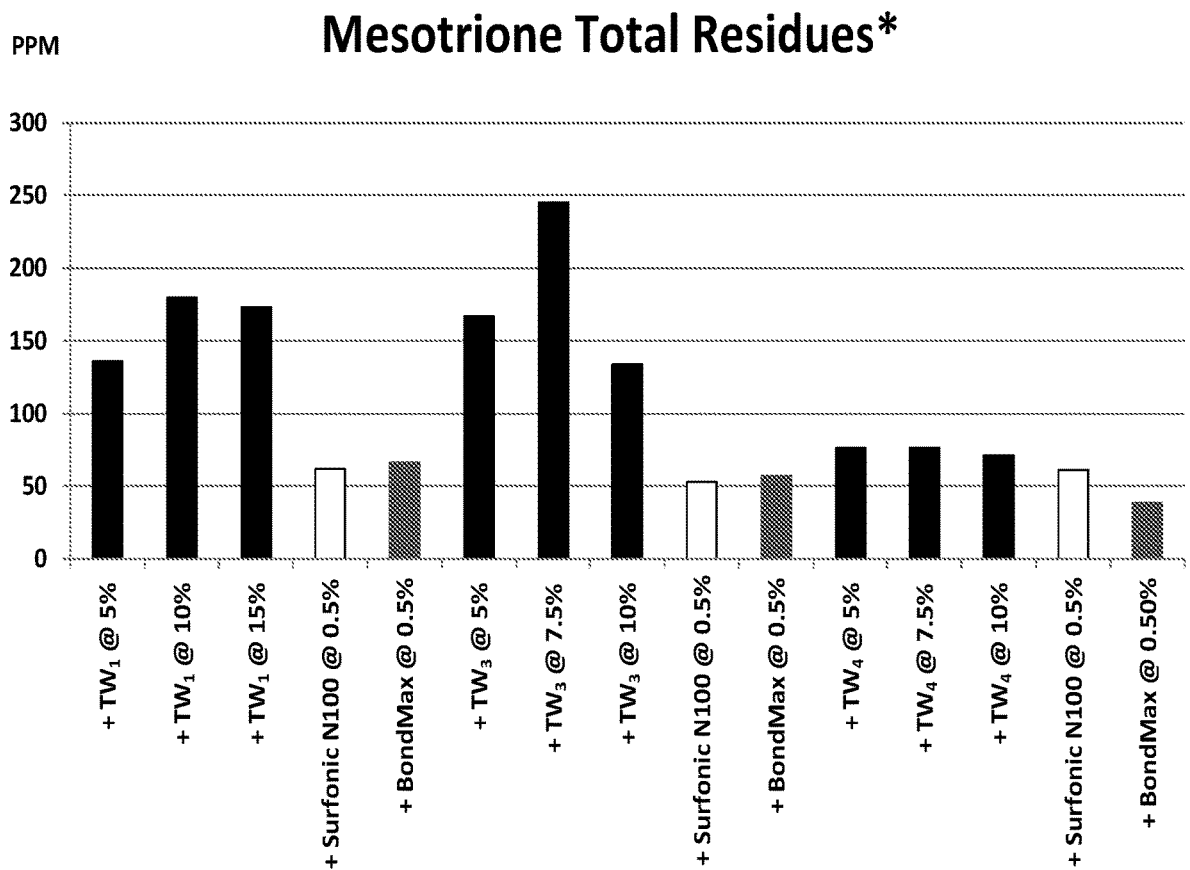
FIG. 2 is a bar graph showing mesotrione residues remaining on peace lily after formulations containing various concentrations of example adjuvants were sprayed until run-off and allowed to dry for six hours as compared to formulations containing the commercial adjuvants Surfonic® N100 and BondMax®.
Figure 3:
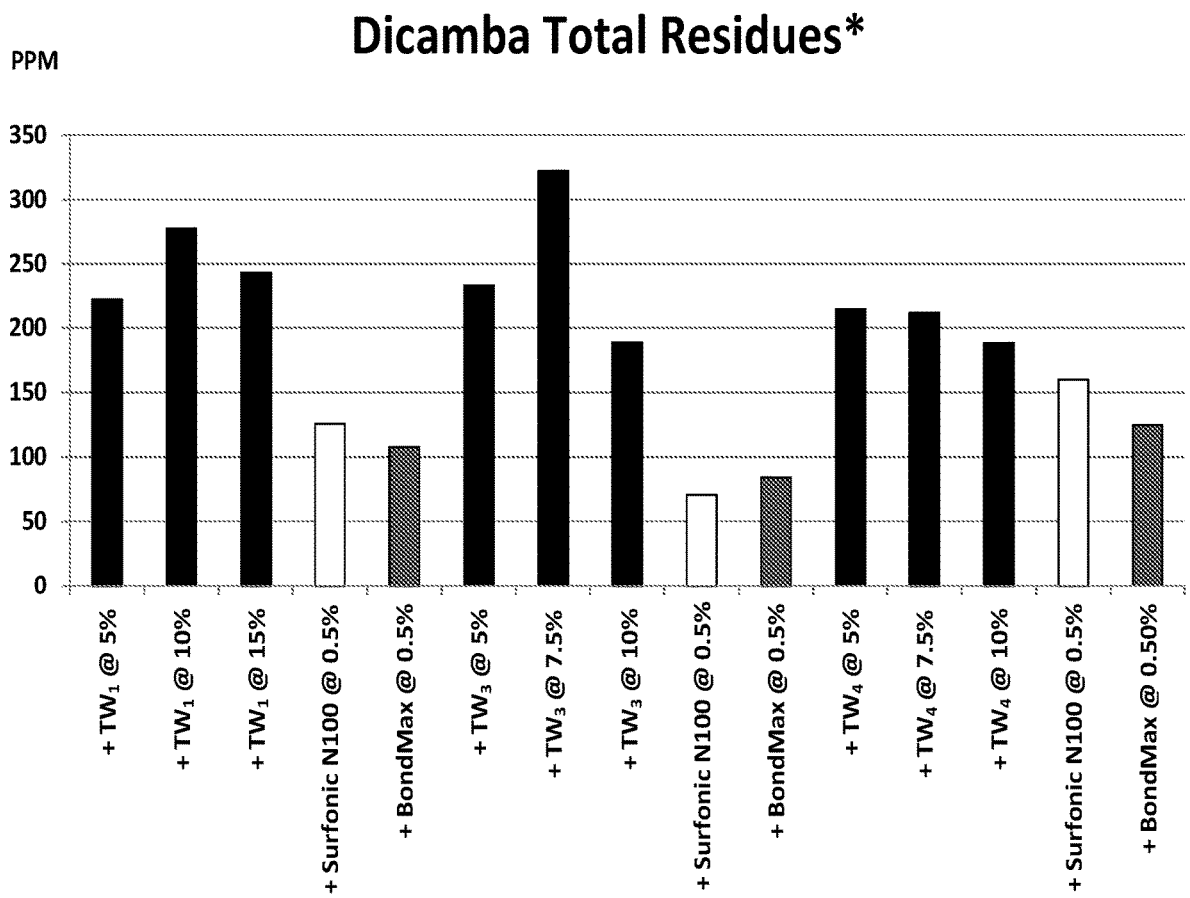
FIG. 3 is a bar graph showing dicamba residues remaining on peace lily after formulations containing various concentrations of example adjuvant formulations were sprayed on peace lily until run-off and allowed to dry for six hours as compared to formulations containing Surfonic® N100 and BondMax®.
Figure 15:
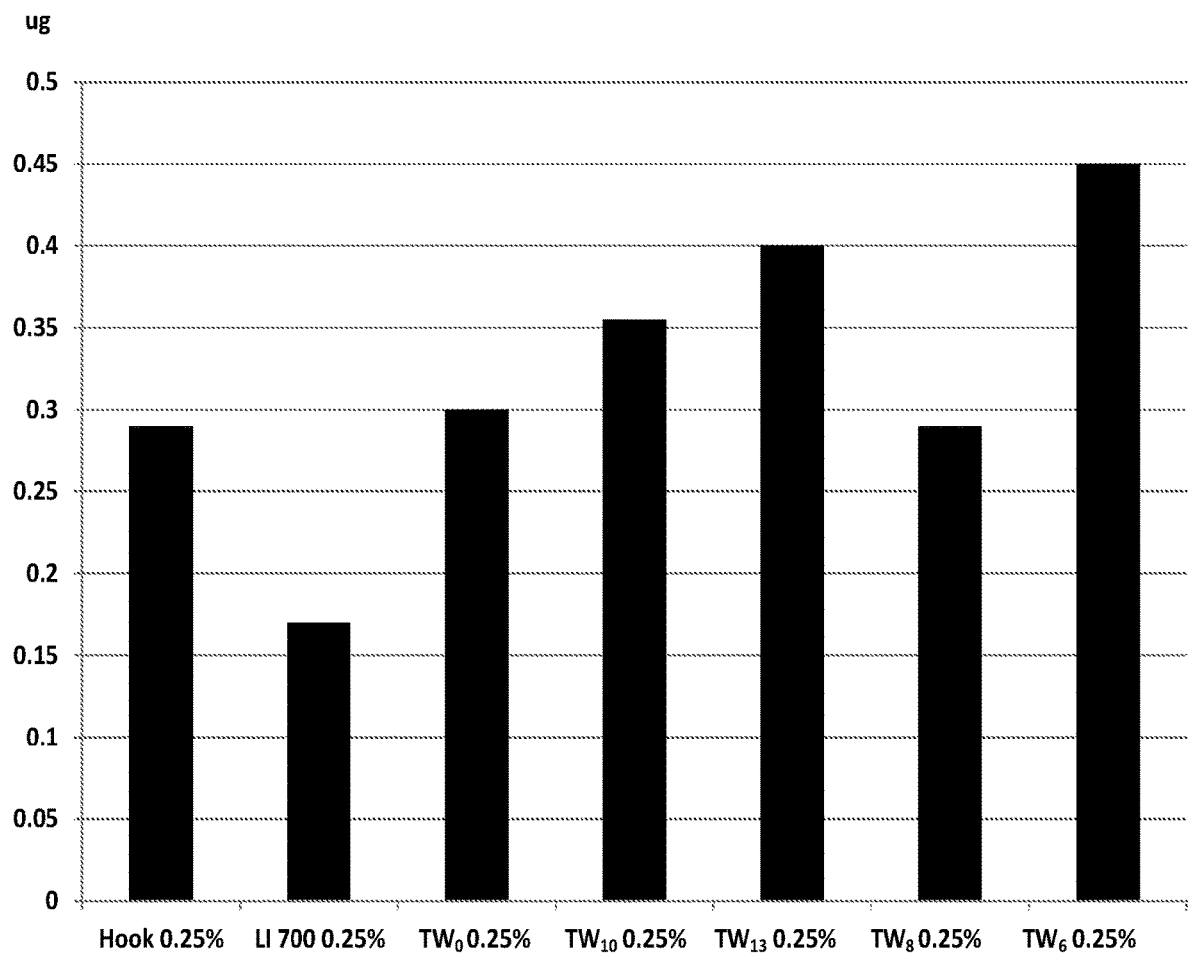
FIG. 15 is a bar graph showing dicamba residues remaining on foliage after spray application of compositions comprising dicamba in combination with either an example adjuvant formulation or the commercially available adjuvants Hook® and LI 700®.
Figure 16:
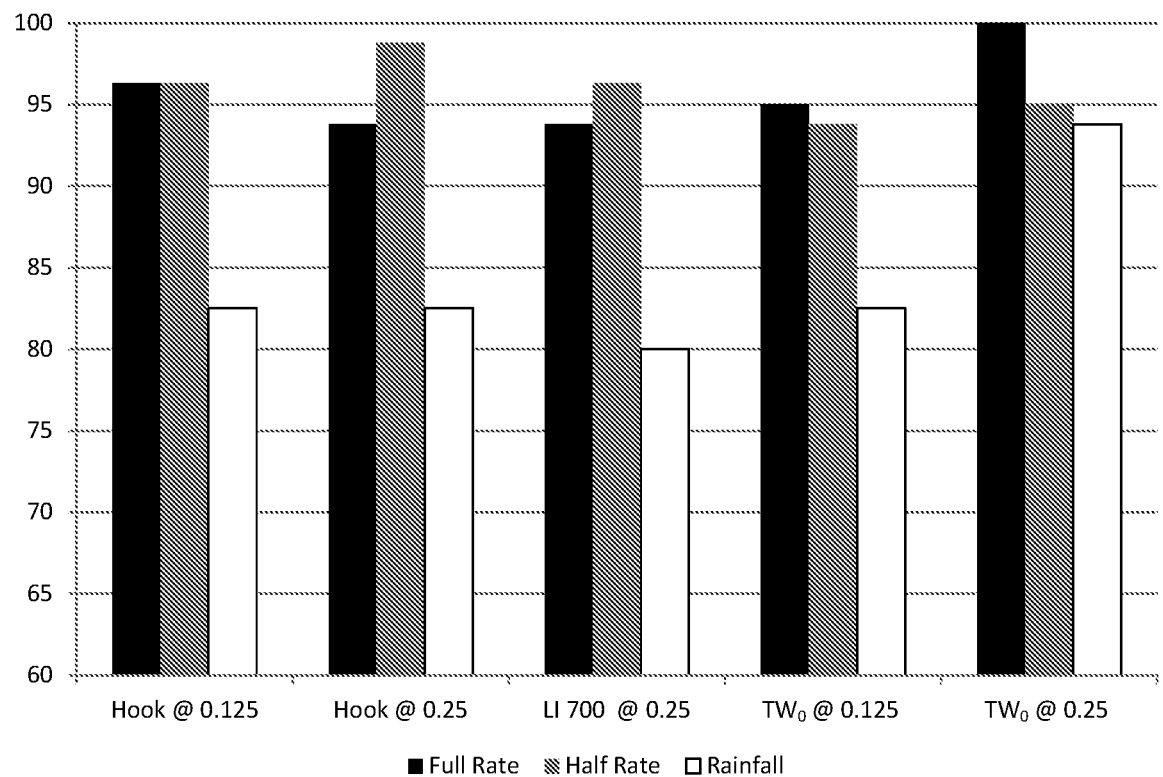
FIG. 16 is a bar graph show the percent weed control after application of an example a combination of mesotrione and dicamba applied in a solution contain example adjuvant formulations or the commercially available adjuvants Hook® and LI 700®.
Figure 17:
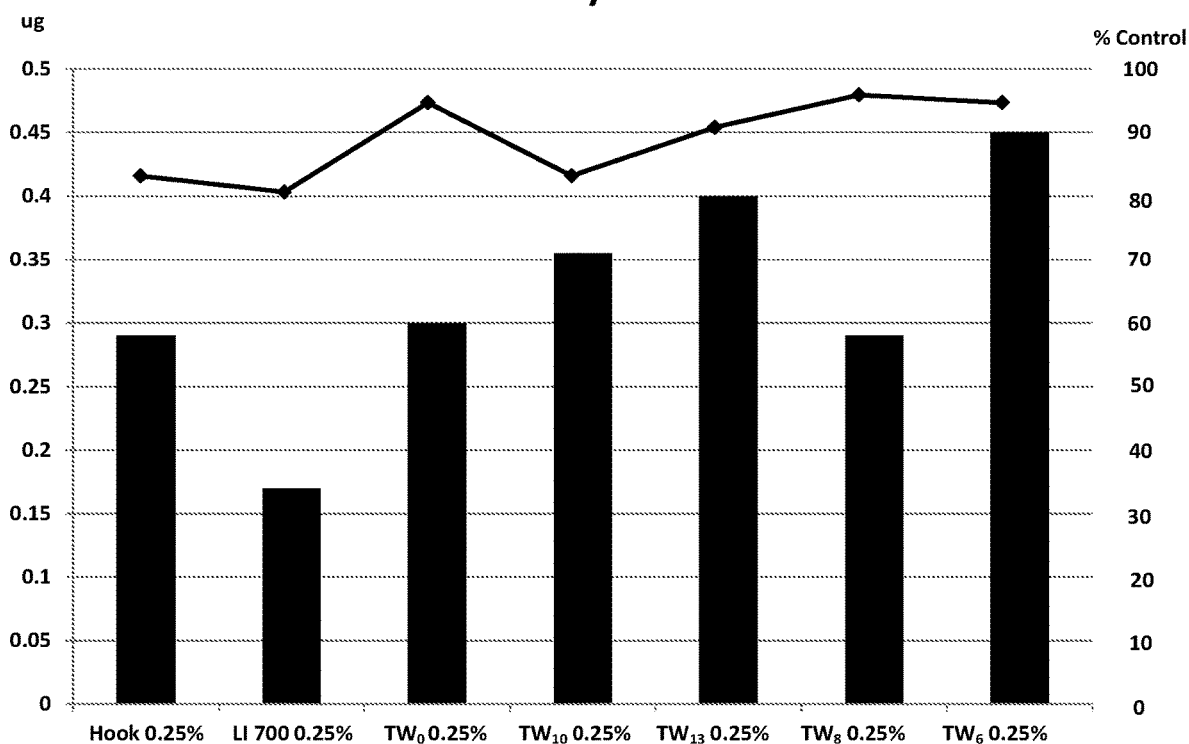
FIG. 17 is a set of two graphs, the bar graph shows dicamba residue deposition onto spray cards when applied with example adjuvant formulations or the commercially available adjuvants Hook® and LI 700®, and the line graph plots the corresponding levels of velvetleaf weed control for each composition.
Figure 18:
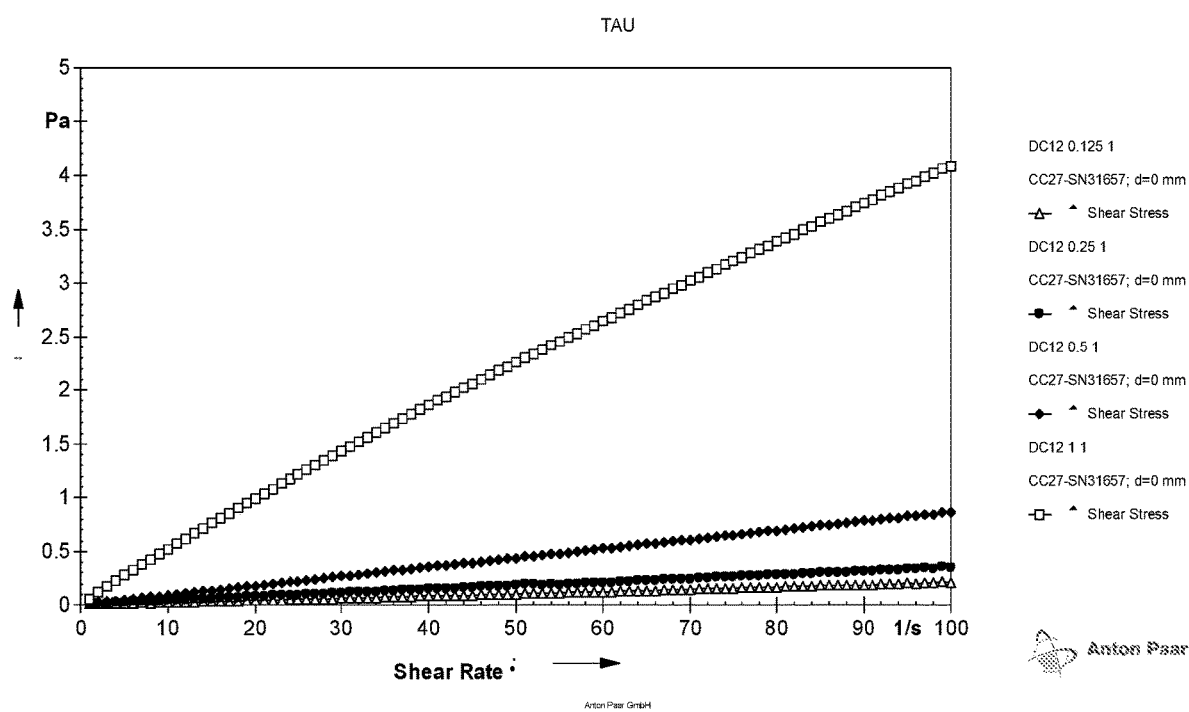
FIG. 18 is a rheology graph showing the increase in viscosity (Pa) as shear stress is applied by a spray nozzle to example formulation DC12 at 0.125%, 0.25%, 0.5% and 1.0% in water
Figure 19:
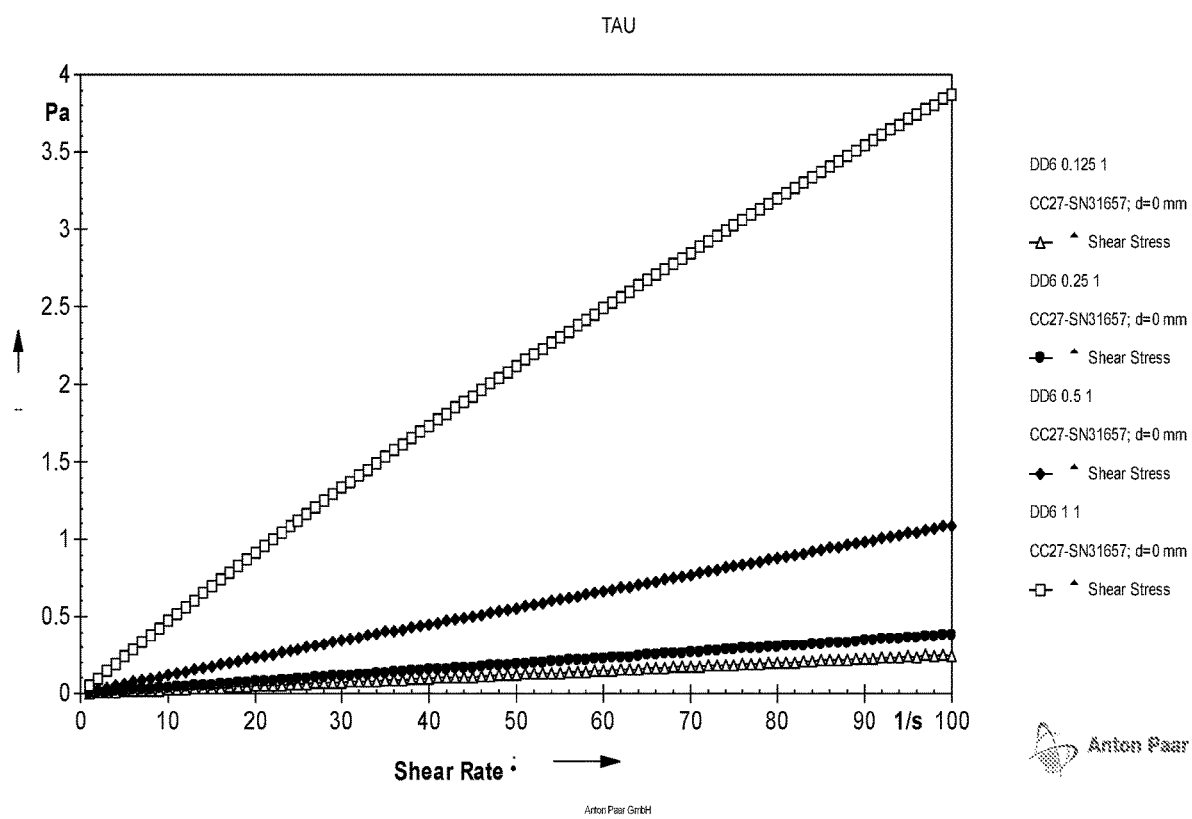
FIG. 19 is a rheology graph showing the increase in viscosity (Pa) as shear stress is applied by a spray nozzle to example formulation DD6 at 0.125%, 0.25%, 0.5% and 1.0% in water.
Figure 20:
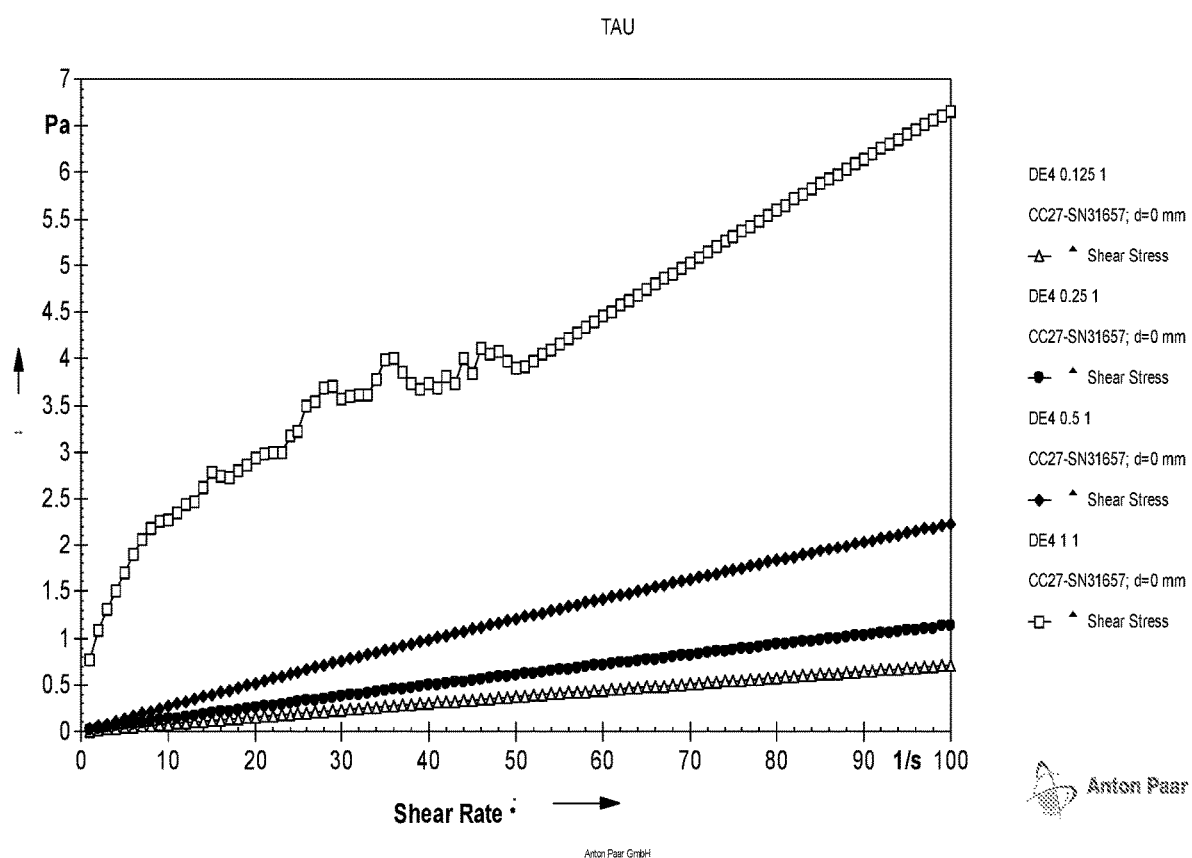
FIG. 20 is a rheology graph showing the increase in viscosity (Pa) as shear stress is applied by a spray nozzle to example formulation DE4 at 0.125%, 0.25%, 0.5% and 1.0% in water.

| Ingredient | Class | $TW_{10}$ | $TW_{11}$ | $TW_{13}$ |
|---|---|---|---|---|
| Konjac | Gum | 0.13 | 0.13 | 0.13 |
| Xanthan | Gum | 0.13 | 0.13 | 0.13 |
| Water | Diluent | 67.7 | 60.23 | 66.61 |
| PVOH | Dispersing aid | | | |
| Glycerin | Dispersing aid | | | |
| Soapbark extract | Surfactant | | | |
| Hydrolyzed Flaxgum (21%) | Translocation aid | 12.70 | | | that of BondMax® and Surfonic® N100, two commercially available agrochemical adjuvants. FIGS. 1-3 show that the test formulations used performed comparably to or better than the commercial standards in terms of residue deposition. FIG. 15 shows similar data at lower concentrations of adjuvant. FIG. 17 show a comparison between residue deposition on spray card and level of weed control when the same compositions were applied to velvet leaf.

It is important to note that a significant advantage of gum-based adjuvant formulations is that such formulations are much more environmentally friendly than those typically contained in existing commercial products. For example, BondMax® is a latex-based product that leaves latex behind in the environment when sprayed on crops, and latex is not biodegradable. Similarly, Surfonic® N100 contains nonylphenol ethoxylates, which can be metabolized into nonylphenol. Nonylphenol ethoxylates are moderately bioaccumulative and extremely toxic to aquatic organisms, and are currently targeted by a U.S. Environmental Protection Agency (EPA) action plan to reduce the amount of these compounds allowed to enter the environment. The gum-based adjuvant formulations described herein, on the other hand, are readily soluble in water and safe for the environment.

One class of ingredients used in combination with xanthan gum and konjac consists of dispersing agents. It was noted during testing of the gum blend at various concentrations that some of the higher concentrations tested required significant agitation to go into solution in a tank mix, which is the combination of water with active agrochemicals and adjuvants prepared by the farmers using the mix to protect crops. In certain instances, it is desirable that only mild agitation be required to get all the tank mix components into solution. A class of dispersant determined to be suitable for this purpose is polyols.

Figure 4:
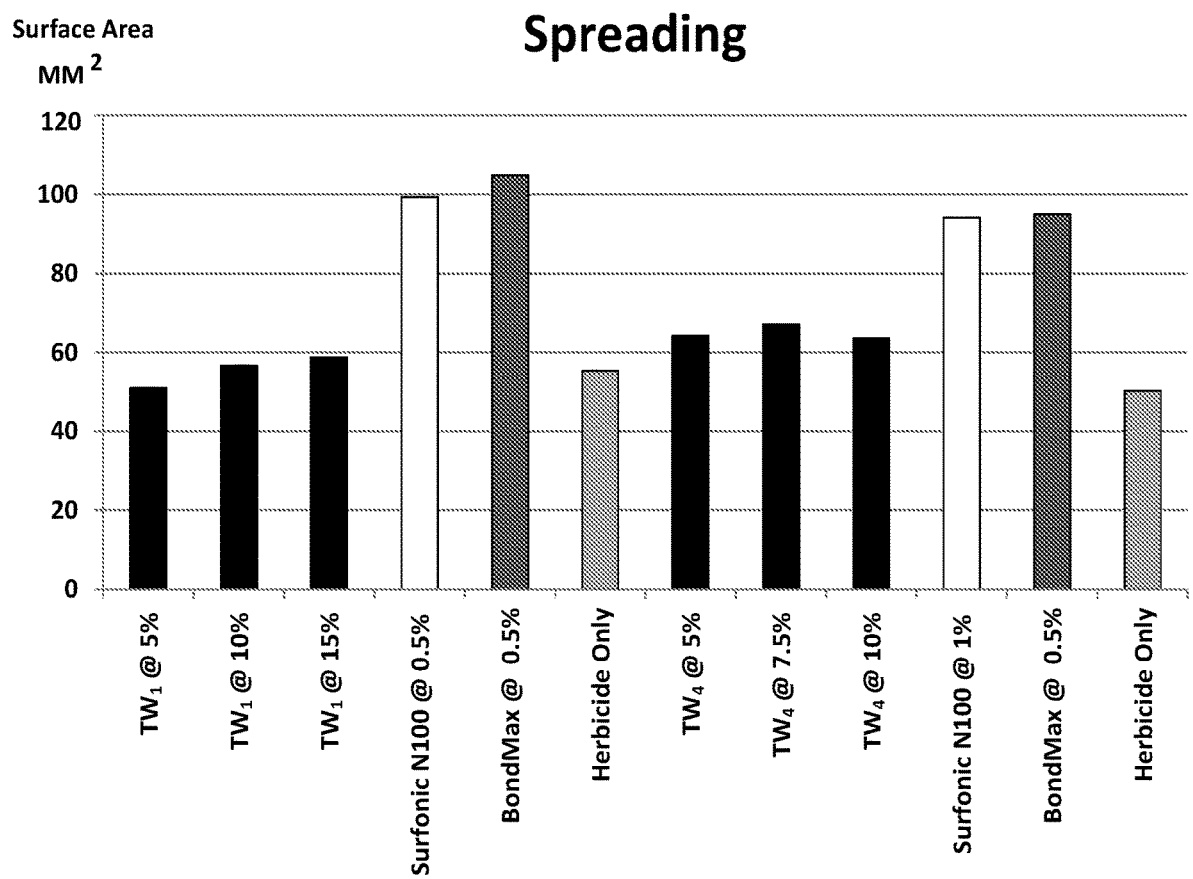
FIG. 4 is a bar graph showing the total surface area covered by 100 μL droplets containing various concentrations of example adjuvant formulations in water after being allowed to spread for two seconds as compared to Surfonic® N100 and BondMax® in water.
Figure 5:
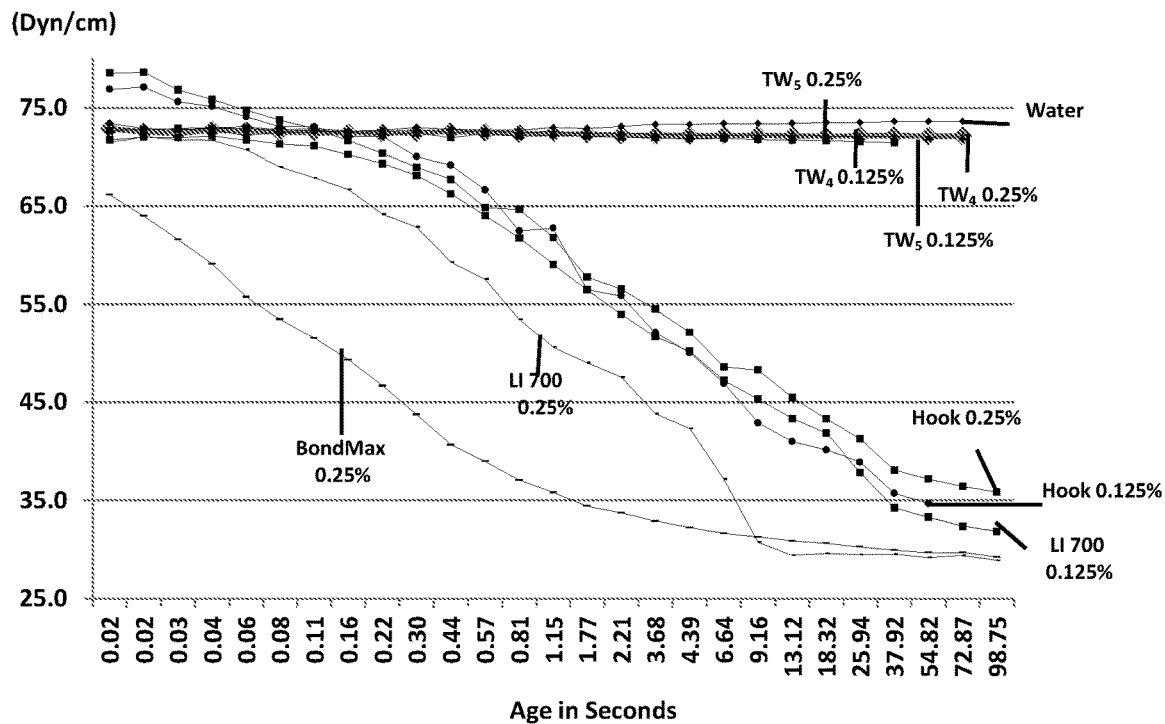
FIG. 5 is a line graph showing dynamic surface tension of example adjuvant formulations at various concentrations in water as compared to the commercial adjuvants BondMax®, Hook® and LI 700® at the same concentrations in water, and water alone.
Figure 14:
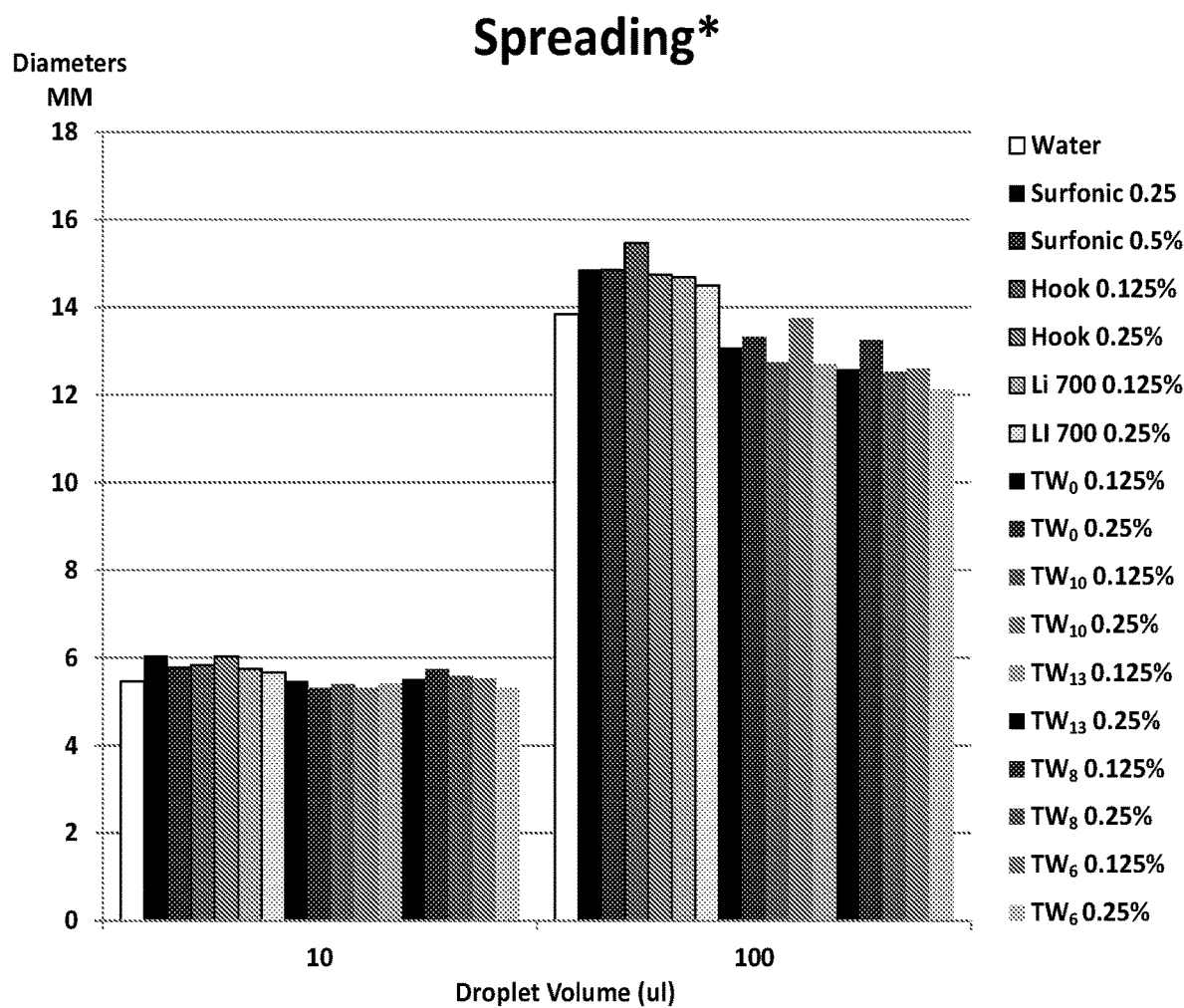
FIG. 14 is a bar graph showing the size of droplets formed from 10 μl and 100 μl volume solutions comprised of Surfonic®, Hook®, LI 700® and various example adjuvant formulations after being allowed to spread on a flat polymer surface for one hour.

It was observed that polyols, such as sugar alcohols, in addition to improving the ability of gum concentrates to disperse in water, are also capable of modifying the surface energy of diluted gum solutions to enable those solutions to spread across the surface area of a target such as a leaf, thereby covering more of the leaf surface per volume applied as compared to a solution containing the same gum composition without a polyol component. For example, formula TW4 contains glycerol, a sugar alcohol that as can be seen in FIG. 4 to enable the xanthan gum and konjac blend to spread over a greater surface area following addition of a droplet to a polyethylene surface, particularly when used in combination with soapbark extract, a natural surfactant. It can also be seen in FIG. 5 that TW4 and TW5 both exhibit dynamic surface tension behavior similar to that of water, while the commercial adjuvants BondMax®, Hook® and Li 700® all exhibit a rapid drop in dynamic surface tension compared to water. What this means is that the gum-based adjuvants do not spread across a surface as readily as the commercial adjuvants studied. Instead, the gum-based adjuvants tend to bead up like water and hold more water. Therefore, when dissolved agrochemicals are applied with the gum-based adjuvants, deposited agrochemicals within the droplets are better able to resist evaporation and runoff. See also FIG. 14.

Figure 6:
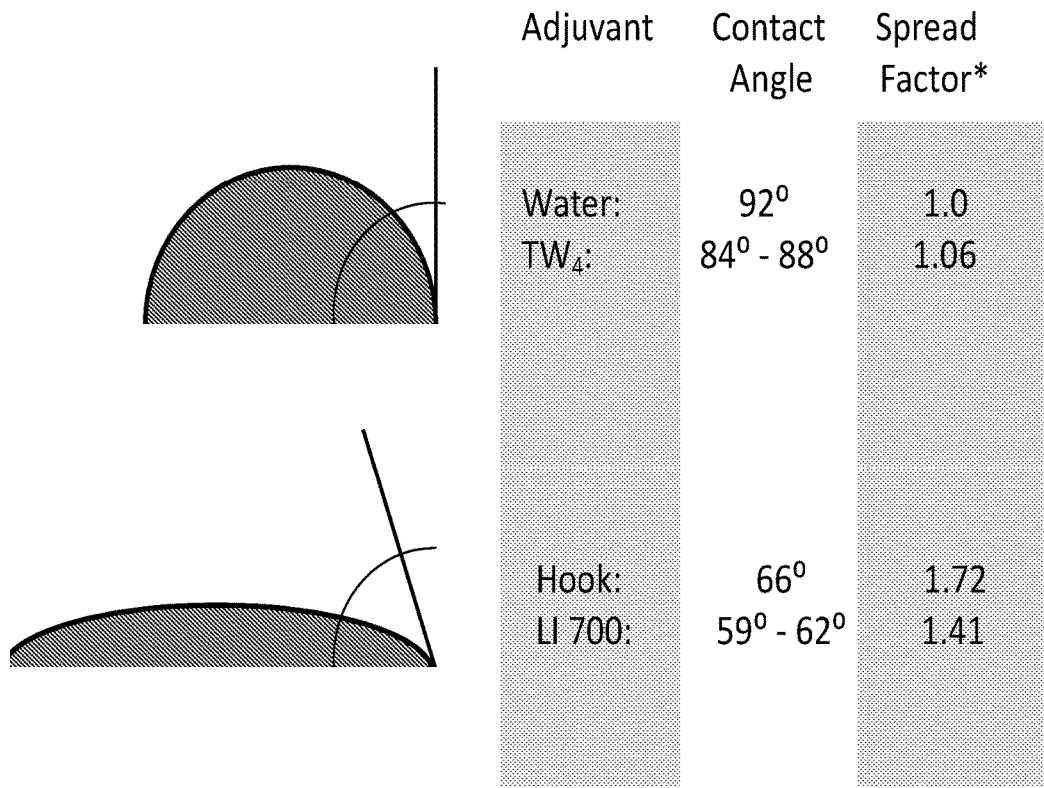
FIG. 6 is a diagram depicting the difference in contact angle of a water droplet on a flat surface as compared to Hook® in water, and the inverse relationship between contact angle and the ability of the droplets to spread over the surface.
Figure 7:
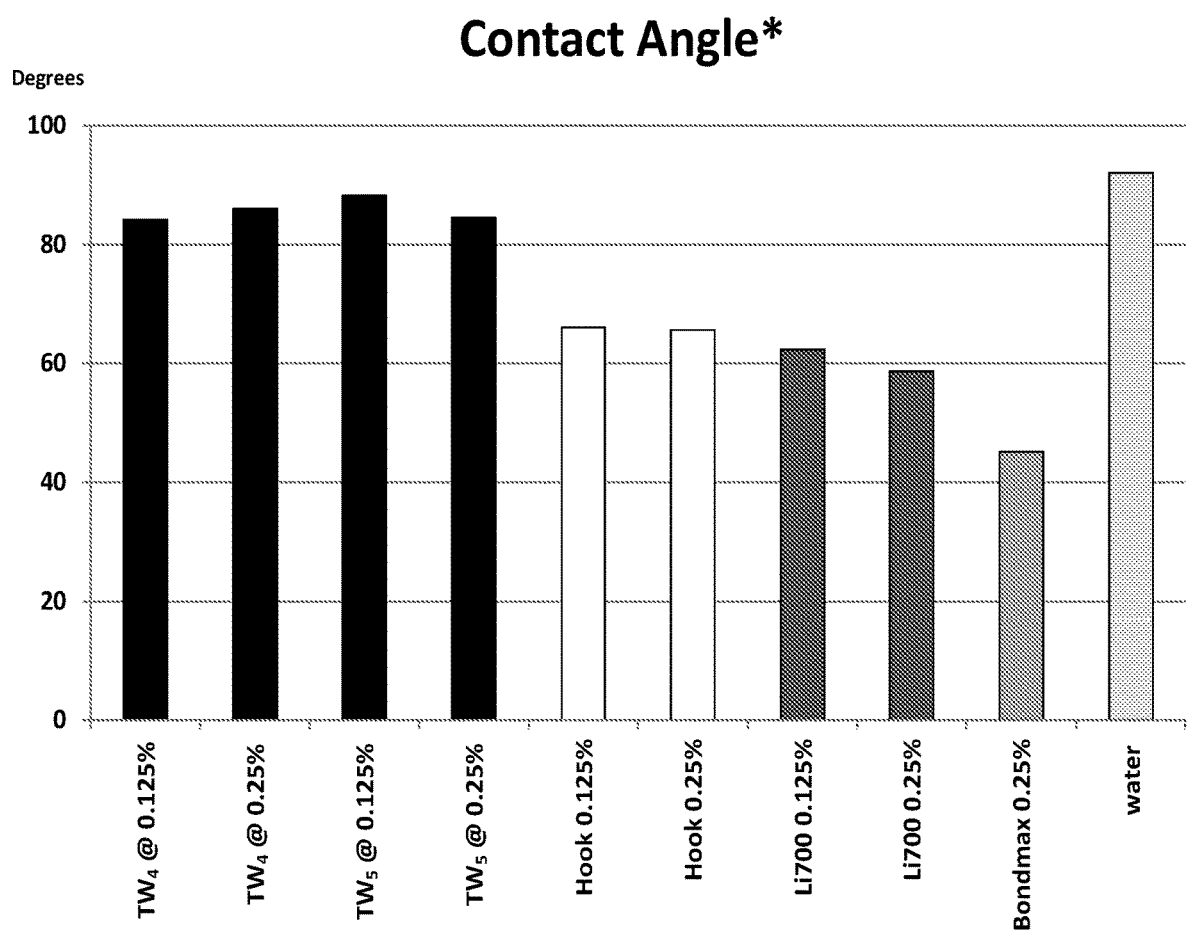
FIG. 7 is a bar graph showing contact angles of two different aqueous example adjuvant formulations at 0.125-0.25% two seconds after droplets were applied to a flat polyethylene surface, as compared to Hook®, LI 700® or BondMax® in water at the same concentrations, or water alone.

This observation is explained further in the graphic of FIG. 6. The contact angle of where the droplet meets a polyethylene surface was measured using high-speed photography two seconds after 100 mL of a TW4 or TW5 droplet was applied. The adjuvants behaved much more like water than the commercial standards used. This data is presented in FIG. 7, which shows that the contact angle is much lower for the commercial standards than water or the gum-based adjuvants.

These observations led to additional experiments with selected active ingredients designed to identify the most effective formulations in terms of "open time," defined as the time the active ingredient remains in solution on the leaf surface and available for uptake in the case of herbicides, or contact in the case of insecticides and fungicides. Open time is a function of the coverage of the target foliage and evaporation time, and is thus maximized when a large area of the target is kept in contact with the active ingredient formulation, evaporation time is increased, and the formulation is resistant to wash off by rain.

Figure 8:
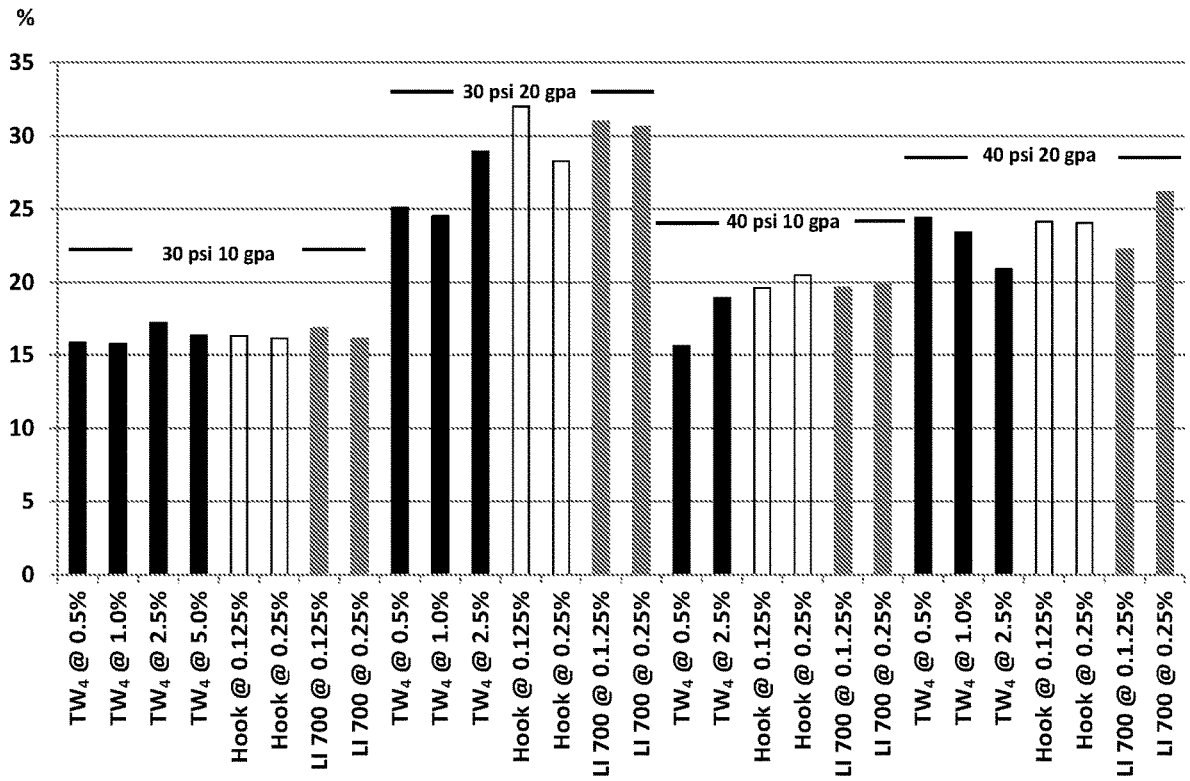
FIG. 8 is a bar graph showing surface (spray card) coverage of aqueous formulations of an example adjuvant formulation at various concentrations in water as compared to Hook® and LI 700® at the same concentrations in water using various spray pressures and treatment rates.
Figure 9:
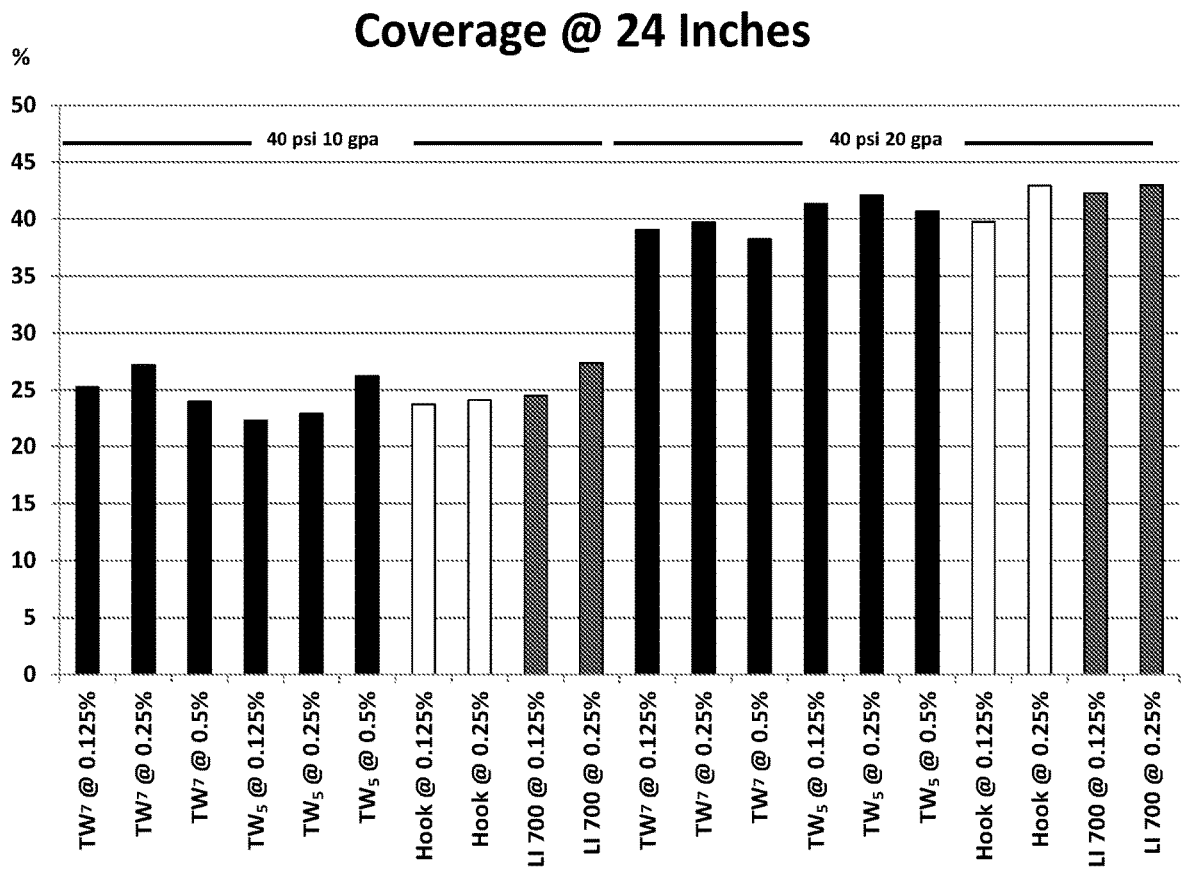
FIG. 9 is a bar graph showing surface (spray card) coverage of aqueous formulations of example adjuvant formulations at various concentrations in water as compared to Hook® and LI 700® at similar concentrations in water, sprayed at 30 or 40 pounds per square inch, at a treatment rate of 10 or 20 gallons per acre.

Initial studies were conducted using various commercially available herbicides at their recommended usage rates. Because it was possible to get greater deposition of active herbicides on peace lily or *hydrangea* without spreading, it was concluded that the functionality of the adjuvants as deposition aids derived from the high dynamic surface tension of the formulations tested. To test this hypothesis, various gum-based adjuvant formulations were sprayed on spray cards from a height of two feet using various pressures and application rates similar to those employed in the field by farmers. Spray cards are small square cards that change color when the sprays are deposited on their surfaces, enabling one to then perform visual or photometric analysis to determine which formulations were best at covering the cards with spray droplets. The applicants compared the ability of TW4 to cover the cards to that of Hook®, BondMax® and LI 700®. TW4 performed comparably to these commercial products for the most part when sprayed at a pressure of 30-40 pounds per square inch (psi) using a treatment rate of 10-20 gpa. The applicants also studied the performance of TW5 and TW7 against the commercial standards, this time with mesotrione included in the formulations. Again, these adjuvants performed similarly to the commercial standards, as can be seen in FIGS. 8 and 9.

An additional feature of the gum-based adjuvants disclosed herein derives from their thixotropic properties. When sprayed under pressure, the dissolved gums shear thin as they exit the nozzle but then become more viscous once out. This means that a larger percentage of the spray droplets will coalesce, leading to a greater percentage of the spray being composed of larger droplets and a reduction in fines. This is particularly important in drift control, which is of great interest to the EPA That is, the EPA desires a reduction in off-target application agrochemicals desired, and there are penalties associated with the drift of sprayed agrochemicals onto off-target crops growing on neighboring lands.

Figure 10:
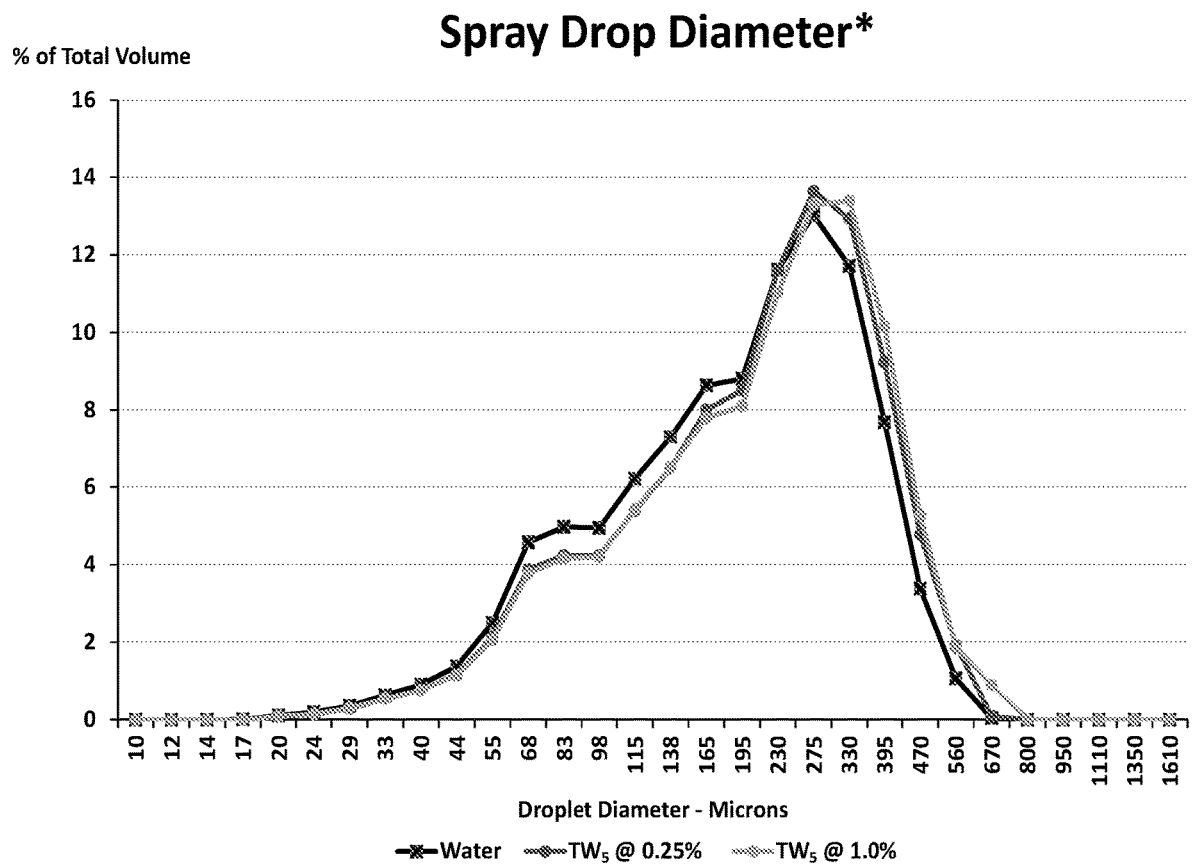
FIG. 10 is a graph showing size distribution of spray droplets containing an example adjuvant formulation at two concentrations as compared to water alone.
Figure 11:
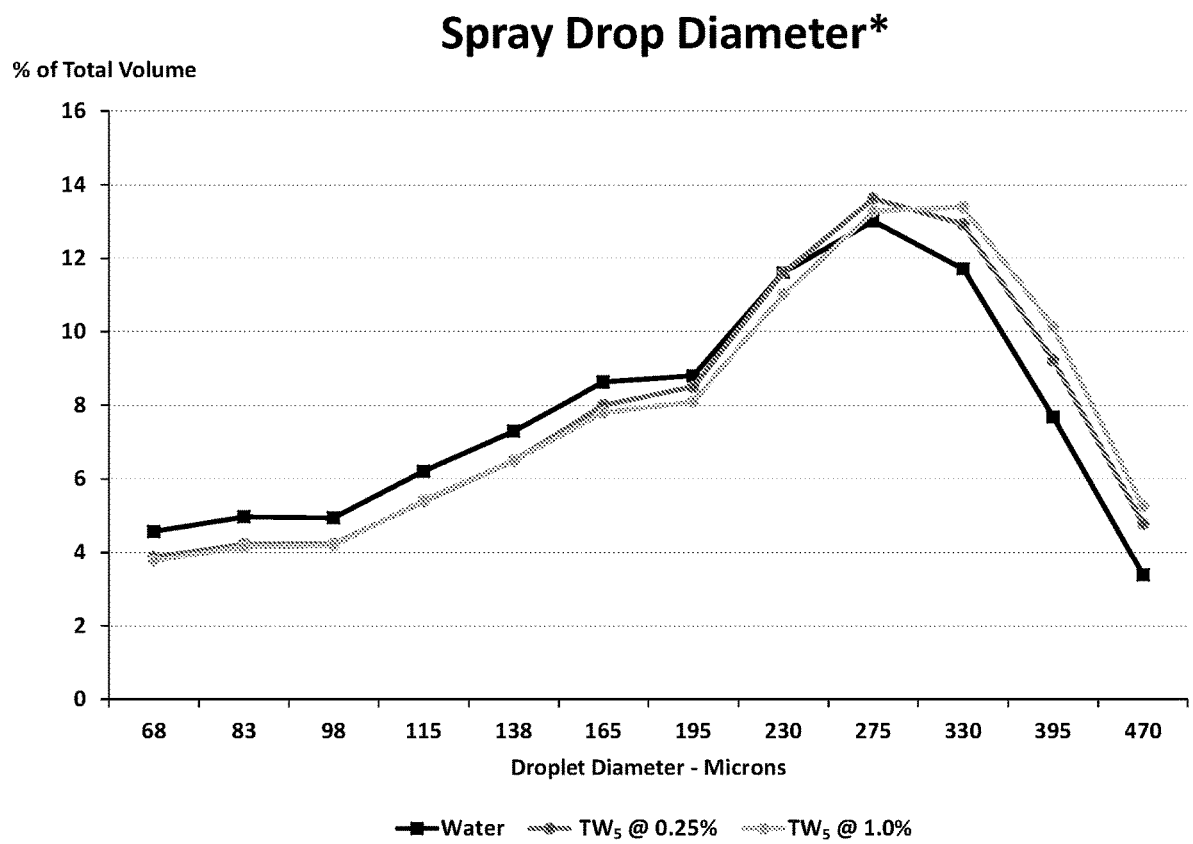
FIG. 11 is a graph showing size distribution of spray droplets from a solution containing example adjuvant formulations at two concentrations as compared to water alone. The data is a subset of the data represented in FIG. 10, which excludes the smallest and largest droplet sizes.
Figure 12:
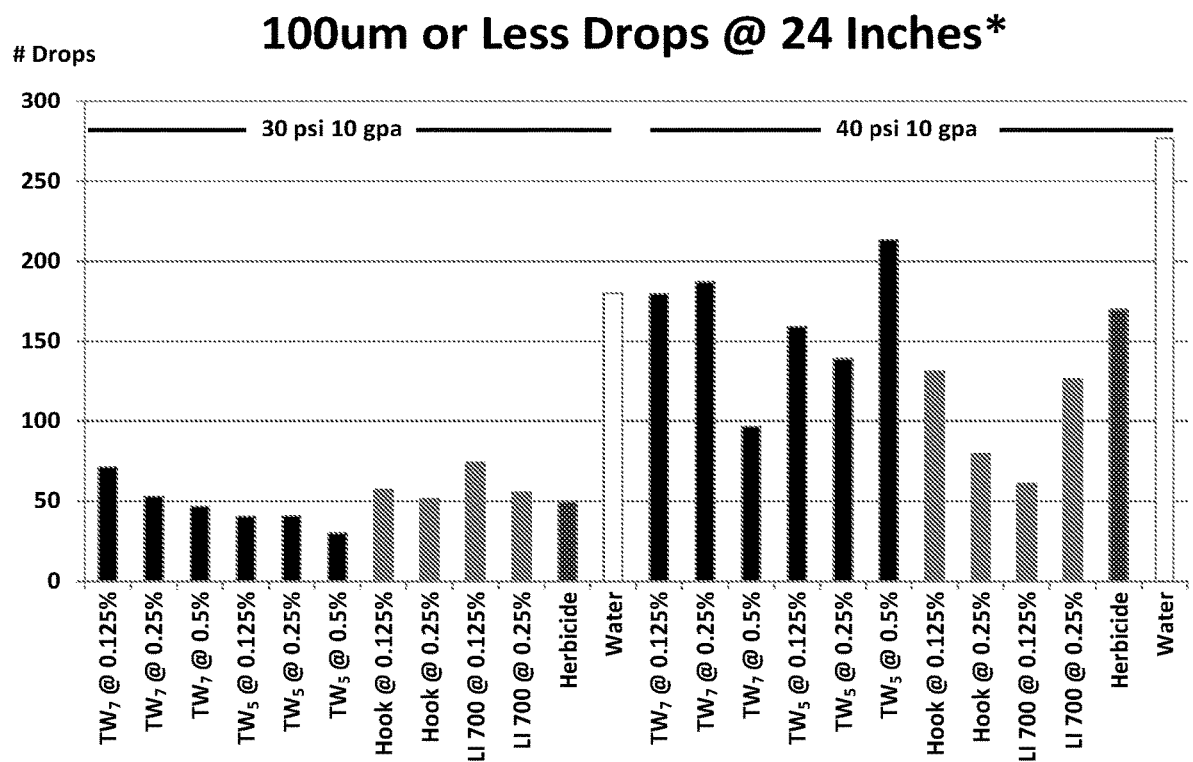
FIG. 12 is a bar graph showing the size distribution of droplets from a solution containing example adjuvant formulation as compared to Hook®, LI 700®, herbicide alone and water at two different spray pressures.

The gum-based adjuvants disclosed herein have the ability to significantly reduce drift by virtue of their ability to increase the percentage of a spray that is composed of large droplets. FIGS. 10 and 11 representing the following data table on the next page, show an overall increase in the number of droplets 100 microns in diameter or greater compared to water. TW5 not only showed a reduction in small droplets, or "fines", but also an increase in large droplets, which is a key to reducing drift. Moreover, FIG. 12 shows a reduction in fines when sprayed at up to 40 psi compared to water, with performance being comparable to the commercial standards tested.

Another attribute of the invention is wash off resistance. When it rains, previously applied agrochemicals sprayed on crops are washed off the foliage and thus can no longer act on the target. TW0 was sprayed on peace lily and *hydrangea* leaves until runoff then allowed to dry for six hours. At that point samples were taken as previously described in the application. The additional step of providing 2.5 inches of simulated rainfall on other samples before collection was also added to see if TW0 could

| Droplet Diameter | % of Total (FIG. 10) | | | Cumulative % >150 um (FIG. 11) | | |
|---|---|---|---|---|---|---|
| (Microns) | water | W5 0.25% | W5 1% | water | W5 0.25% | W5 1% |
| 10 | 0 | 0 | 0 | | | |

-continued

Figure 13:
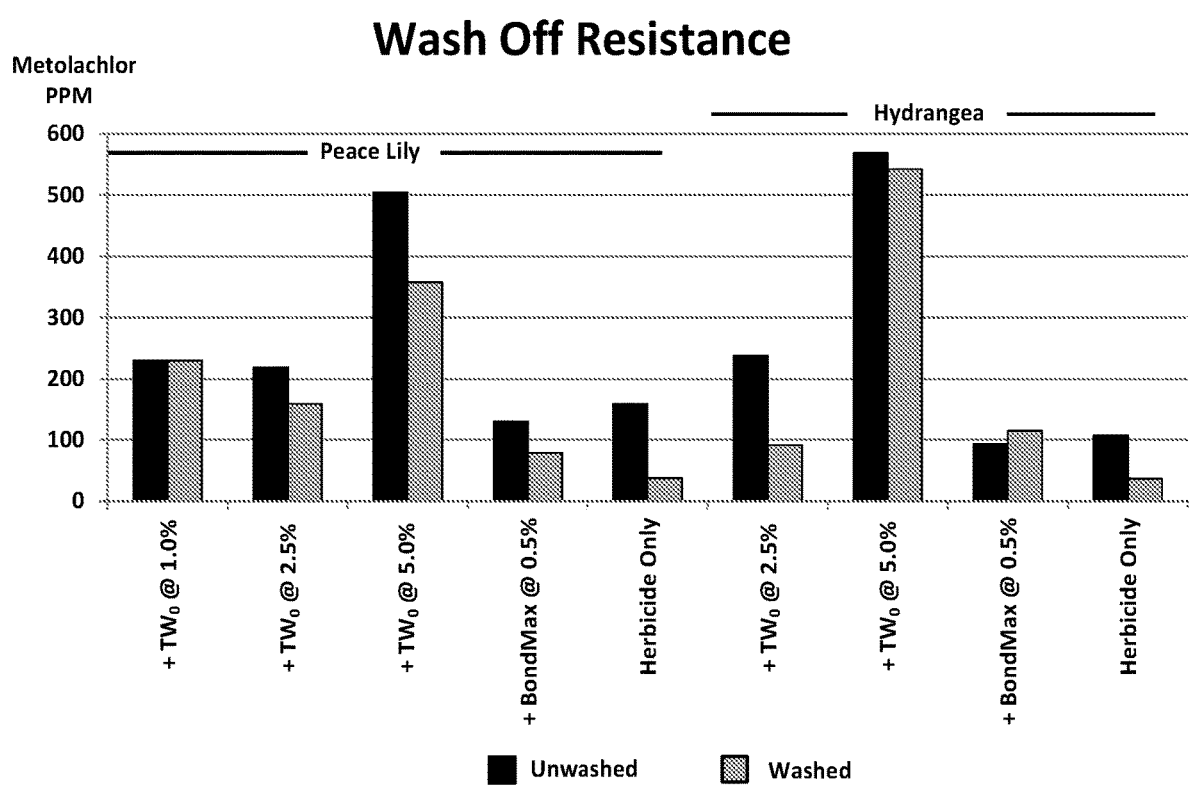
FIG. 13 is a bar graph showing wash off resistance of example adjuvant compositions as compared to Bond Max® and an herbicide alone.

| Droplet Diameter | % of Total (FIG. 10) | | | Cumulative % >150 um (FIG. 11) | | |
|---|---|---|---|---|---|---|
| (Microns) | water | W5 0.25% | W5 1% | water | W5 0.25% | W5 1% |
| 12 | 0 | 0 | 0 | | | |
| 14 | 0 | 0 | 0 | | | |
| 17 | 0.01 | 0 | 0 | | | |
| 20 | 0.11 | 0.08 | 0.08 | | | |
| 24 | 0.2 | 0.14 | 0.15 | | | |
| 29 | 0.36 | 0.29 | 0.3 | | | |
| 33 | 0.63 | 0.54 | 0.54 | | | |
| 40 | 0.9 | 0.76 | 0.76 | | | |
| 44 | 1.38 | 1.17 | 1.15 | | | |
| 55 | 2.5 | 2.13 | 2.06 | | | |
| 68 | 4.57 | 3.87 | 3.77 | | | |
| 83 | 4.97 | 4.23 | 4.16 | | | |
| 98 | 4.94 | 4.23 | 4.2 | | | |
| 115 | 6.21 | 5.39 | 5.42 | | | |
| 138 | 7.29 | 6.49 | 6.5 | | | |
| 165 | 8.63 | 8 | 7.8 | 8.63 | 8 | 7.8 |
| 195 | 8.8 | 8.5 | 8.09 | 17.43 | 16.5 | 15.89 |
| 230 | 11.61 | 11.61 | 11.02 | 29.04 | 28.11 | 26.91 |
| 275 | 13.02 | 13.63 | 13.28 | 42.06 | 41.74 | 40.19 |
| 330 | 11.71 | 12.93 | 13.39 | 53.77 | 54.67 | 53.58 |
| 395 | 7.68 | 9.22 | 10.13 | 61.45 | 63.89 | 63.71 |
| 470 | 3.38 | 4.78 | 5.26 | 64.83 | 68.67 | 68.97 |
| 560 | 1.06 | 1.92 | 1.85 | 65.89 | 70.59 | 70.82 |
| 670 | 0.04 | 0.09 | 0.89 | 65.93 | 70.68 | 71.71 |
| 800 | 0 | 0 | 0 | | | |
| 950 | 0 | 0 | 0 | | | |
| 1110 | 0 | 0 | 0 | | | |
| 1350 | 0 | 0 | 0 | | | |
| 1610 | 0 | 0 | 0 | | | | prevent wash off of metolachlor contained in the formulation. TW0 performed comparably to or better than Bond-Max® with respect to wash off resistance. See FIG. 13. Additional formulations were made throughout the course of the studies to identify optional components that could be added to the gum concentrates with or without polyol prior to dilution and treatment. For example, in some cases it was observed that while the total herbicide residues present on the foliage were higher, there was not a direct correlation between residues and plant mortality, suggesting that the components used in the adjuvant formulation may have been blocking translocation from leaf to root. A technique that may be used to overcome this problem is to add a translocation aid. The essential characteristics of translocation aids used with herbicides are low molecular weight and some electrical charge. Materials derived from flaxseed, such as hydrolyzed flaxseed or flaxseed oil, which contain short-chained linoleic acid molecules that are able to interact with the active ingredients to facilitate translocation where it may have been inhibited by the larger gum molecules, are examples of translocation aids.

A further improvement to the adjuvant formulations is to include an emulsifier in the formulation to keep solid components that interact with the active ingredients uniformly dispersed in water. Small amounts of starch or gum acacia chemically treated with octenyl succinic acid, as well as *quillaia*, are examples of emulsifiers useful for this purpose.

Figure 21:
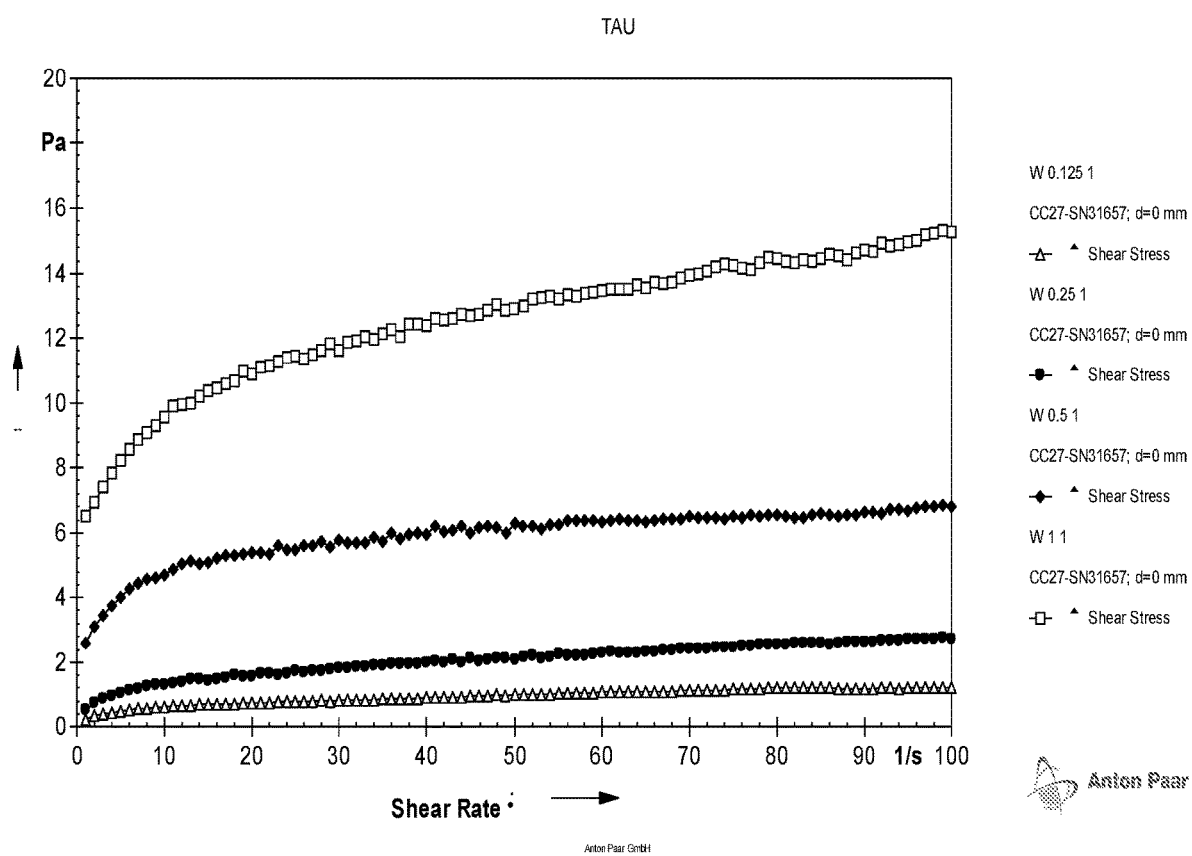
FIG. 21 is a rheology graph showing the increase in viscosity (Pa) as shear stress is applied by a spray nozzle to an example 1:1 blend of xanthan gum and konjac at 0.125%, 0.25%, 0.5% and 1.0% in water.

Control of velvetleaf following treatment with an agrochemical application solution comprising a combination of mesotrione and dicamba and example adjuvant formulations described herein was assessed. The agrochemical application solution was applied at a full rate, half rate, and the plants exposed to simulated rainfall. Full rates of mesotrione and dicamba were 3 and 16 fl oz/A, respectively. Half rates of mesotrione and dicamba were 1.5 and 8 fl oz/A, respectively. Simulated rainfall of 0.25 inches was applied to all plants treated with full rate six hours post treatment. As shown in FIG. 21, the agrochemical solutions comprising the example adjuvant formulations showed comparable or improved weed control and wash off resistance.

EXAMPLE 2

Gum based adjuvant systems were tested for spray drift control effectiveness using guidelines provided by the EPA Guidelines have been published on the EPA website at https://www.epa.gov/sites/production/files/2016-04/documents/drt-protocol_04-21-20 1 6-v2.pdf. Following the EPA's guidance, adjuvant and water spray solutions were analyzed with a Sympatec Helos Vario KR particle size analyzer. With the R7 lens installed, it is capable of detecting particle sizes in a range of 18 to 3500 microns. This system uses laser diffraction to determine particle size distribution. The width of the nozzle plume was analyzed by moving the nozzle across the laser by means of a linear actuator. All testing was performed in a low speed wind tunnel at 15 mph. Quality objectives for this testing include recording volume median diameter (VMD), droplet diameter at the 0.1 fraction of the spray volume (DV0.1) and at the 0.9 fraction of the spray volume (Dv0.9). DV0.1 and Dv0.9 represent the measurements below which 10% and 90% of the droplet diameters fall, respectively. In addition, droplet size data should also include percent volume of droplets :S 105 µm and :S 141 µm. Example adjuvant compositions tested are summarized in Table 3 below.

Wind tunnel test data is shown in Table 5.

These data demonstrate that the gum-based adjuvant systems are capable of significantly reducing the lowest droplet size fraction (DV0.1) as well increasing the VMD as compared to water. Further, specific gum combinations used in the tested adjuvant formulations are able to significantly reduce the volume represented by the smallest droplet size fraction (DV0.1) as compared to currently available adjuvant systems. A reduction in the volume of the smallest size droplets and a shift to larger size droplets will help to reduce off-target drift. Additional testing data is shown in Table 6, with final application usage rates provided.

TABLE 3

| Sample Number | Malto-dextrin | Carra-geenan | CMC | HPMC | MC | PGA | Sodium Alginate | Gum *Acacia* | Modified Gum *Acacia* | Konjac | Guar Gum | Xanthan Gum | Pectin |
|---|---|---|---|---|---|---|---|---|---|---|---|---|---|
| DC4 | 80 | 10 | | | 10 | | | | | | | | |
| DC5 | 80 | | | | 10 | | 10 | | | | | | |
| DC6 | 60 | | 20 | | 20 | | | | | | | | |
| DC7 | 80 | | | | 10 | | | | | | | 10 | |

TABLE 3-continued

| Sample Number | Malto-dextrin | Carra-geenan | CMC | HPMC | MC | PGA | Sodium Alginate | Gum Acacia | Modified Gum Acacia | Konjac | Guar Gum | Xanthan Gum | Pectin |
|---|---|---|---|---|---|---|---|---|---|---|---|---|---|
| DC8 | 70 | | | | 10 | | | | | | 20 | | |
| DC10 | 80 | | | | 10 | | | | | | | 10 | |
| DC12 | 60 | | | | 20 | | | 16* | | | | | 20 |
| DD4 | 80 | 10 | | 10 | | | | | | | | | |
| DD5 | 80 | | | 10 | | | 10 | | | | | | |
| DD6 | 60 | | 20 | 20 | | | | 16* | | | | | |
| DD7 | 80 | | | 10 | | | | | | 10 | | | |
| DD8 | 70 | | | 10 | | | | | | | 20 | | |
| DD10 | 80 | | | 10 | | | | | | | | 10 | |
| DD12 | 40 | | | 30 | | | | | | | | | 30 |
| DE4 | 60 | 20 | | | | 20 | | 16* | | | | | |
| DE6 | 40 | | 30 | | | 30 | | | | | | | |
| DE7 | 80 | | | | | 10 | | | | 10 | | | |
| DE8 | 70 | | | | | 10 | | | | | 20 | | |
| DE10 | 80 | | | | | 10 | | | | | | 10 | |
| DE12 | 40 | | | | | 30 | | | | | | | 30 |
| DI10 | 50 | | | | | | 40 | | | | | 10 | |
| DJ10 | 50 | | | | | | | | 40 | | | 10 | |

*DC12, DD6 and DE4 were tested with and without gum *acacia*.

TABLE 4

| Metric | Data |
|---|---|
| Wind speed (mph) | 15 |
| Temperature (° F.) | 71.6 |
| Relative humidity (%) | 38.3 |
| Nozzle Type | XM11003 (flat fan) |
| Nozzle pressure (psi) | 43.5 |
| Measurement distance (in) | 12 |
| Particle size analyzer | HELOS KR with R7 lens |

TABLE 5

| Test Treatment | Dv 0.1 μm | VMD μm | Dv 0.9 μm | Pct < 105 μm | Pct < 141 μm | Pct < 150 μm | Pct < 210 μm | Pct < 730 μm | Relative Span |
|---|---|---|---|---|---|---|---|---|---|
| DE4 | 266 | 522 | 842 | 0.85 | 1.88 | 2.18 | 5.18 | 79.67 | 1.1 |
| HPMC | 199 | 425 | 723 | 1.53 | 3.86 | 4.52 | 11.46 | 90.36 | 1.24 |
| DD6 | 151 | 349 | 618 | 3.85 | 8.51 | 9.8 | 20.84 | 96.7 | 1.34 |
| DC12 | 117 | 268 | 473 | 7.55 | 15.6 | 17.75 | 34.17 | 99.94 | 1.33 |
| 5% gum *acacia* | 111 | 229 | 382 | 8.64 | 18.66 | 21.38 | 43.09 | 100 | 1.18 |
| 1:1 xanthan:konjac | 109 | 230 | 382 | 9.19 | 18.8 | 21.42 | 42.85 | 100 | 1.19 |
| 0.25% MGA | 105 | 223 | 373 | 10.03 | 20.62 | 23.46 | 45.27 | 100 | 1.2 |
| Water | 94 | 213 | 365 | 13.04 | 24.41 | 27.39 | 49.09 | 100 | 1.27 |

TABLE 6

| Test Treatment | Dv 0.1 μm | VMD μm | Dv 0.9 μm | Relative Span | Usage Rate |
|---|---|---|---|---|---|
| DD6 (37.5% sorbitol) | 139 | 318 | 544 | 1.29 | 5% |
| DD6 (37.5% sorbitol) | 165 | 369 | 607 | 1.2 | 7% |
| Gum acacia 5% | 111 | 229 | 382 | 8.64 | 18.66 |
| 1:1 xanthan:konjac* | 147 | 357 | 640 | 1.37 | 2.5% |
| 1:1 xanthan:konjac* | 195 | 421 | 670 | 1.14 | 3% |
| 1:1 xanthan:konjac (12.5% sorbitol) | 163 | 399 | 700 | 1.35 | 5% |
| Water | 108 | 242 | 404 | 1.21 | 24.41 |

*Concentrate contains 8% gum acacia.

What is claimed is:

1. A method of optimizing the open time of aqueous agrochemical spray droplets on a target plant, the method comprising:

preparing an aqueous concentrate comprising an effective amount of at least one gum selected from the group consisting of xanthan gum, konjac, carboxymethylcellulose, hydroxypropyl methylcellulose, carrageenan, methylcellulose and combinations thereof and diluting the aqueous concentrate in an aqueous agrochemical composition comprising an agrochemical selected from the group consisting of herbicides, fungicides, insecticides, plant growth regulators, bactericides, and acaracides; and spraying the resulting aqueous composition through a spray nozzle under a pressure of 15 to 115 pounds per square inch to form the aqueous agrochemical spray droplets;

wherein each aqueous agrochemical spray droplet has a surface tension of at least 70 dynes per centimeter; and wherein the effective amount is the amount of the at least one gum required to cause at least 70 percent of the aqueous agrochemical spray droplets to have a median diameter between 165 and 670 microns after traveling six inches from the spray nozzle, and wherein the aqueous composition does not contain a surfactant.

2. A method of optimizing the open time of aqueous agrochemical spray droplets on a target plant, wherein the aqueous agrochemical spray droplets are formed according to the method of claim 1, wherein the concentration of the at least one gum in the aqueous concentrate is 0.05-30% w/v.

3. The method of claim 2, wherein a contact angle of the aqueous agrochemical spray droplets deposited on the target plant is 84 degrees to 88 degrees.

4. The method of claim 2, wherein the aqueous agrochemical spray droplets are resistant to evaporation.

5. A method of optimizing the open time of aqueous agrochemical spray droplets on a target plant, wherein the aqueous agrochemical spray droplets are formed according to claim 1, wherein the aqueous concentrate further comprises at least one sugar alcohol selected from the group consisting of arabitol, erythritol, glycerol, isomalt, lactitol, mannitol, sorbitol, xylitol and combinations thereof.

6. The method of claim 5, wherein the concentration of the at least one sugar alcohol in the aqueous concentrate is 0.6-50% w/v.

7. The method of claim 4, wherein a contact angle of the aqueous agrochemical spray droplets deposited on the target plant is 84 degrees to 88 degrees.

8. A method of improving the effectiveness of an agrochemical deposited on a target plant, the method comprising:
preparing an aqueous concentrate comprising an effective amount of at least one gum selected from the group consisting of xanthan gum, konjac, carboxymethylcellulose, hydroxypropyl methylcellulose, gum acacia and combinations thereof and diluting the aqueous concentrate in an aqueous agrochemical composition comprising an agrochemical selected from the group consisting of herbicides, fungicides, insecticides, plant growth regulators, bactericides, and acaracides; and
spraying the resulting aqueous composition through a spray nozzle under a pressure of 15 to 115 pounds per square inch to form the aqueous agrochemical spray droplets;
wherein each aqueous agrochemical spray droplet has a surface tension of at least 70 dynes per centimeter; and
wherein the effective amount is the amount of the at least one gum required to cause at least 70 percent of the aqueous agrochemical spray droplets to have a median diameter between 165 and 670 microns after traveling six inches from the spray nozzle,
and wherein the aqueous composition does not contain a surfactant.

9. The method of claim 8, wherein the concentration of the at least one gum in the aqueous concentrate is 0.05-30% w/v.

10. The method of claim 8, wherein a contact angle of the aqueous agrochemical spray droplets deposited on, the target plant is 84 degrees to 88 degrees.

11. The method of claim 8, wherein the aqueous agrochemical spray droplets are resistant to evaporation.

12. The method of claim 8, wherein the aqueous concentrate further comprises at least one sugar alcohol selected from the group consisting of arabitol, erythritol, glycerol, isomalt, lactitol, mannitol, sorbitol, xylitol and combinations thereof.

13. The method of claim 12, wherein the concentration of the at least one sugar alcohol in the aqueous concentrate is 0.6-50% w/v.

14. The method of claim 12, wherein a contact angle of the aqueous agrochemical spray droplets deposited on the target plant is 84 degrees to 88 degrees.

15. The method of claim 12, wherein the aqueous agrochemical spray droplets are resistant to evaporation.

* * * * *